United States Patent [19]

Moriya et al.

[11] Patent Number: 5,311,259
[45] Date of Patent: May 10, 1994

[54] IMAGE FORMING APPARATUS

[75] Inventors: Shigeru Moriya, Toyokawa; Takashi Noda, Okazaki, both of Japan

[73] Assignee: Minolta Camera Kabushiki Kaisha, Osaka, Japan

[21] Appl. No.: 79,107

[22] Filed: Jun. 17, 1993

[30] Foreign Application Priority Data

Jun. 19, 1992 [JP] Japan ................. 4-161278
Jun. 19, 1992 [JP] Japan ................. 4-161279

[51] Int. Cl.$^5$ ..................... G03G 15/04; G03G 15/00
[52] U.S. Cl. ..................... 355/243; 355/311; 358/451; 395/102
[58] Field of Search ............ 355/243, 311, 317, 55; 395/102; 358/451

[56] References Cited

U.S. PATENT DOCUMENTS 4,853,752  8/1989  Takahashi et al. .......... 355/77
4,875,173 10/1989  Nakajima ................. 364/518
4,905,095  2/1990  Yamada ................... 358/451

FOREIGN PATENT DOCUMENTS 61-2170  1/1986  Japan .................. 355/243
62-62373 3/1987  Japan .................. 355/317

Primary Examiner—Joan H. Pendegrass
Attorney, Agent, or Firm—Willian Brinks Hofer Gilson & Lione

[57] ABSTRACT

An image forming apparatus divides an original image into multiple areas depending on the magnification of copy and produces enlarged copies of the divided areas on sheets of copy paper sequentially, thereby obtaining a enlarged copy of the original larger than the paper size. For each divided area, copy paper of a smallest possible size necessary to copy the entirety of the divided area is selected. The original can be divided optimally based on the original size, copy paper size and magnification, or can be divided by excluding a specified region from the original.

25 Claims, 58 Drawing Sheets

COPY MODE A

SET CURSOR TO CENTER OF SPECIFIED AREA BY TRACK BALL AND PRESS ENTER KEY — Q5

↑

SELECT PAPER SIZE — Q6
    [F1] → A3T
    [F2] → A4Y
    [F3] → A4T

↓ TO MENU Q7

COPY MODE A (CONT.)

| IMAGE IS DIVIDED INTO 9 BLOCKS | Q7 |
| DESIGNATE PAPER SELECTION WAY | |
| F1→UES INITIALLY SELECTED SIZE PAPER | |
| F2→UES PLURAL SIZE PAPER | |
| F3→COPY PLURAL AREA ON 1 SHEET | |

DESIGNATE COPY ORDER — Q8
 [F1] NORMAL ORDER
 [F2] PRIORITY ORDER

TO MENU Q9

Fig. 23
COPY MODE A (CONT.)
FROM MENU Q8
```
┌─────────────────────────────────┐
│                                 │
│        PRESS PRINT KEY          │ ~ Q9
│                                 │
└─────────────────────────────────┘
```
START OF COPY OP.

COPY MODE B     Fig.24
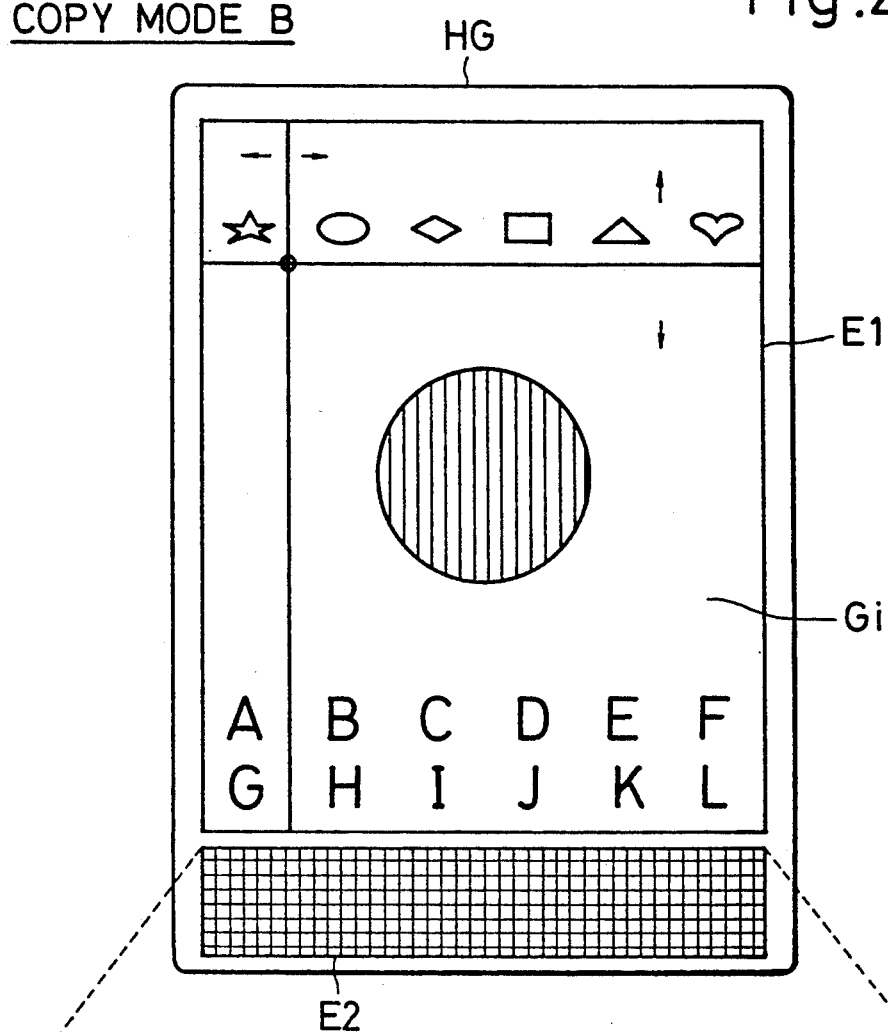
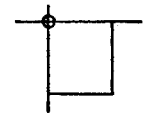
SET CURSOR AT ONE CORNER OF SPECIFIED AREA AND PRESS ENTER KEY — Q10
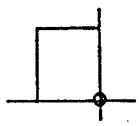
SET CURSOR AT THE OPPOSITE CORNER OF SPECIFIED AREA AND PRESS ENTER KEY — Q11
TO MENU Q7

Fig. 28

```
PAPER OF A3T SIZE IS RUN OUT.
SUPPLY PAPER AND PRESS PRINT KEY.
IF USES OTHER SIZE PAPER,
PRESS ENTER KEY.
```
~Q17

TO MENU Q18

Fig. 32

TBLK·BLOCK INFORMATION TABLE

| BLK: | BLOCK No. | Onx | Ony | Lnx | Lny |
|---|---|---|---|---|---|
| | 1 | 0 | 0 | x1 | y1 |
| | 2 | x1 | 0 | dx | y1 |
| | 3 | x2 | 0 | 0x−x2 | y1 |
| | 9 | x2 | y2 | 0x−x2 | 0y−y2 |
| | END | — | — | — | — |

(Onx, Ony) INDICATES THE COORDINATES OF SCANNING START POINT
Lnx, Lny INDICATES THE SIZE OF EACH BLOCK

DIVIDING OF ORIGINAL

SCHEDULE A

SCHEDULE B (BEFORE RENUMBERING)

| BLOCK | BLOCK NO. | Onx | |
|---|---|---|---|
| e1 | 1 | · | |
| e8 | 8 | · | |
| e9 | 9 | · | |
| e10 | 10 | · | |
| e11 | 11 | · | |
| e12 | 12 | · | |
| e13 | 13 | · | |
| e14 | 14 | · | |
| e15 | 15 | · | |
| e16 | 16 | · | |
| e17 | 17 | · | |
| e18 | 18 | · | |
| | END | − | |

(AFTER RENUMBERING)

| BLOCK | BLOCK NO. | Onx | |
|---|---|---|---|
| e1 | 24 | · | |
| e8 | 4 | · | |
| e9 | 9 | · | |
| e10 | 13 | · | |
| e11 | 10 | · | |
| e12 | 2 | · | |
| e13 | 1 | · | |
| e14 | 3 | · | |
| e15 | 11 | · | |
| e16 | 14 | · | |
| e17 | 6 | · | |
| e18 | 5 | · | |
| | END | − | |

Fig. 55
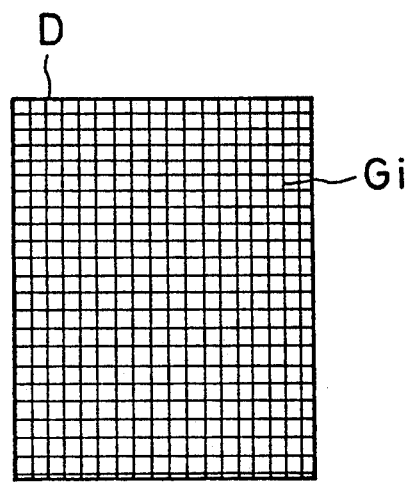
CONJUNCT SCALE-UP COPY
(MAGNIFICATION 1.5)
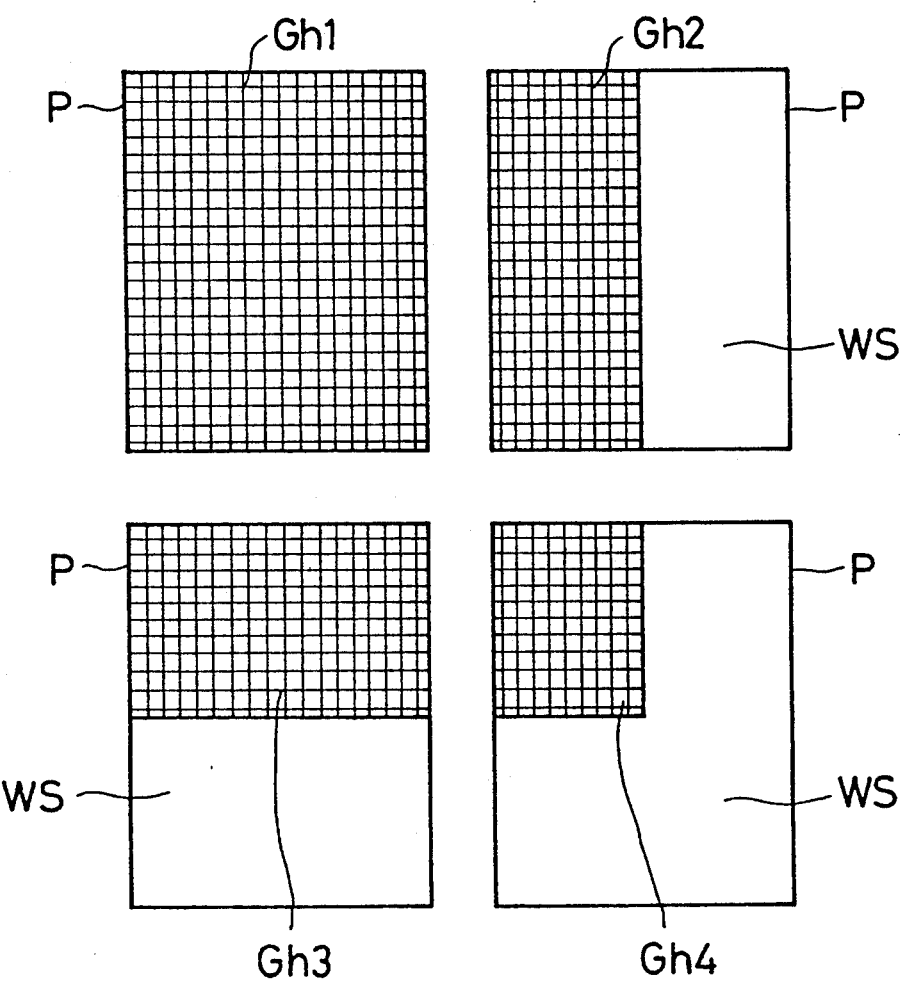

IMAGE FORMING APPARATUS

BACKGROUND OF THE INVENTION

1. Field of the Invention

The present invention relates to an image forming apparatus capable of producing an enlarged (scale-up) copy of an original image by dividing the original into a number of areas depending on the magnification (scale factor) of copy and producing an enlarged cop of each divided area on a sheet of copy paper sequentially so that a copied image larger than the size of copy paper is obtained.

2. Description of the Related Art

Copy machines based on digital image processing have a function in which an original is divided into a number of areas depending on the magnification of copy and an enlarged copy of each divided area is produced on a sheet of copy paper sequentially so that a copied image larger than copy paper is produced. This copy process will be called "conjunct scale-up copy" hereinafter.

In the conjunct scale-up copy operation, an original image is partially copied by being enlarged onto a sheet of paper at a time, and sheets of copied paper are delivered sequentially. The operator lays out the sheets of copied paper properly to get an enlarged copy of the original in the form of a set of partial images.

Conventional copy machines with the conjunct scale-up copy function are designed to use one sheet of copy paper for each divided area of the original. For example, when an A3-sized original is copied with the magnification of 5.0 onto sheets of A3-sized paper, the original is divided by five horizontally and vertically into 25 areas, and 25 divided original images are copied onto 25 sheets of paper, i.e., copy paper equal in number to the divided areas is used.

Accordingly, when the original size and copy paper size are equal and the magnification is an integer (greater than one), the size of an enlarged copy is equal to the total size of sheets of paper used to make an enlarged copy. The number of sheets of paper is equal to the square of the magnification. However, if the original size and paper size are different even though the magnification is an integer, or if the magnification is a fractional number, part of at least one sheet of paper is left unused and therefore copy paper is often wasted.

For example, for making a copy with the magnification of 1.5 of an original image Gi on an original D by using copy paper of the original size, four sheets of paper P are needed as shown in FIG. 55. In this case, although one sheet of paper is fully used to form a partial image Gh1, other two sheets of paper have their 50% area left unused and another sheet of paper has its 75% area left unused.

In making a copy with the magnification of 4.0 of an image Gi of an original D by using copy paper P of the original size as shown in FIG. 56 (a), the original D is divided by four horizontally and vertically into 16 areas e1–e16, as shown in FIG. 56 (b). These areas e1–e16 are copied from the leftmost area to the rightmost area on a row and from the top row row to the bottom row sequentially, i.e., in the order of e1→e2→e3→e4→e5→e6→e7→e8→e9→e10→e11→e12→e13→e14→e15→e16. As a result of the iterative copy operations, 16 sheets of copied paper P starting with the one having a formation of a partial copied image Gh1 and ending with the one having a formation of a partial copied image Gh16 are delivered sequentially as shown in FIG. 56(c).

The conjunct scale up copy operation takes a relatively long time to complete the entire original area when the number of divisions, which is determined from the magnification and paper size, increases.

On the other hand, at the operator's assessment of a copy work, attention is often paid to a specific portion of the original depending on the purpose. An example of such portion is the human skin where delicate hue adjustment is required in copying a color portrait. In the example of FIG. 56(b), when the operator pays attention to the original in the area e11, the operator may have to retry the conjunct scale-up copy operation by altering the conditions such as the magnification and hue adjustment if the copied partial image Gh11 for the area e11 is found unsatisfactory. In this case, the conventional copy machines do not allow the operator to examine the quality of the copied image Gh11, which is delivered by the 11th copy operation, at an early stage of operation.

In addition to the above-mentioned problem of operation ability, even if the operator makes a decision of retry at the delivery of the copy for the area e11, ten sheets of paper and time expended for them are wasted.

A further problem of the conventional copy machines is that during the conjunct scale-up copy operation, if all copy paper stacked in the supply cassette runs out, the copy operation is shut off abruptly. In this case, it is necessary for the operator to supply copy paper and start the copy operation from the beginning, resulting in the waste of paper and time expended before the machine was shut off.

SUMMARY OF THE INVENTION

A primary object of the present invention is to provide an image forming apparatus capable of producing an enlarged copy of an original image by dividing the original into a number of area depending on the magnification of copy and producing an enlarged copy of each divided area on a sheet of copy paper sequentially so that a copied image larger than the size of copy paper is obtained.

Another object of the present invention is to provide an image forming apparatus capable of performing the above-mentioned conjunct scale-up copy function at an enhanced efficiency of paper consumption.

A further object of the present invention is to provide an image forming apparatus capable of performing the above-mentioned conjunct scale-up copy function through the optimal division of the original depending on the original size, copy paper size and magnification, and also through the division other than the specified area of the original.

These and other objects and novel features of the present invention will become more apparent from the following detailed description taken in conjunction with the accompanying drawings.

BRIEF DESCRIPTION OF THE DRAWINGS

FIG. 15(a) and FIG. 15(b) are diagrams showing an example of partial scale-up copy, in which FIG. 15(a) shows the correspondence of the original image to the copied image, and FIG. 15(b) shows the scanning of the original;

FIG. 16(a) and FIG. 16(b) are diagrams showing an example of multiple image copy along the subsidiary scanning direction, in which FIG. 16(a) shows the correspondence of the original image to the copied image, and 16(b) shows the operational timing;

FIG. 23 is a diagram showing a menu area picture displayed on a display device in copy mode A (cont.);

FIG. 24 is a diagram showing a picture displayed on a display device in copy mode B;

FIG. 28 is a diagram showing a picture displayed on a display device in case of copy paper is run out;

FIG. 32 is a diagram showing the contents of the block information table;

FIG. 55 is a diagram showing the relation of sizes between copied images and sheets of copy paper based on the conventional copy machines.

DESCRIPTION OF THE PREFERRED EMBODIMENTS

Figure 1:
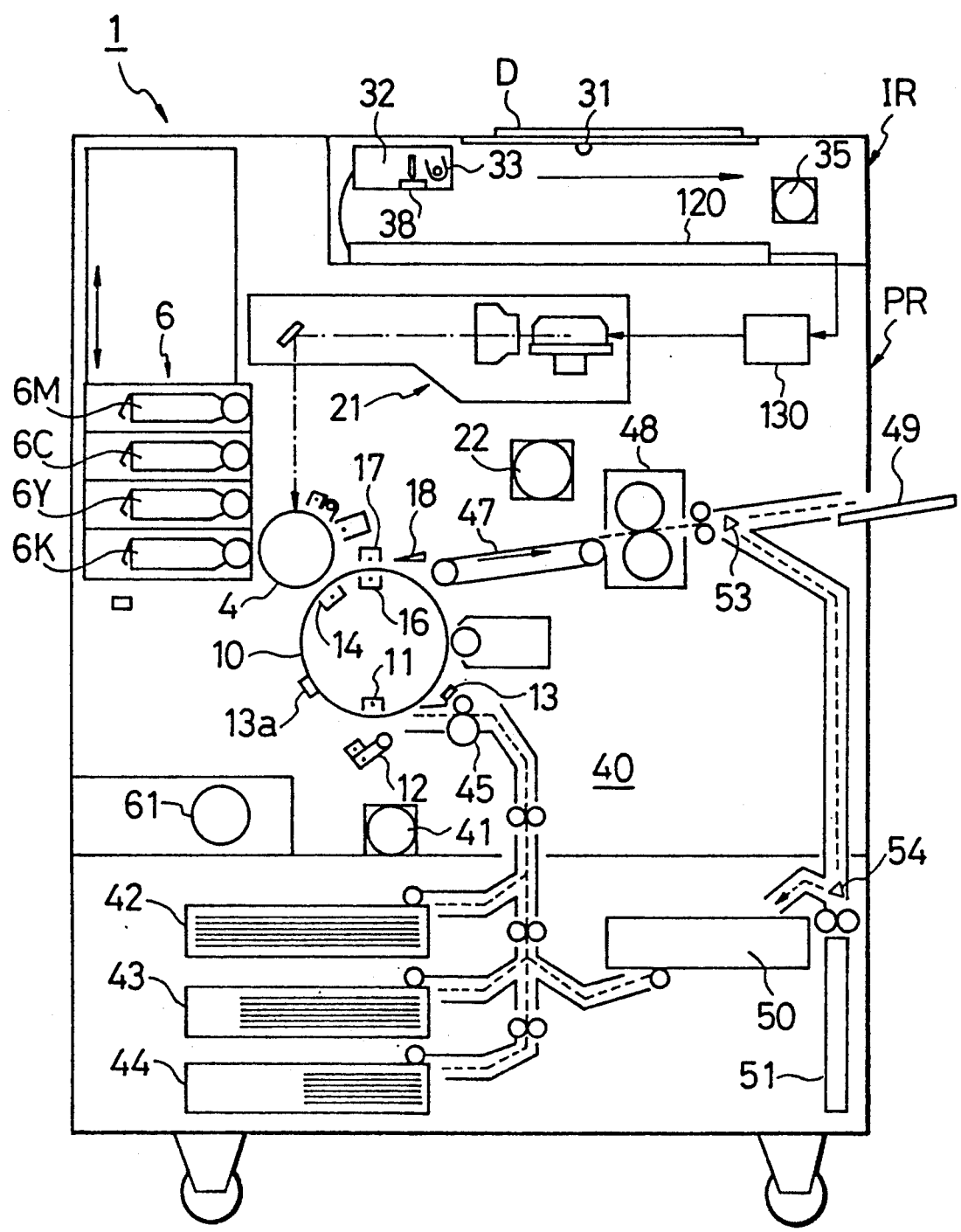
FIG. 1 is a front view of the interior of the copy machine based on this invention.

FIG. 1 is a front view of the interior of the copy machine 1 based on this invention. The copy machine 1 is a color copy machine based on digital image processing, and it basically consists of an image reader section IR which reads an original of A3 size (297 by 420 mm) at maximum and a printer section PR which produces copies of A3 size at maximum.

In the image reader section IR, a scanner 32 which is driven by a stepping motor 35 implements the illuminative scanning across an original D placed on a glass stage 31, and a CCD-based one-dimensional image sensor 38 senses the reflected light from the original D and produces image signals by photoelectric transformation. An image processing unit 120 produces image data from the image signal provided by the image sensor 38, and sends the image data to a print head controller 130 in the printer section PR.

The printer section PR includes an image forming system based on the electrophotographic process and an automatic paper feed and transportation mechanism. The image forming system consists of a semiconductor laser source 21 for producing the exposure light, a photosensitive drum 4 which holds a latent image, a developing unit 6, and an image transfer drum 10 which transfers a developed toner image onto the surface of copy paper. The photosensitive drum 4 and image transfer drum 10 rotated synchronously by a drum drive motor 22.

The developing unit 6 includes a developer 6M which uses magenta toner, a developer 6C which uses cyanine toner, a developer 6Y which uses yellow noner and a developer 6K which uses black toner, and these developers have associated toner hoppers (not shown). The developing unit 6 is movable vertically by means of a motor 61 so that one developer is brought to the developing position selectively.

The paper feed and transportation mechanism consists of three paper cassettes 42, 43 and 44 for stacking copy paper of different sizes and a paper transportation system 40 which is driven by a main motor 41. Each paper cassette has a capacity of several hundreds of sheets. The paper transportation system 40 operates to feed a sheet of paper from one of the paper cassettes 42-44 selectively and transports a copied paper after it has passed a fixing unit 48 back to the image transfer position when necessary.

In the usual full-color copy operation, a sheet of copy paper taken out of a paper cassettes is transported by pairs of rollers including a timing roller pair 45 along the paper path and wound around the image transfer drum 10. The copy paper, with toner images of four colors being transferred on it sequentially, is separated from the transfer drum 10 by means of a separation nail 18 and it is transported by a conveyer belt 47 to the fixing unit 45. Following the fixing process, the copied paper is delivered to a tray 49.

In the double-side copy operation, the image-fixed paper is placed temporarily in a midway tray 50 by the operation of guide nails 53, 54 and a paper reversing device 51, and thereafter sent back to the transfer drum 10 and wound on it so that the side opposite to the already copied side faces the photosensitive drum surface.

In the conjunct scale-up copy operation of the case where multiple images are copied on a sheet of paper, as will be explained later, the image-fixed paper is placed temporarily upside down in the midway tray 50 through the switch-back transportation by means of the guide nails 53 and 54, and then it is sent back and wound on the transfer drum 10 so that the already copied side faces the photosensitive drum surface.

Disposed in the periphery of the image transfer drum 10 are a paper sticking charger 11, a holding roller 12, a transfer charger 14, separation chargers 16 and 17, and a reference position sensor 13 which produces a rotational position reference signal for drum indexing by being in contact with an acting plate 13a which is fixed on the drum surface.

Figure 2:
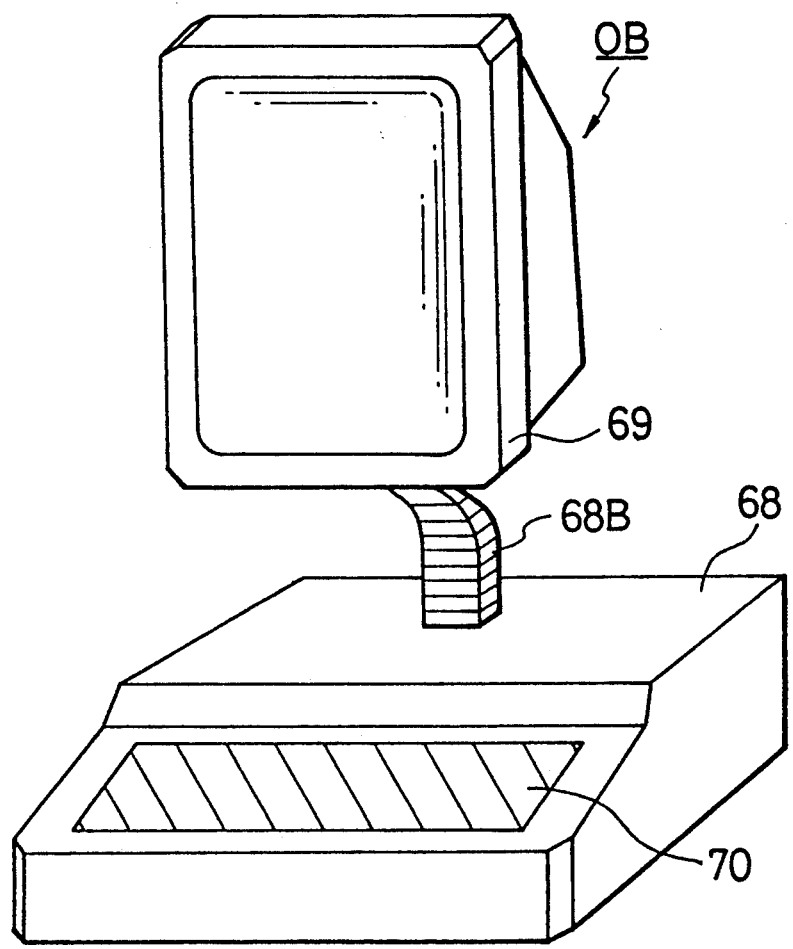
FIG. 2 is a perspective view of the operation console of this copy machine.
Figure 3:
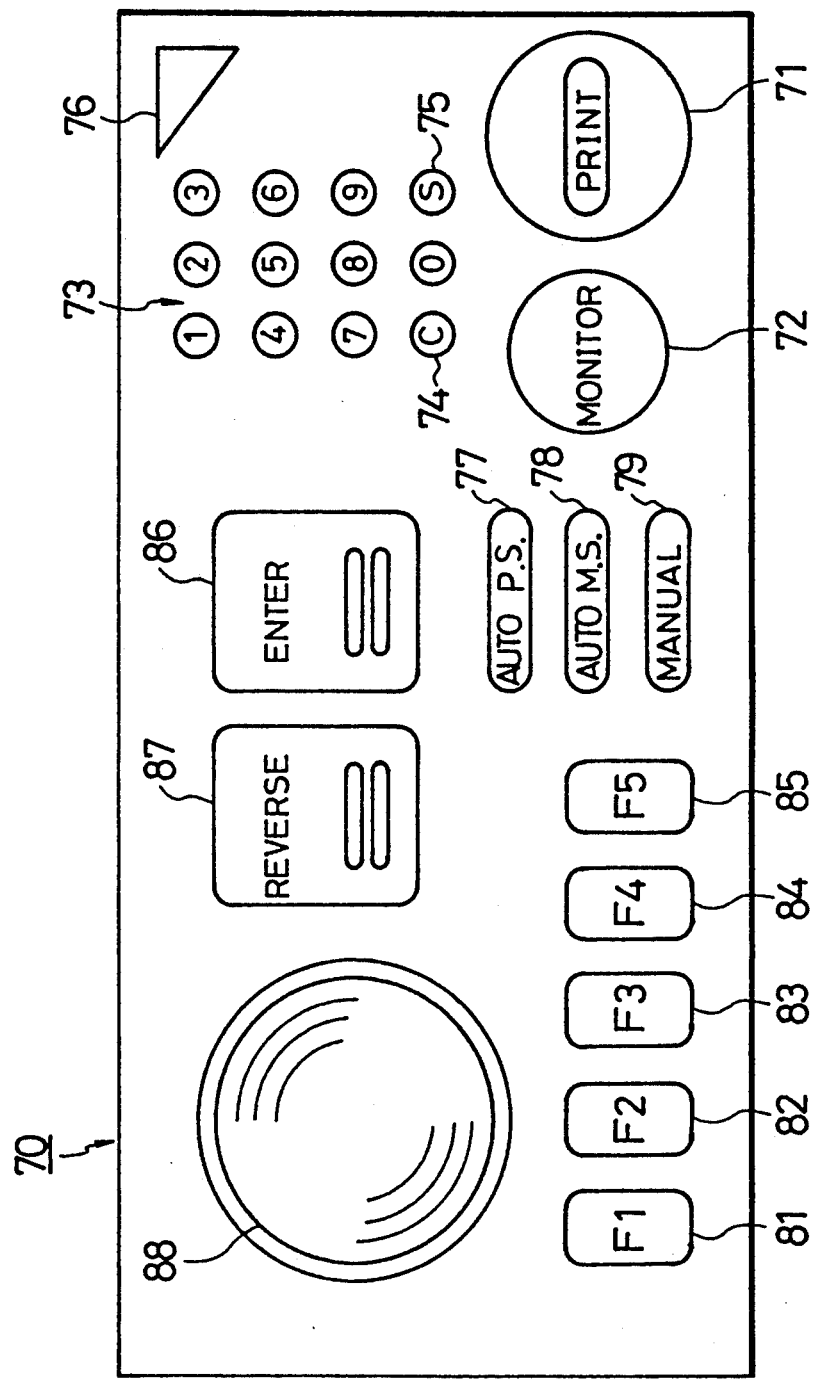
FIG. 3 is a top view of the operation panel on this console.

FIG. 2 is a perspective view of the operation console OB of the copy machine, and FIG. 3 is a top view of the operation panel 70 on the console. The operation console OB includes a display device 69 and operation panel 70 used by the operator to have interactive operations, and it is located at the top of the copy machine 1. The display device 69 is mounted on a base 68 through a flexible arm 68B so that the directivity of the screen can be adjusted arbitrarily.

Provided on the operation panel 70 are a PRINT key 71, IMAGE MONITOR key 72, a ten-key set 73, a SCREEN CLEAR key 74, a STOP key 75, a PANEL RESET key 76, an AUTO REAL-SIZE key (AUTO PAPER SELECT key) 77, an AUTO MAGNIFICATION SET key (AUTO MAG. SELECT key) 78, a MANUAL SET key 79, five FUNCTION keys (F1-F5) 81-85, an ENTER key 86, a REVERSE key 87, and a tracking ball 88. The functions of these keys will become apparent in the following explanation.

Figure 4:
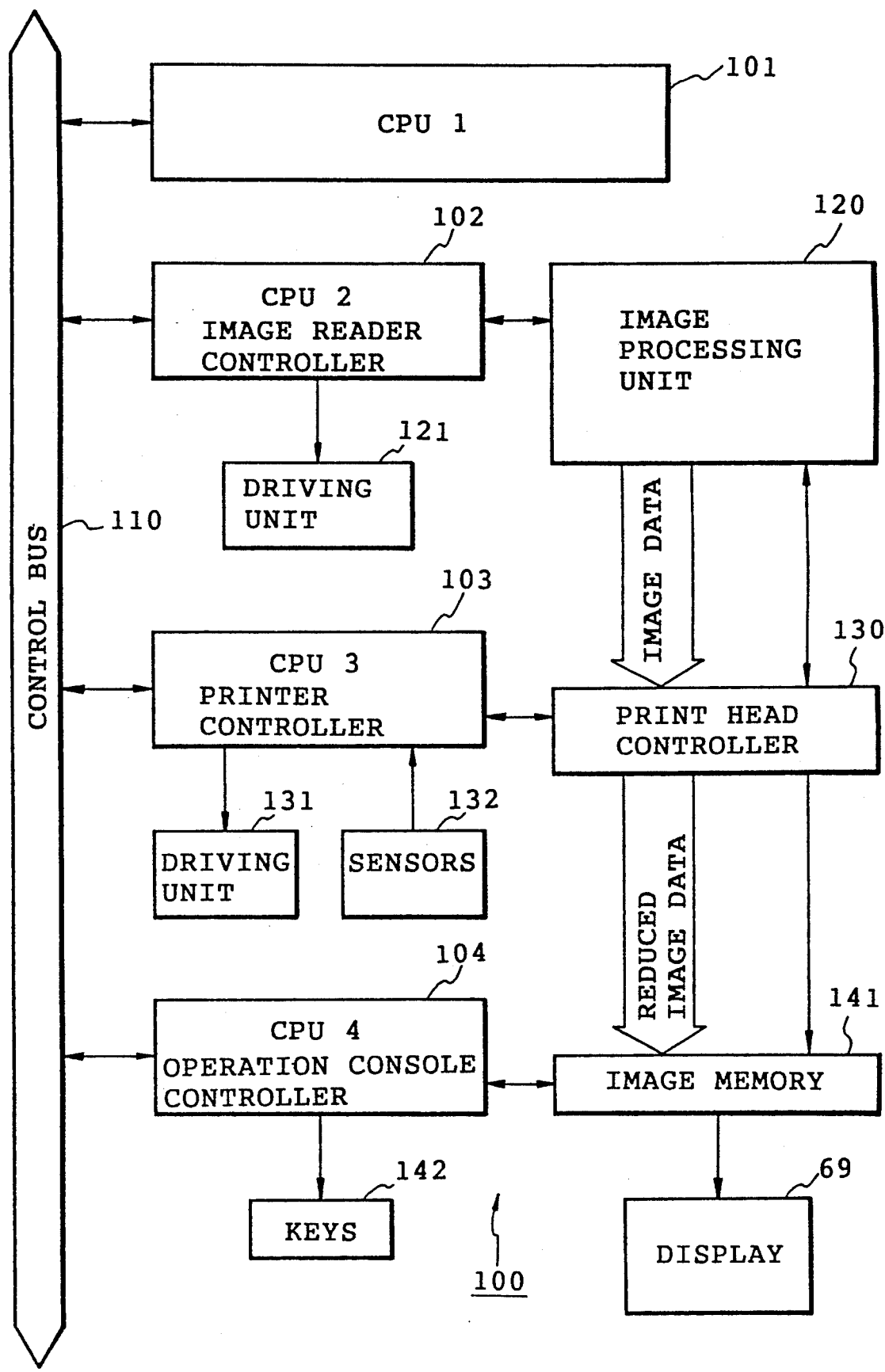
FIG. 4 is a block diagram showing the control of the copy machine.

FIG. 4 shows in block diagram of the control system 100 of the copy machine 1. The control system 100 includes four processing units (CPUs) 101, 102, 103 and 104, and a control bus 110 which connects these CPUs. Each CPU consists of a microprocessing unit unit (MPU).

The CPU 102 has a role of controlling the image reader section IR. Specifically, it controls a driving unit 121 including an original scanning motor and exposure lamp by transacting signals with an image processing unit 120. The CPU 103 has a role of controlling the printer section PR, and it issues the control signals to a driving unit 131 including a main motor 61 and to a print head controller 130 based on the signals produced by sensors 132. The CPU 104 has a role of controlling the operation console OB, and it controls the input operation of the keys 142 on the operation panel 70 and the addressing of an image memory 141 which stores extracted image data for display. The CPU 101 is used as a macro system controller (MSC) for controlling the overall copy machine 1, and it operates to distribute commands to other CPUs 102-104 depending on the copy mode and receives data from these CPUs.

The control system 100 is generally based on sequence control under control of the host CPU 101. As an exception, the signals which need to be transacted quickly between the image reader section IR and printer section PR are treated directly by these sections without the intervention of the CPU 101. Examples of such signals sent directly from the image reader section IR to the printer section PR include the image data VIDEO, pixel transfer clock SYNCK, horizontal (main scanning direction) print-admit range signal HD, vertical (subsidiary scanning direction) print-admit range signal VD, and print wait request signal BUSY. Examples of such signals sent directly from the printer section PR to the image reader section IR include the horizontal sync signal Hsync, image data request signal I-REQ, and image data request preluding signal PRE-TRG.

Figure 5:
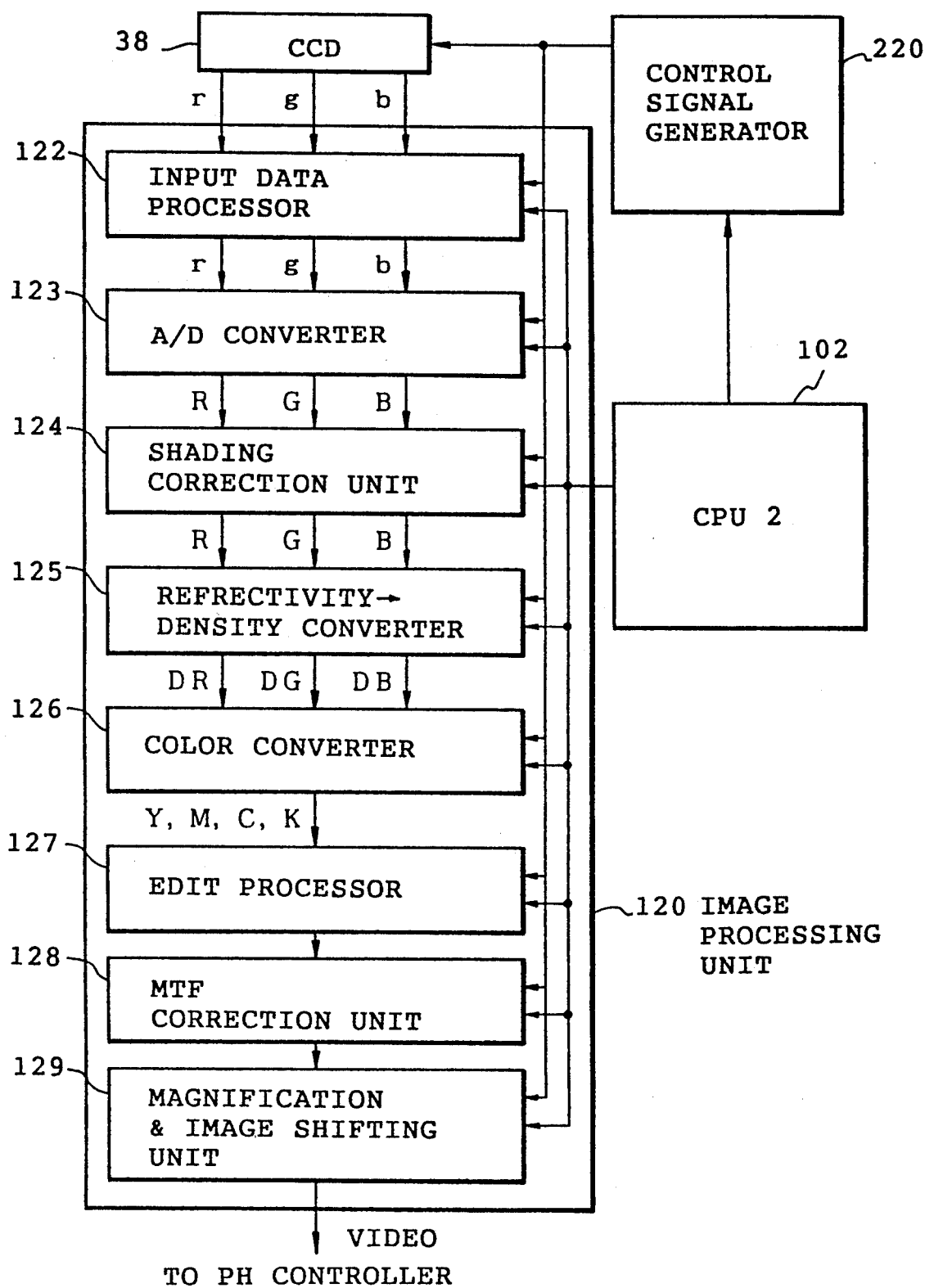
FIG. 5 is a block diagram showing the image processing unit in the controller.

FIG. 5 shows in block diagram of the image processing unit 120. In it, the image sensor 38 reads the original image by separating colors into the three primary colors of red, green and blue (R,G,B), and produces image signals of these colors by photoelectric transformation. The image processing unit 120 ultimately produces image data (print data) VIDEO, which will become the exposure control signal for latent image formation, from the 3-color image signals provided by the image sensor 38.

The image processing unit 120 further includes an input processor 122, an A/D converter 123, a shading correction unit 124, a reflectivity-density convertor 125, a color convertor 126, an edit processor 127, a MTF correction unit 128, and a magnification and image shifting unit 129.

The image signals received by the input processor 122 are amplified to have a certain signal level and sampled at a certain interval. The sampled value of each color is formed into 8-bit (256 tones) image data by the A/D converter 123.

The shading correction unit 124 modifies the image data against the unevenness of the light level produced by the exposure lamp 33 and the disparity of sensitivity of elements of the image sensor 38. After that, the reflectivity-density converter 125 converts th image data into density data which represents the density of each color of the image based on data of the reflected light level so that highlight portions and shadow portions are emphasized. These image data processings are conducted concurrently for red, green and blue (RGB) colors.

Subsequently, the color converter 126 produces image data of four toner colors from the 3-color image data. In this process, the convertor 126, receives from the CPU 102 a control signal indicative of the toner color of image data to be produced.

The edit processor 127 operates for the editing of copy. For example when trimming of an original image is specified, it erases portions of the original image outside the specified area. The MTF correction unit 128 implements the processings for improving the picture quality such as the edge emphasizing process and smoothing process. The magnification and image shifting unit 129 implements the scaling process (pixel density conversion process for the main scanning direction) for up-scaling or down-scaling the image depending on the magnification of copy of and the image shifting process (image shift and image repeat) for the main scanning direction.

Figure 6:
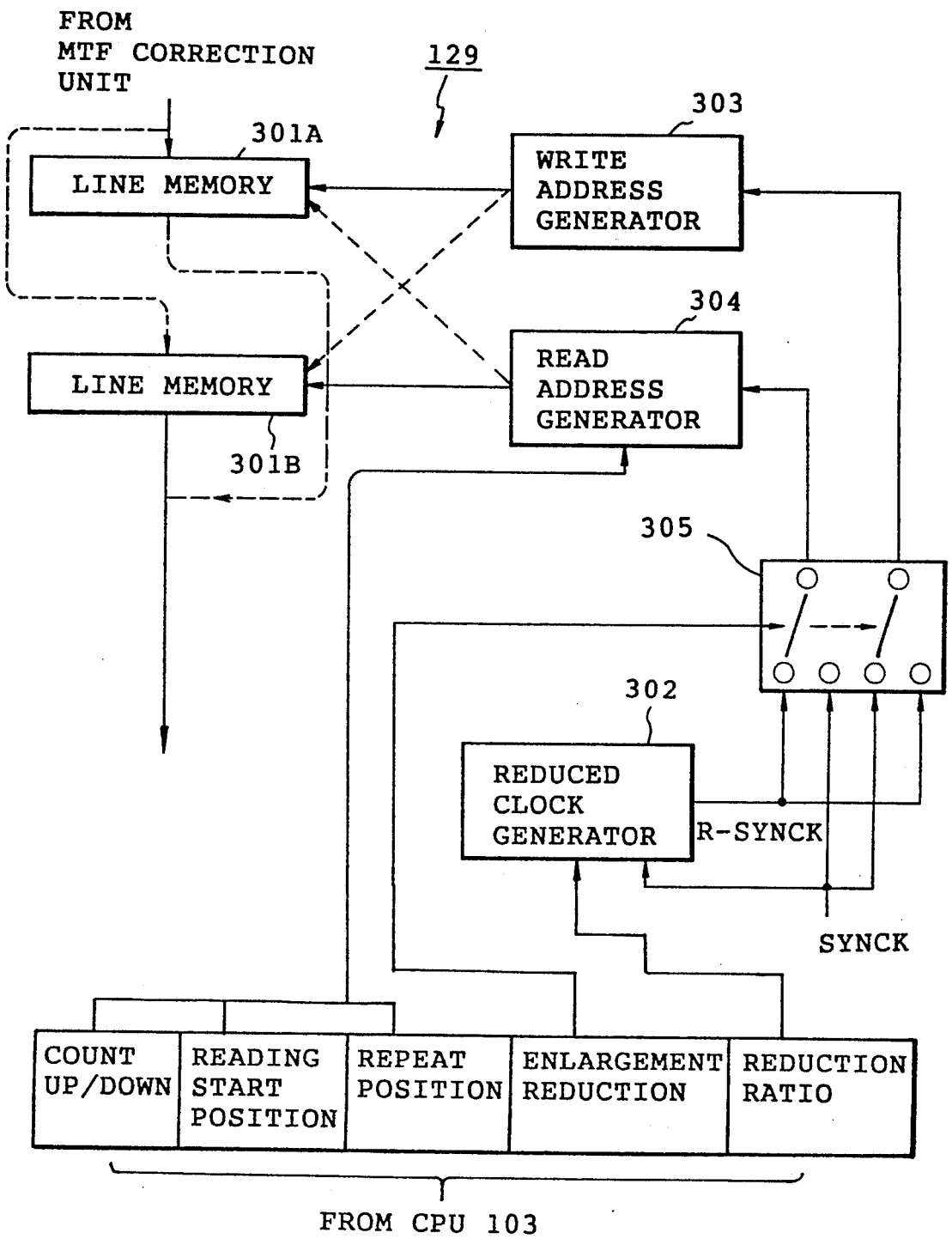
FIG. 6 is a block diagram showing the magnification and image shifting unit in the image processing unit.
Figure 7:
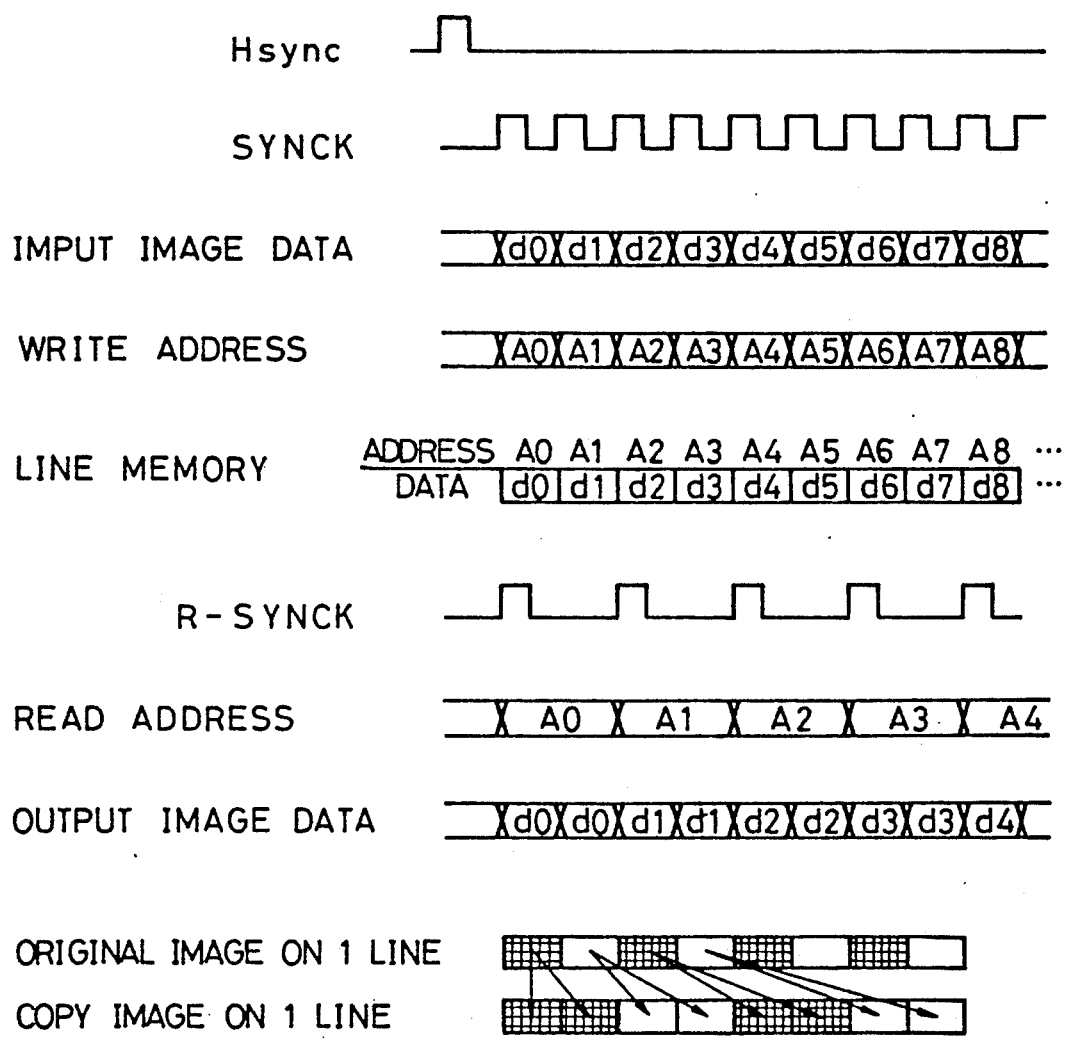
FIG. 7 is a timing chart used to explain the scale-up copy operation.
Figure 8:
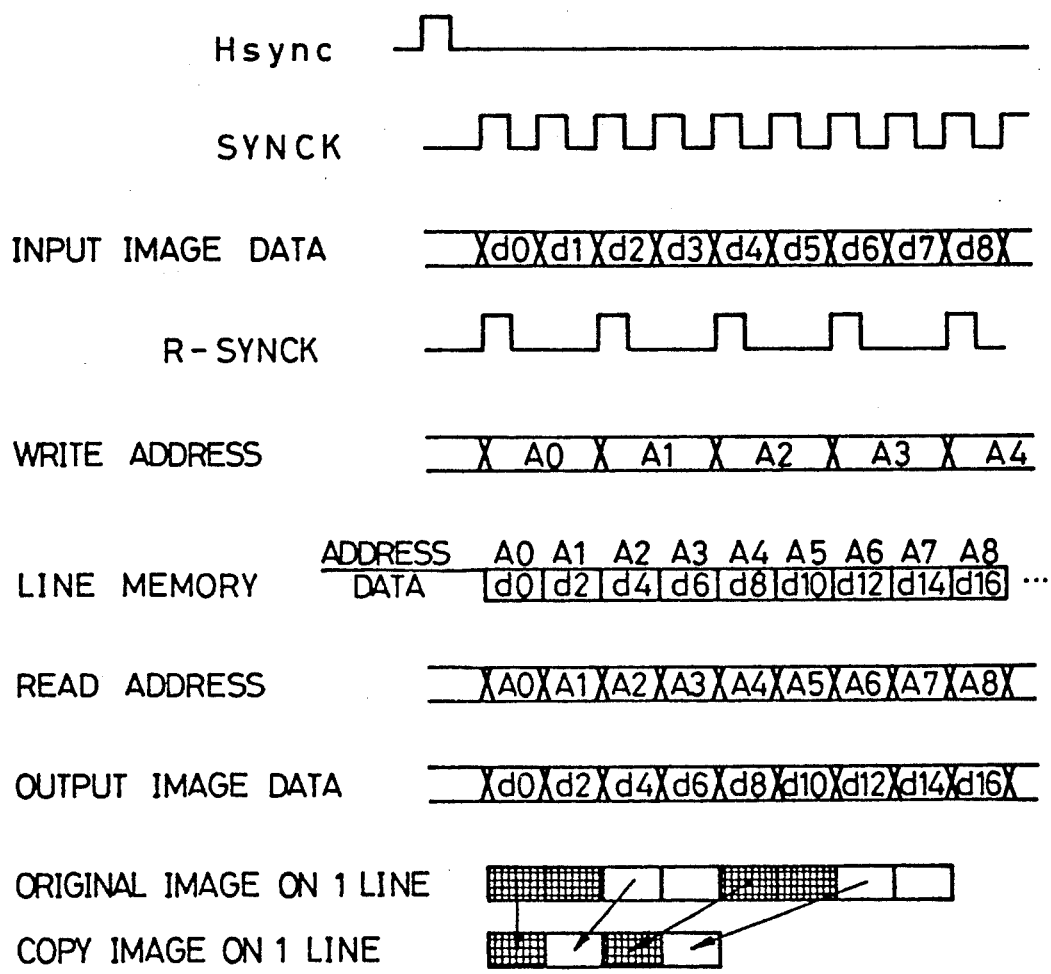
FIG. 8 is a timing chart used to explain the scale-down copy operation.
Figure 9A:
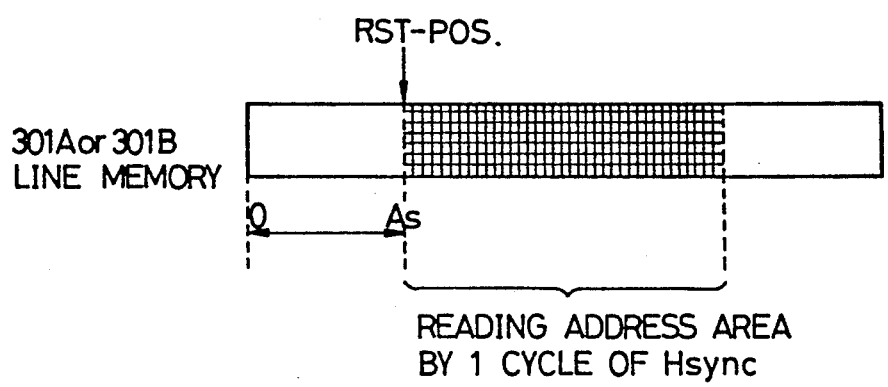
FIG. 9(a) and FIG. 9(b) are diagrams showing an example of the image shift copy operation.
Figure 9B:
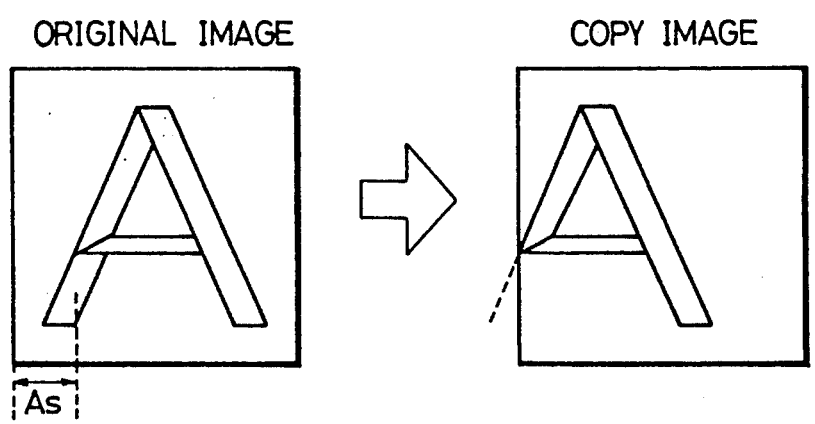
Figure 10A:
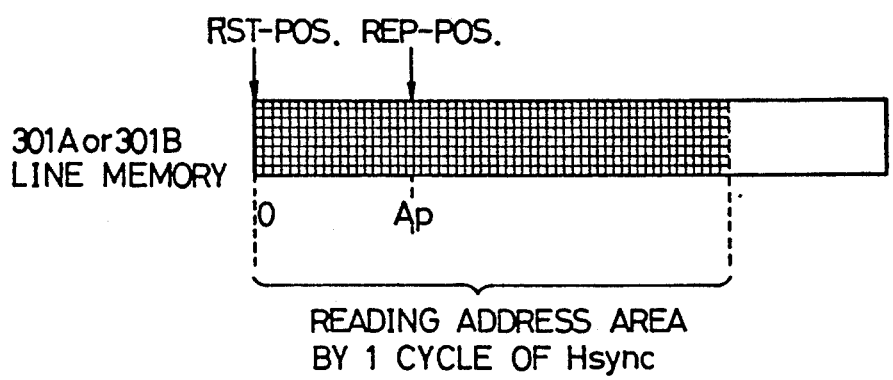
FIG. 10(a) and FIG. 10(b) are diagrams showing an example of the image repeat copy operation.
Figure 10B:
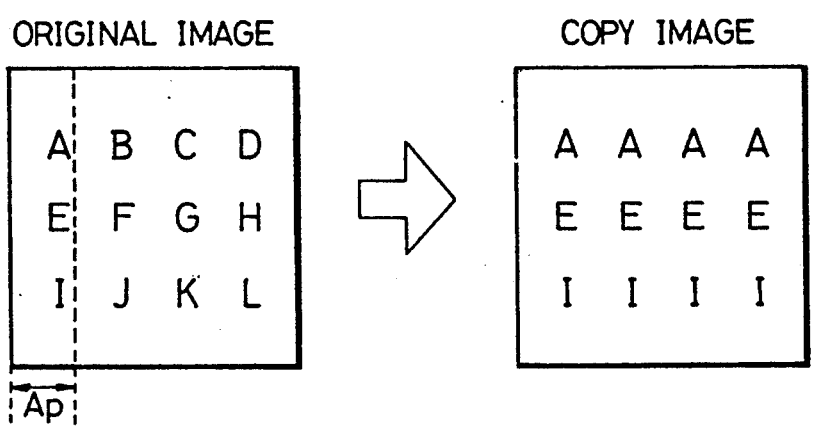

FIG. 6 is a block diagram showing the magnification and image shifting unit 129, FIG. 7 is a timing chart showing the scale-up copy operation, FIG. 8 is a timing chart showing the scale-down copy operation, FIG. 9(a) and FIG. 9(b) are diagrams showing the image shift copy operation, and FIG. 10(a) and FIG. 10(b) are diagrams showing the image repeat copy operation.

The magnification and image shifting unit 129 consists of two line memories 301A and 301B, a reduced clock generator 302, a write address generator 303, a read address generator 304, and a clock selector 305. The image data provided by the MTF correction unit 128 is stored in one of the line memories (e.g., line memory 301A) by being addressed by the write address generator 303. At the same time, image data stored previously in another line memory 301B is read out by being addressed by the read address generator 304. The address generators 303 and 304 produce the write address and read address, respectively, by counting the clock signal selected by the clock selector 305.

The clock selector 305 selects the pixel transfer clock SYNCK or the reduced clock R-SYNCK which is produced by the reduced clock generator 302 by extracting part of the pixel transfer clock SYNCK in accordance with the magnification data MAG-DATA provided by the CPU 103. In the case of real-size copy (magnification of 1.0), the clock R-SYNCK and clock SYNCK have the same frequency. The clock selector 305 operates in response to the scale-up/down signal RE provided by the CPU 103.

The communication between the line memories 301A and 301B and the address generators 303 and 304 is switched at each reception of the horizontal sync signal Hsync so that the line memories 301A and 301B have the write and read operations in turn in response to the horizontal sync signal Hsync. The write address generator 303 counts the clock by starting with an initial count value of 0, whereas the read address generator 304 has its initial count value varied in response to the read start position data FST-POS and operates to up-count or down-count in accordance with the signal UD. The read address generator 304 counts repeatedly a certain number determined by the repeat position data REP-POS.

In the scale-up copy mode, the pixel transfer clock SYNCK is selected for the write clock and the reduced clock R-SYNCK is selected for the read clock, as shown in FIG. 7. Accordingly, same data is read out of the line memory several times in response to the clock SYNCK. In the example of FIG. 7, data of each pixel of original image is read out twice, and the image is enlarged twice as a result.

In the scale-down copy mode, the reduced clock R-SYNCK is selected for the write clock, and input image data is stored by being extracted in the line memory as shown in FIG. 8. The extracted image data is read out in response to the clock SYNCK. Consequently, the original image is reduced in size. The image size is halved in the example of FIG. 8.

In the image shift copy mode, reading of the line memory starts at the address given by the read start position data FST-POS as shown in FIG. 9(a), and accordingly the copied image is moved right or left on the copy paper depending on the data FST-POS. In the example of FIG. 9(b), the data FST-POS has a positive value and consequently the copied image is shifted to the left. The copied image is shifted to the right if the data FST-POS has a negative value.

In the image repeat copy mode, the read address generator 304 restarts counting from the initial value after the count value (read address) has reached the value of repeat position data REP-POS as shown in FIG. 10(a), and consequently part of the original image is copied repeatedly as shown in FIG. 10(b). In the mirror-image copy mode, the read address generator 304 has a down-count operation in accordance with the signal UD, and the copied image becomes a mirror-image of the original image. It is possible for this copy machine to operate in arbitrary combination of the scaling mode, image shift mode, image repeat mode and mirror-image mode.

Figure 11:
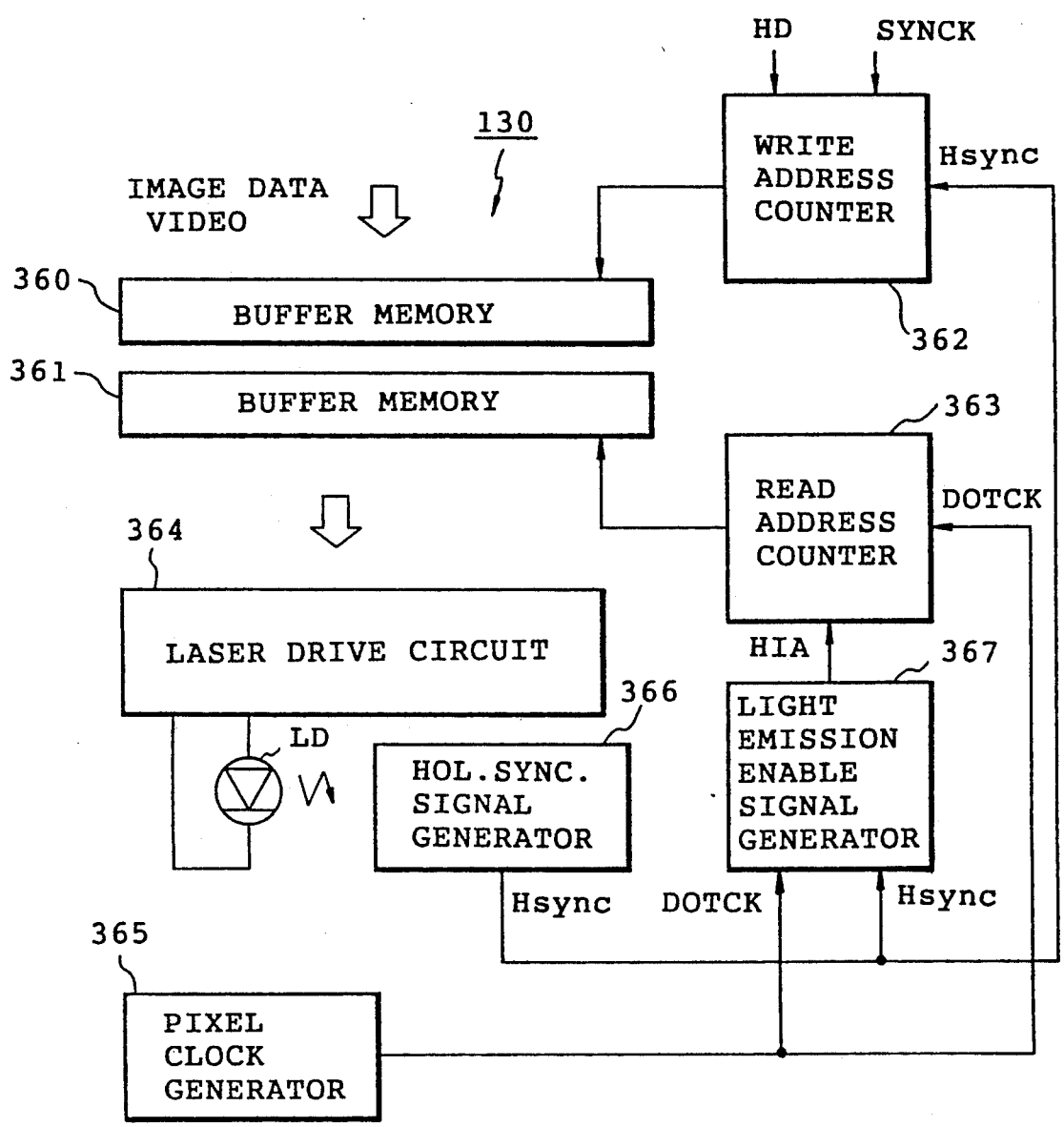
FIG. 11 is a block diagram showing an example of the print head controller.
Figure 12:
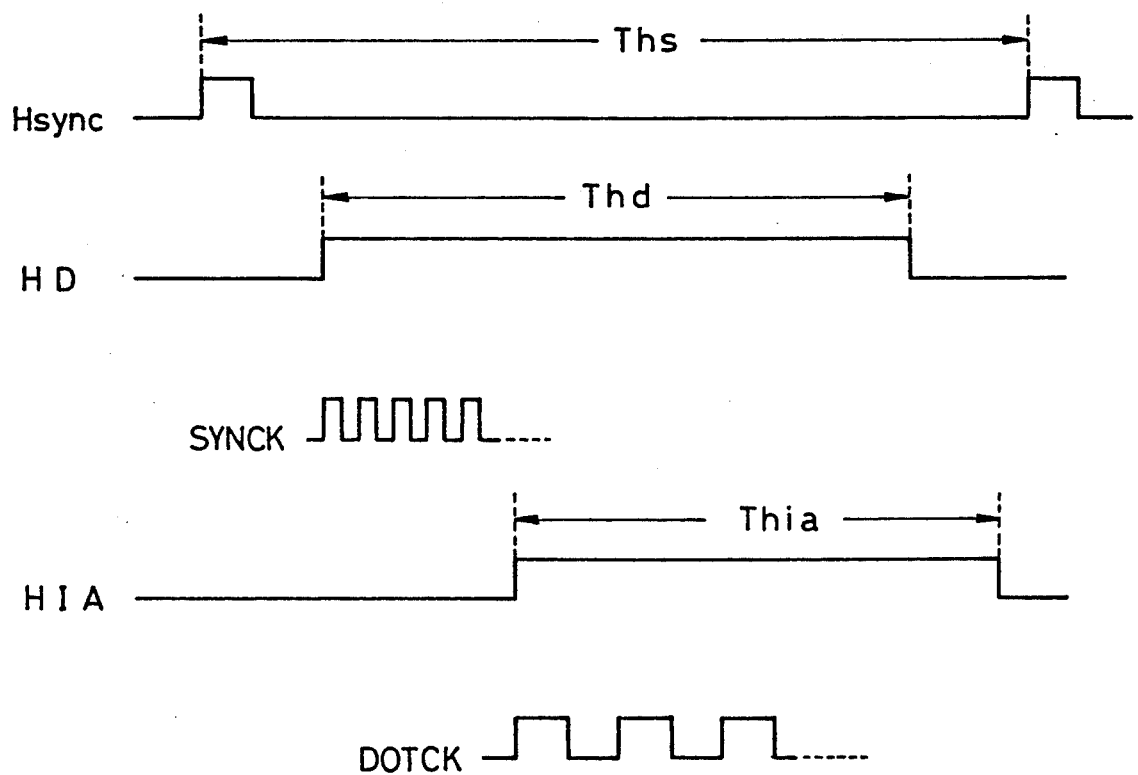
FIG. 12 is a waveform diagram of the signals pertinent to the operation of the print head controller.

FIG. 11 is a block diagram showing the print head controller 130, and FIG. 12 is a waveform diagram of the signals pertinent to its operation. The print head controller 130 consists of a pair of buffer memories 360 and 361, a write address counter 362, a read address counter 363, a laser drive circuit 364, a pixel clock generator 365, a horizontal sync signal generator 366, and a light emission enable signal generator 367.

The buffer memories 360 and 361 are used to write (store) and read the image data VIDEO concurrently, but asynchronously. Writing and reading of each buffer memory takes place alternately for each 1-line scanning of the original. Specifically, image data VIDEO of the N-th line transferred from the image reader section IR is stored in one buffer memory and, at the same time, image data VIDEO of the (N-1)th line is read out of another buffer memory during one period Ths of the horizontal sync signal.

The buffer memory for writing is addressed by the count value of the write address counter 362, which clears the count value in response to the signal Hsync and thereafter counts the image transfer clock SYNCK during the forthcoming active period Thd of the signal HD (see FIG. 12). The buffer memory for reading is addressed by the count value of the read address counter 363, which counts the pixel clock DOTCK during the active period Thia of the light emission enable signal HIA. The pixel clock DOTCK is produced by the pixel clock generator 365, and it times the activation and deactivation of the semiconductor laser LD for each pixel. The light emission enable signal HIA is produced from the horizontal sync signal Hsync and pixel clock DOTCK by the light emission enable signal generator 367.

By way of the buffer memories 360 and 361, the image data VIDEO is transferred to the laser drive circuit 364. The laser drive circuit 364 converts the image data VIDEO into LD emission data, by which the semiconductor laser LD is turned on and off. In the following explanation, the latent image forming operation on the photosensitive drum 4 with a laser beam will be called "print" or "printing."

It is possible for the print head controller 130 of this embodiment to set the print start timing arbitrarily within one period Ths of the horizontal sync signal Hsync by altering the timing of activation of the light emission enable signal HIA. Accordingly, it is possible to alter the print start position in the main scanning direction on the photosensitive drum 4, thereby moving the position of copied image on the paper by an intended length independently of the above-mentioned image shift function.

Figure 13A:
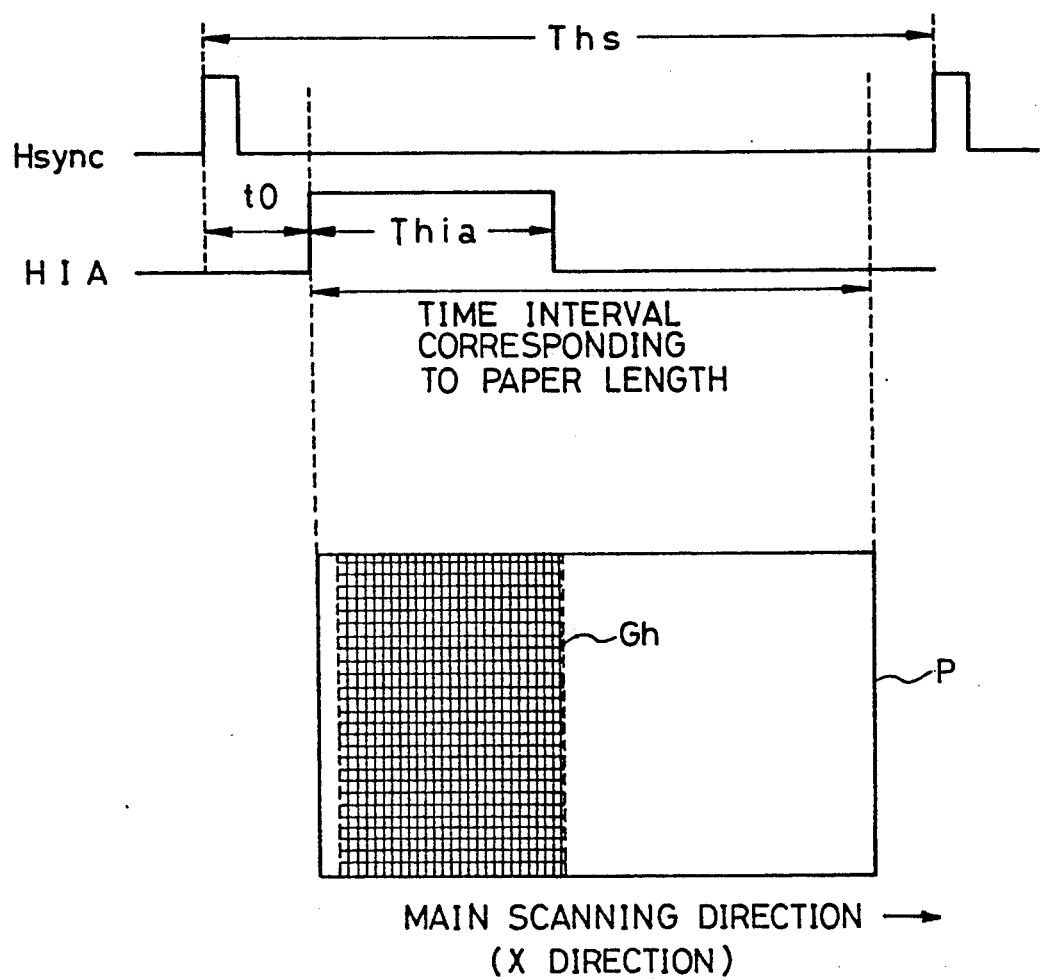
FIG. 13(a) and FIG. 13(b) are diagrams showing the operational timing in the image shift operation executed by the print head controller.
Figure 13B:
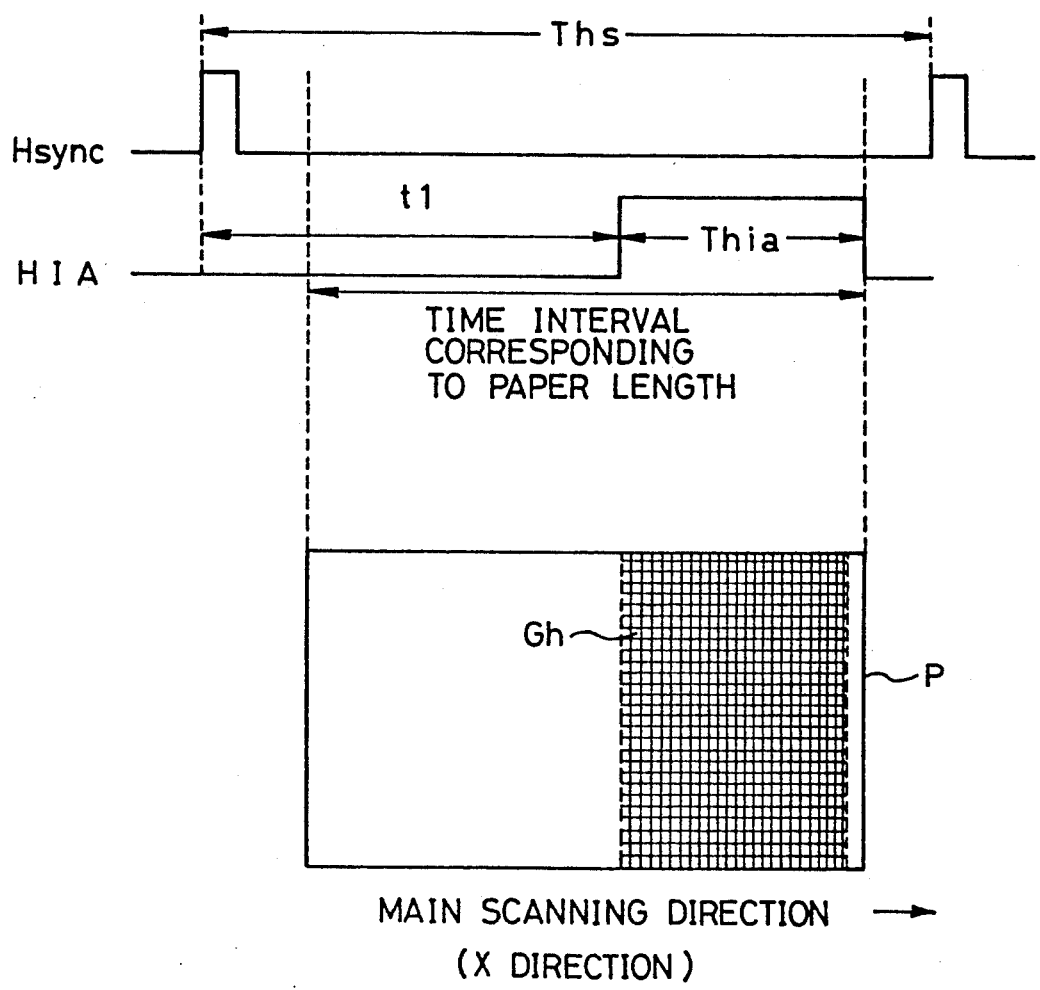

FIG. 13(a) and FIG. 13(b) show examples of image shift based on the alteration of operational timing of the print head controller 130. In FIG. 13(a), when the signal HIA has its active period Thia set to the former half of the period Ths, a copied image Gh is formed in the left-hand section of the paper P. In FIG. 13(b), when the signal HIA has its active period Thia set to the latter half of the period Ths, the copied image Gh is formed in the right-hand section of the paper P.

The copy machine 1 having the electrophotographic processing unit and control means arranged as described above is operative to produce copies in various modes including the above-mentioned simple scaling copy and image shift copy. The conjunct scale-up copy operation which is inherent to this invention and some of the above-mentioned copy modes related to it will be explained in the following.

(1) Full-Color Copy

The operator selects the full-color copy mode and presses the PRINT key 71. The copy machine 1 scans the same original D four times and transfers the toner images of four colors sequentially onto a sheet of copy paper P.

In order to prevent the displacement of toner images, the operations of the image reader section IR and printer section PR must be synchronized precisely in the subsidiary scanning direction. This synchronous operation is accomplished in this copy machine 1 based on the rotational position reference signal TBASE produced by the reference position sensor 13 and acting plate 13a mentioned previously.

Figure 14:
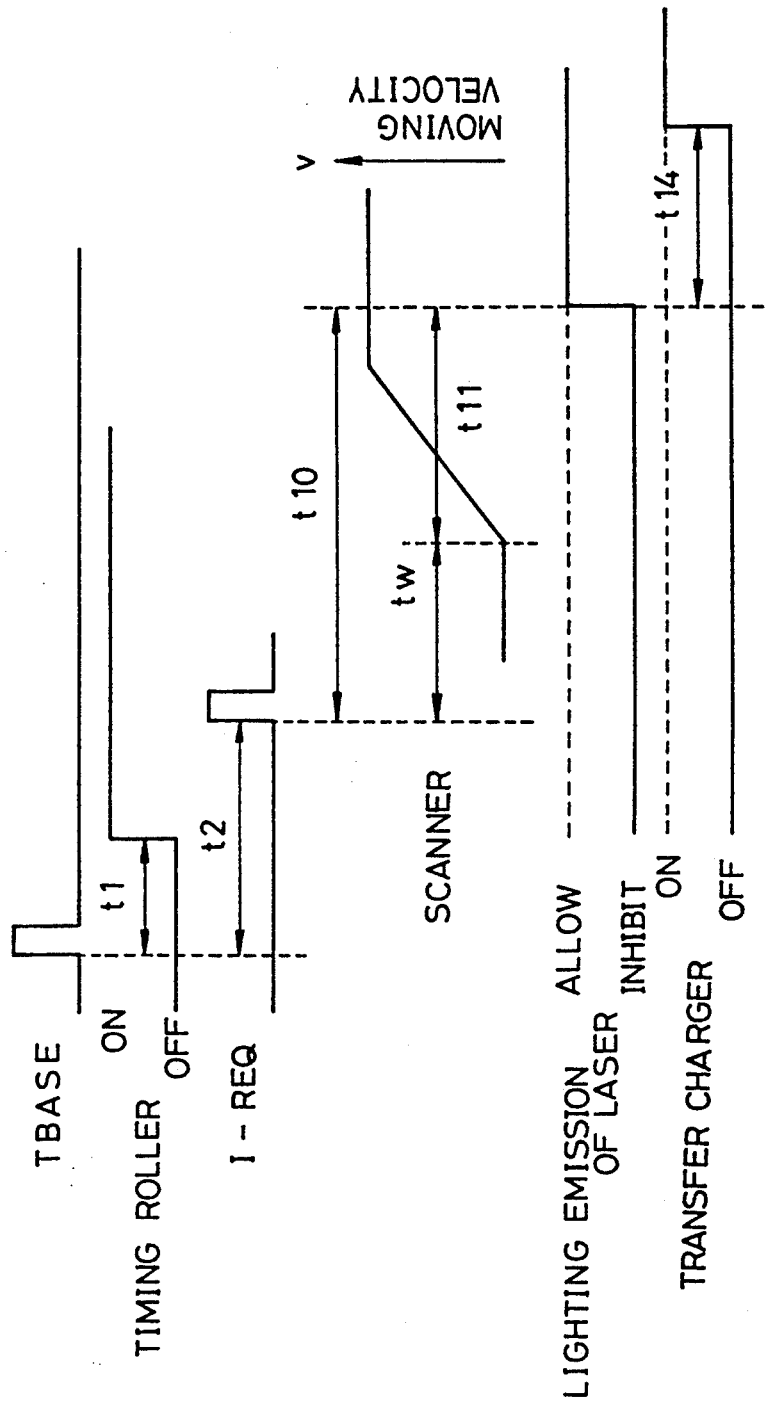
FIG. 14 is a timing chart used to explain the synchronous operation of the image reader and the printer.

FIG. 14 is a timing chart used to explain the synchronous operations of the image reader section IR and printer section PR.

The CPU 103 for controlling the printer section PR causes a sheet of copy paper to come to stop at a position in the neighborhood of the timing roller pair 45 in FIG. 1 and causes the laser source 21 and developing unit 6 to be in readiness. At a time point when the signal TBASE is generated, the CPU 103 starts the timer operation. On expiration of a time length t1, the CPU 103 implements the paper feed control including the activation of the timing roller pair 45, and the paper is stuck electrostatically at the prescribed position on the image transfer drum 10. On expiration of a time length t2 from the timer starting point, the CPU 103 issues an image data request signal I-REQ to the image reader section IR.

The CPU 102 of the image reader section IR responds to the signal I-REQ to start the wait timer operation for counting a time length tw which corresponds to the magnification of copy. On expiration of the wait time length tw, the CPU 102 activates the stepping motor 35 to drive the scanner 32. The scanner 32 reaches the position beneath the leading edge of the original after a time length t10 has expired since the start of movement. The time length t10 is constant irrespective of the magnification, and the time length tw and the moving velocity v of the scanner 32 are adjusted so that the t10 is justified.

On the part of the printer section PR, light emission of the laser LD is enabled on expiration of the time length t10 following the issuance of the signal I-REQ, and the exposure of the photosensitive drum 4 commences immediately. A latent image formed on the exposed drum 4 is developed by the developing unit 6 so that it turns to a toner image of the first color, and thereafter it reaches the position (transfer position) facing the transfer charger 14. The copy paper is ready, with its leading edge being positioned to the transfer position, and the toner image is transferred to the paper.

With the copy paper being stuck on the transfer drum 10, the electrophotographic process is repeated by switching developing colors sequentially, and ultimately toner images of four colors appear by overlapping on the paper. The operations of the image reader section IR and printer section PR for the second, third and fourth colors are controlled by being timed to the signal TBASE in the same manner as the first color. In case the time needed for the replacement of developing unit 6 and the return movement of scanner 32 is longer than the rotational period of transfer drum 10, the drum 10 is operated to have an idling rotation.

(2) Partial Scale-Up Copy

The operator specifies the magnification of copy by using the ten-key set 73. The partial scale-up copy mode is intended to make an enlarged copy of only a partial area of an original, and it is often used when the entire image cannot be copied to copy paper due to the relation among the original size, copy paper size and magnification.

Figure 15A:
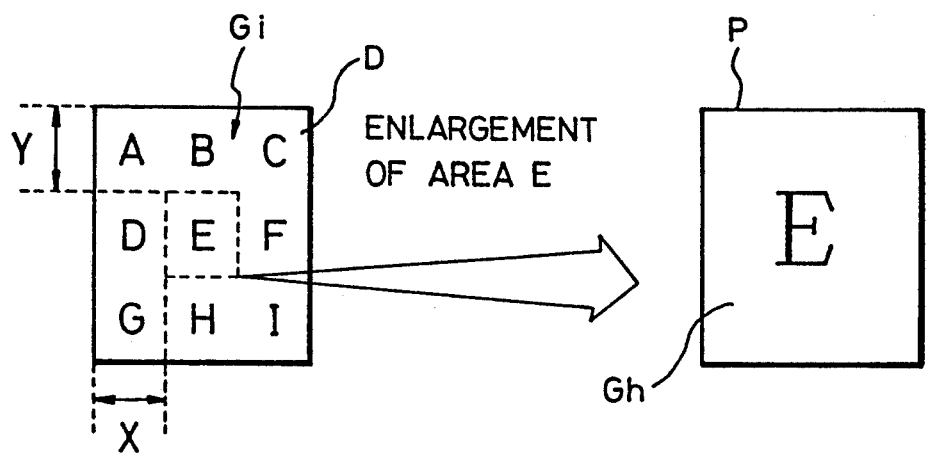
Figure 15B:
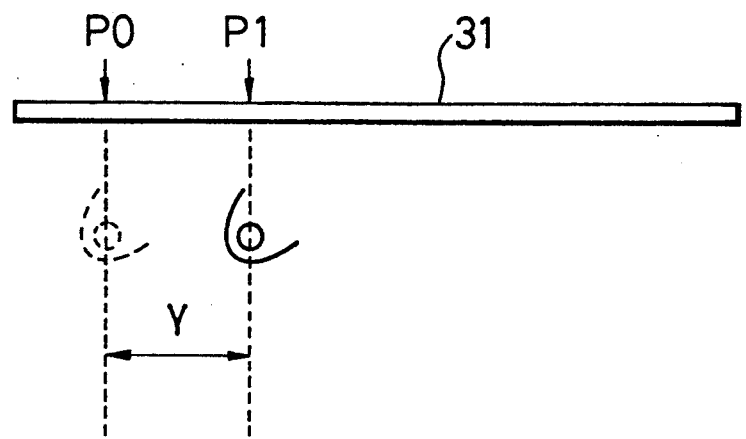

FIG. 15 shows an example of partial scale-up copy. FIG. 15(a) shows the relation between an original image Gi and copied image Gh, and FIG. 15(b) shows the original scanning operation. In this example, the copy operation starts at a position on the original D distant by X in the main scanning direction and distant by Y in the subsidiary scanning direction from the top-left corner (normal copy start position) of the original.

For the main scanning direction, the magnification and image shifting unit 129 is given the read start position data FST-POS which represents the length X so that image of the specified range is extracted, in the same manner as the foregoing image shift copy mode. For the subsidiary scanning direction, the scanner 32 is moved forward in advance to the position P1 which is distant by Y from the normal home position P0, and the scanning operation is started at the timing explained in connection with FIG. 14.

The lengths X and Y are specified by the operator by means of the tracking ball 88 on the original displayed on the display device 69. The subsidiary scanning speed of the scanner 32 is determined depending on the magnification of copy, in the same manner as the usual scale-up copy mode.

(3) Multiple Image Copy Along the Subsidiary Scanning Direction

The rotational position reference signal TBASE is generated in each revolution of the transfer drum 10. The printer section PR issues the image data request signal I-REQ on expiration of t2 with respect to the signal TBASE, as explained on FIG. 14.

Figure 16A:
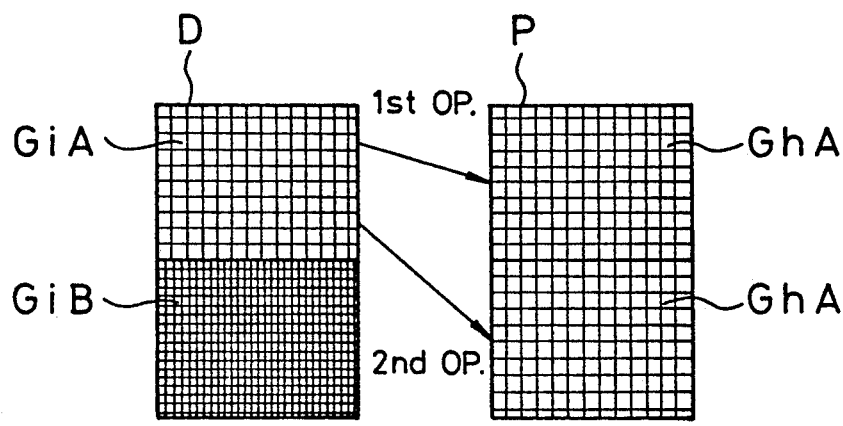

In the multiple image copy mode, the timing of output of the signal I-REQ is altered. For example, when an original image GiA in the former half area of an original D is copied twice to two regions of the copy paper P along the subsidiary scanning direction as shown in FIG. 16(a), the printer section PR produces a signal I-REQ on expiration of t2a following the first TBASE and produces another I-REQ on expiration of t2b (e.g., t2b =2×t2a) following the second TBASE, as shown in FIG. 16(b).

Since the image reader section IR delivers the image data VIDEO in response to the signal I-REQ, both the first and second printing operations start on expiration of a constant time length t3 following the output of the first and second I-REQ signals. The second printing starts by being delayed by a certain time length (i.e., t2b−t2a) with respect to TBASE relative to the first printing.

The transfer charger 14 operates in response to the signal VD, and has its active period limited to the time length corresponding to the length of the image GiA in the subsidiary scanning direction, instead of being the time length corresponding to the length of paper (i.e., the paper length divided by the tangential speed of transfer drum 10). This limitation is imposed to stabilize the toner image by preventing an excessive charging to the latter half region of paper.

Figure 16B:
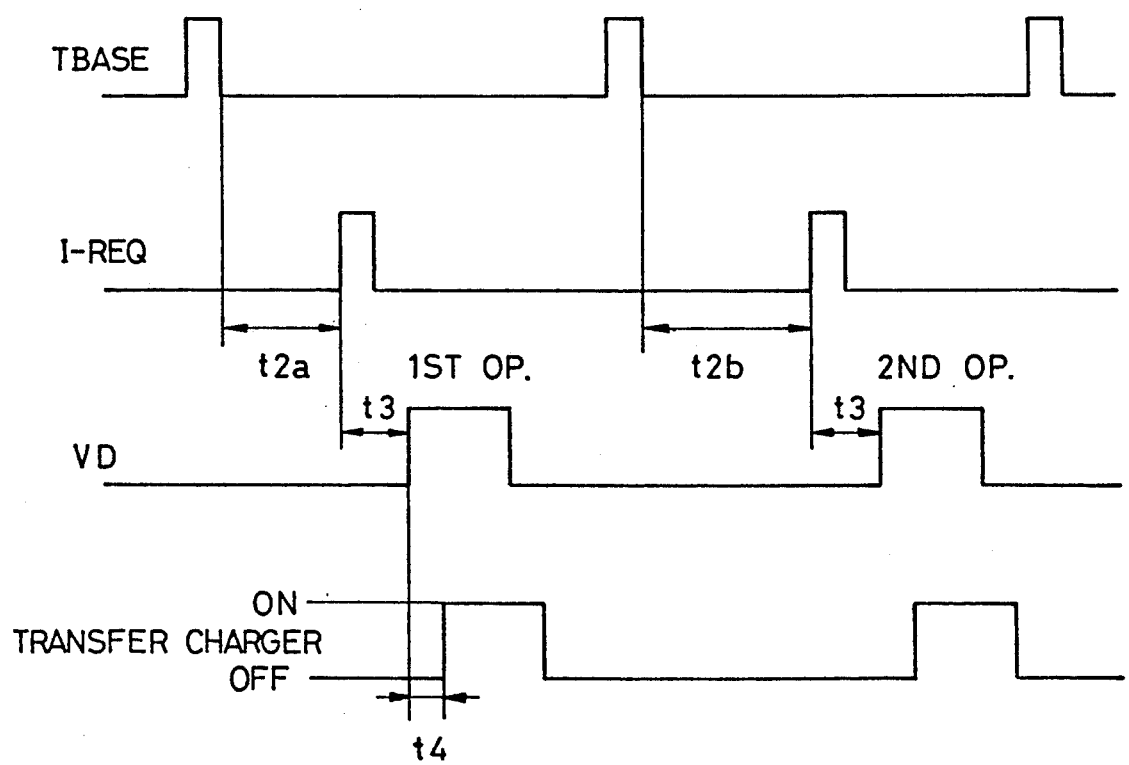

An operational time lag t4 of the transfer charger 14 with respect to the signal VD shown in FIG. 16(b) is caused by the movement of the image (latent image or toner image) on the photosensitive drum 4 to the transfer position, and it depends on the tangential speed of the drum 4.

Although the example of FIG. 16 is the case of copying one area of the original D onto two regions of a sheet of paper, this operational mode ca be applied to copy an original image GiB in the latter half area of the original D onto the former half region of paper and copy an original image GiA in the former half area of the original onto the latter half region of paper, for example, by moving the scanner 32 prior to the scanning operation.

(4) Conjunct Scale-Up Copy

Figure 17:
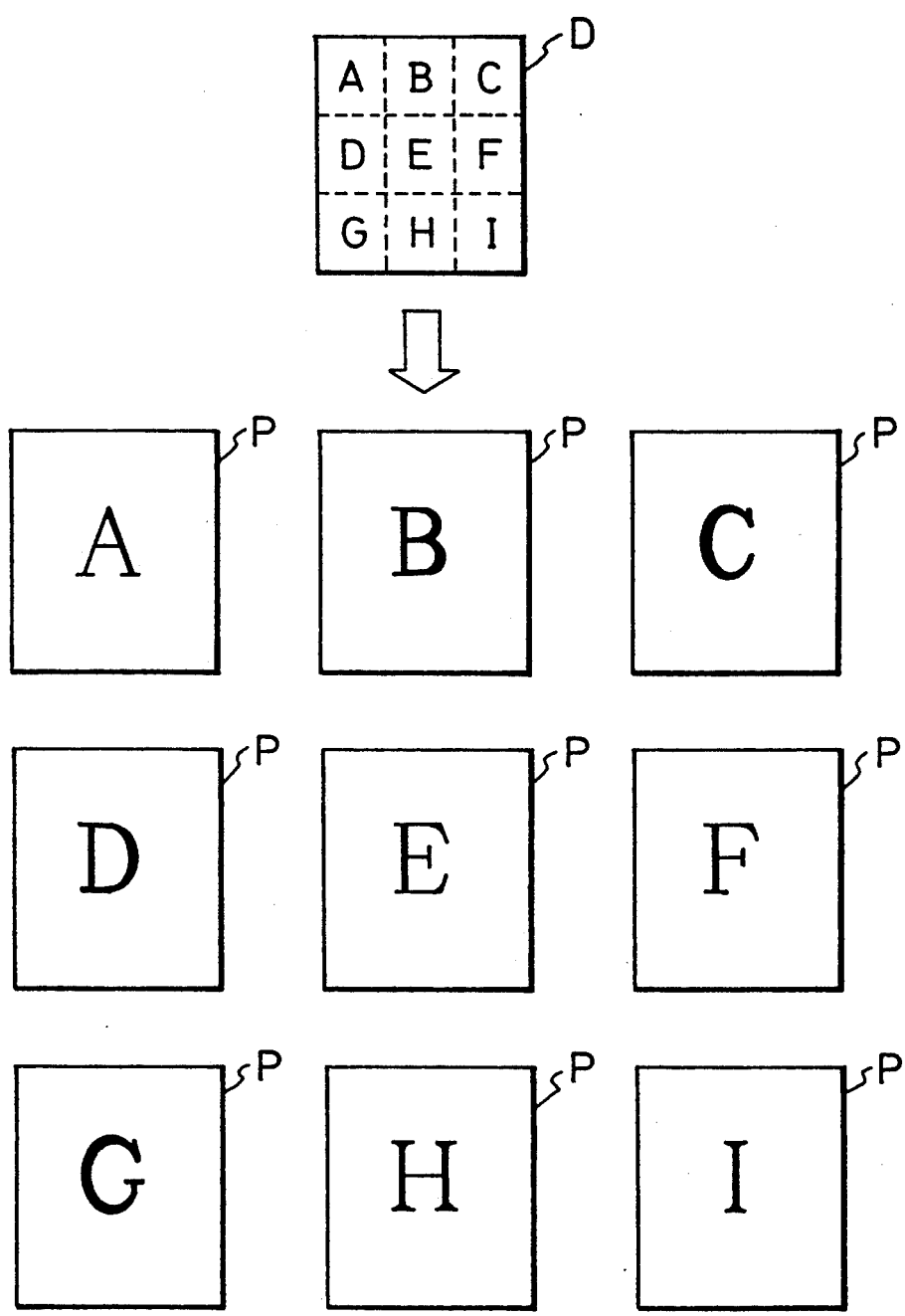
FIG. 17 is a diagram showing the basic idea of conjunct scale-up copy.

In the conjunct scale-up copy mode, an original image is divided into multiple areas and each area is copied onto a sheet of paper P by being enlarged as shown for example in FIG. 17. The term "original image" used here signifies the entire image within an original region which the operator intends to copy. An original image is generally of the entire original area D, or it can be of a partial original area when the original is trimmed.

Figure 18:
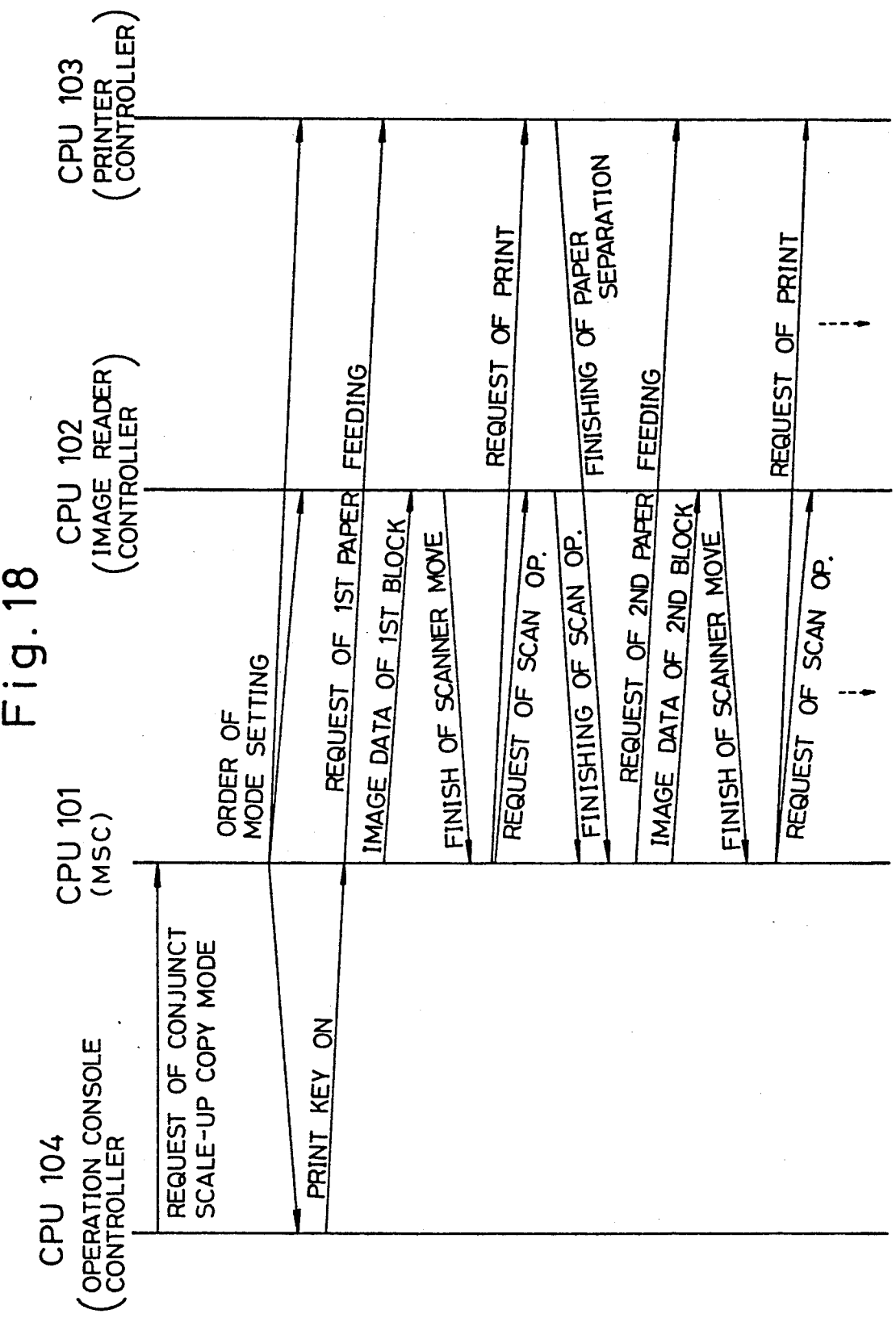
FIG. 18 is a diagram showing the procedure of communication among the CPUs which control the copy machine.

From the viewpoint of copy operation, conjunct scale-up copy is successive implementations of partial scale-up copy explained previously, with the copy area of an original D being switched for each operation. Accordingly, this copy mode is accomplished by setting values for the read start position data FST-POS and scanning start positions of the scanner 32. The sequential operation of the functional devices of the copy machine 1 in the conjunct scale-up copy mode is controlled totally by the CPU 101 (MSC) through th communication with other CPUs 102, 103 and 104 as shown in FIG. 18.

The following describes in detail the operation of each device along with the pertinent operator's actions.

Initially, the operator places an original, with the copy object facing downward, on the glass stage 31, and presses the IMAGE MONITOR key 72. The CPU 104 for controlling the operation panel 70 indicates the turn-on action of the key 72 to the CPU 101 (MSC), which then requests the CPU 102 of image reader section IR to have the image monitor scanning.

Receiving the request, the CPU 102 starts the scanning operation and delivery of image data VIDEO without waiting for the rotational position reference signal TBASE. At the same time, the CPU 104 and another CPU 103 of printer section PR carry out the process for displaying the original image on the display device 69 based on the image data VIDEO. Specifically, the CPU 103 produces extracted image data which matches the lower resolution of the display device 69 relative to the printed image, and the CPU 104 stores the extracted image data in the image memory 141.

The extracted image data is read out of the image memory 141 continuously and the original image is displayed on the display device 69. The CPU 104 makes access to the image memory 141 to overwrite operation guide marks on the display screen when necessary.

Figure 19:
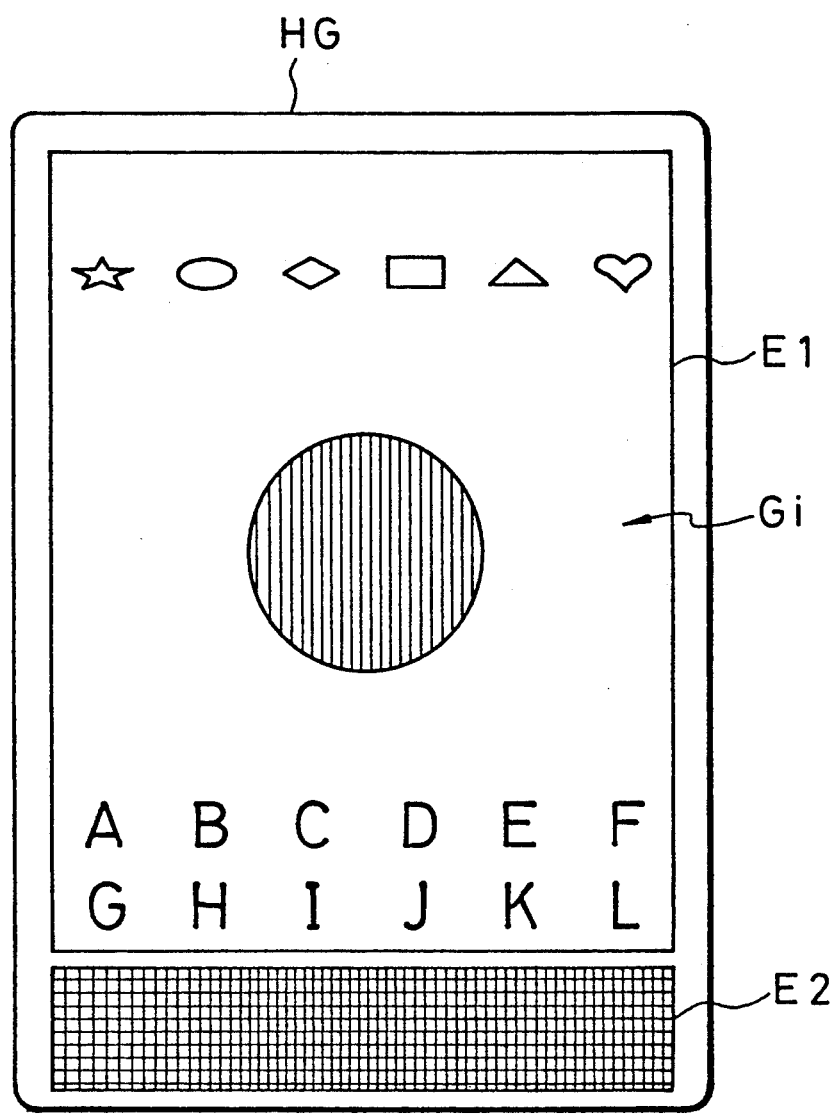
FIG. 19 is a diagram showing the screen layout of the display device and an example of original image.
Figure 20:
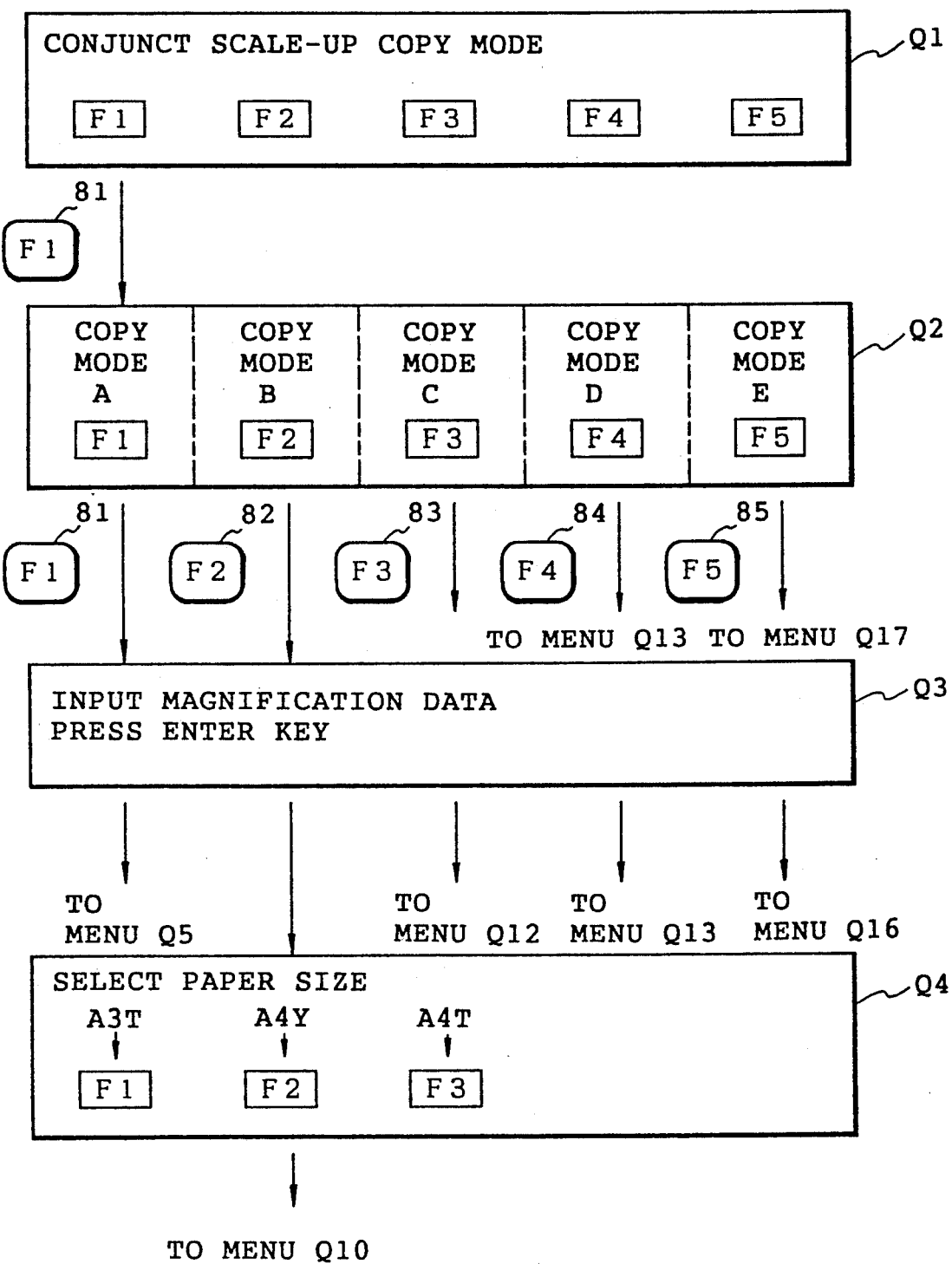
FIG. 20 is a diagram showing a menu area picture displayed on a display device and function keys on operational console in conjunct scale-up copy mode.

The display screen HG of the display device 69 has an image field E1 used to display an original image Gi and a menu field E2 used to display operational commands and messages as shown in FIG. 19. The menu field E2 displays various sets of items in relation with operator's actions as shown in FIG. 20 through FIG. 29. Initially, the menu field E2 displays a menu Q1 for specifying one of copy modes. The function keys 81–85 are used for selecting copy modes correspondingly, i.e., the function key (F1) 81 is to select the conjunct scale-up copy mode, and remaining function keys are for other copy modes.

When the operator presses the function key F1 to select the conjunct scale-up copy made, the menu Q1 is replaced with a menu Q2 for selecting one of various copy conditions of conjunct scale-up copy. With the selection menu Q2 being displayed, the function key F1 is used to select that the original image Gi (image area E1 of the screen) is divided by being centered at a specified point (it is "called conjunct scale-up copy mode A"). The function key F2 is used to select that the original image Gi is divided such that a specified rectangular area is included (it is called "conjunct scale-up copy mode B"). The function key F3 is used to select the basic conjunct scale-up copy (it is called "conjunct scale-up copy mode C"). The function key F4 is used to select that among divided areas (will be termed "blocks") of the original image Gi, blocks smaller than a specified proportion of a base size are excluded from copying (it is called "conjunct scale-up copy mode D"). The function key F5 is used to select that the original image Gi is divided in accordance with the paper size (it is called "conjunct scale-up copy mode E").

(4.1) Conjunct Scale-Up Copy Mode A

This copy mode is useful to copy an intended portion of the image Gi at the center of the paper P.

(4.1.1) Setting of Copy Conditions

Figure 21:
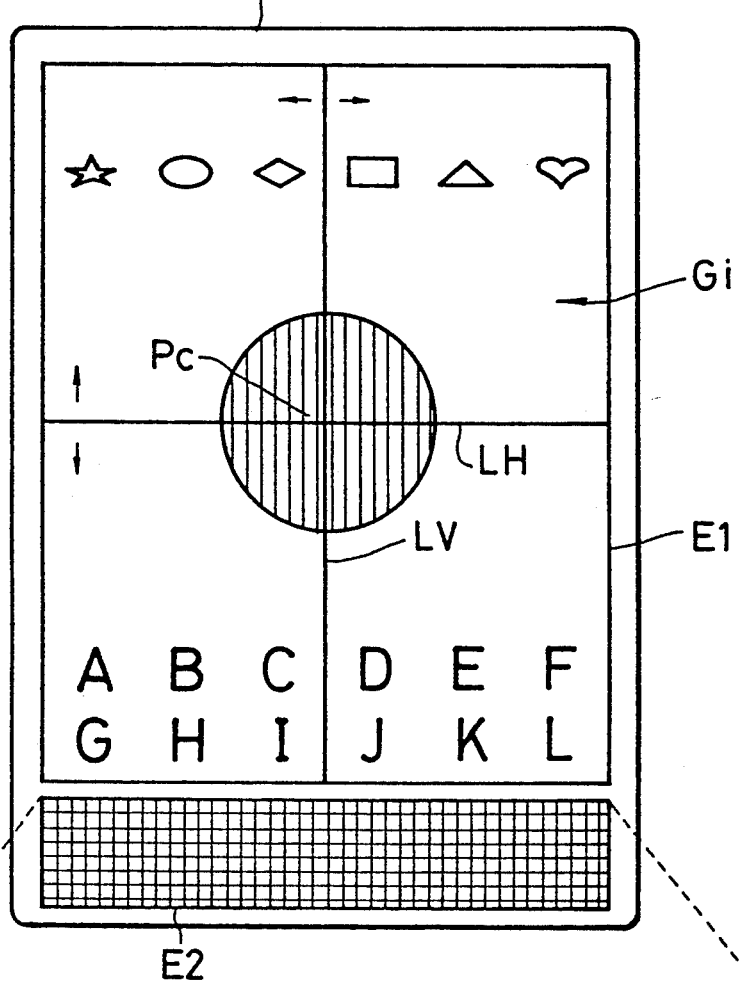
FIG. 21 is a diagram showing a picture displayed on a display device in copy mode A.

The operator selects the conjunct scale-up copy mode A, and a message of menu Q3 is displayed. By following the message of menu Q3, the operator enters an intended magnification with the ten-key set 73 and presses the ENTER key 86. Consequently, another message of menu Q5 appears in the menu field E2 and a vertical line LV and horizontal line LH used for the specification of position are drawn over the original image Gi, as shown in FIG. 21. These lines LV and LH move horizontally and vertically in response to the operation of the tracking ball 88. The operator moves the lines so that their intersection coincides with the intended central point Pc of division, and then presses the ENTER key 86.

Subsequently, the menu field E2 displays a menu Q6 for selecting copy paper. Possible kinds of copy paper available in the paper cassettes 42 43 and 44 are A3T A4Y and A4T, respectively, in this embodiment. The A3T paper and A4T paper are A3-sized and A4-sized copy paper having their longer sides oriented in parallel to the paper feed direction, and the A4Y paper is A4-sized paper having its shorter side parallel to the paper feed direction. The operator specifies the largest paper A3Y, for example, and the CPU 104 divides the original image Gi into multiple blocks in accordance with the specified division center point Pc and magnification.

Figure 30:
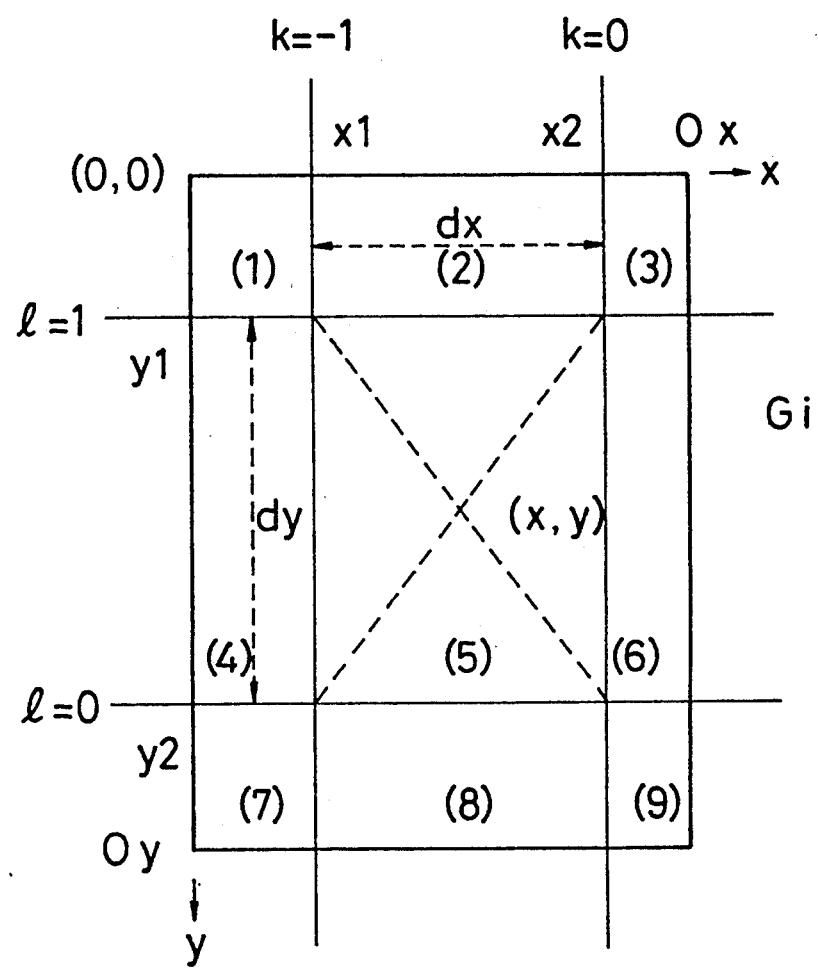
FIG. 30 is a diagram showing the method of division of an original based on copy mode A of conjunct scale-up copy.
Figure 31:
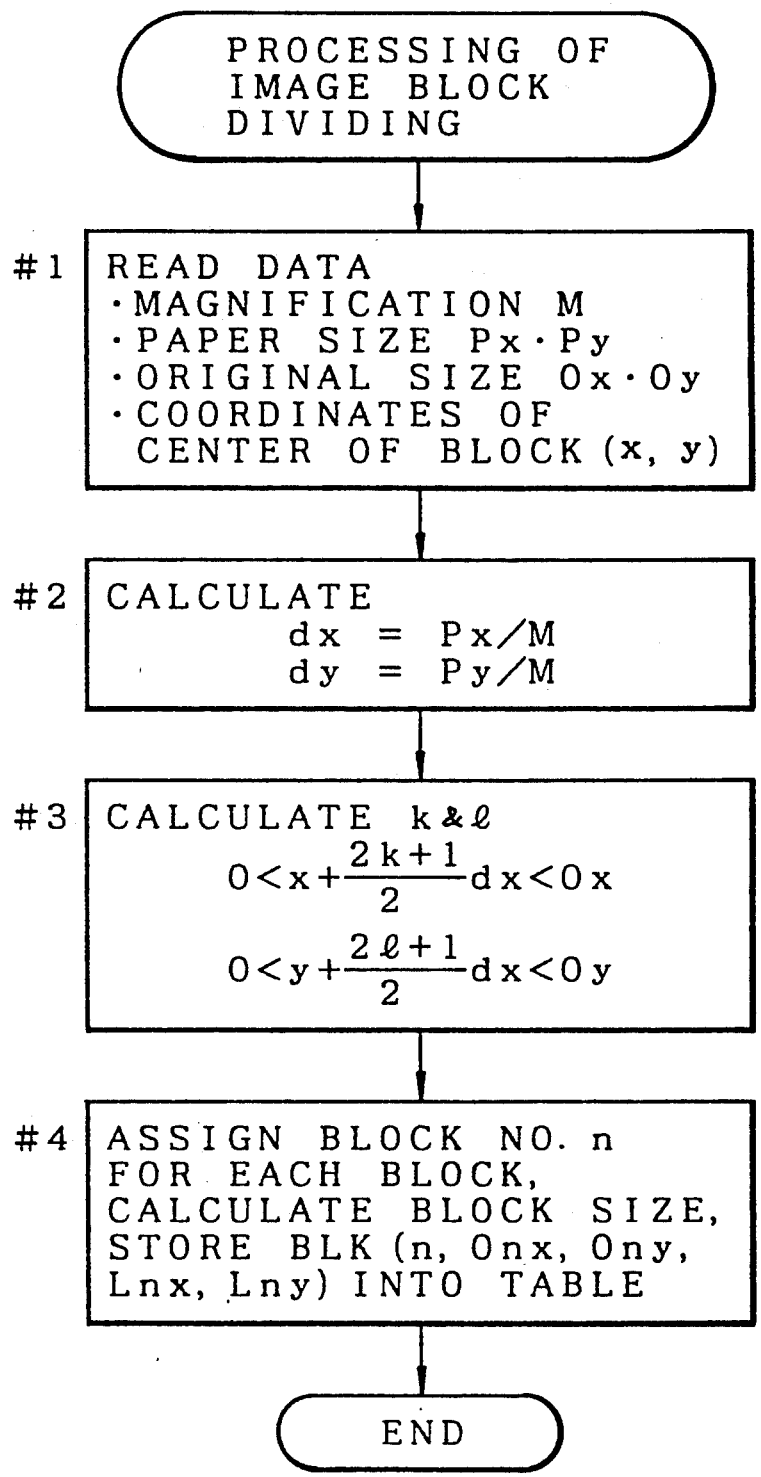
FIG. 31 is a flowchart of the original division process pertinent to FIG. 30.

FIG. 30 is a diagram showing the method of block division, FIG. 31 is a flowchart Of the block division process, and FIG. 32 is a diagram showing the contents of the block information table TBLK. In the area division process, a block having a largest size which can be copied onto a sheet of paper of the specified size (this largest size is called "division base size" and the block of this size is called "base block") is laid out so that the block center coincides with the division center point Pc. Namely, part of the image field E1 is assigned to the base block. Subsequently, the image field E1 is divided vertically and horizontally such that blocks of the same size as the base block are placed around the base block. This process is carried out in steps #1 through #4 on the flowchart of FIG. 31.

The division base size is determined uniquely from the paper size and magnification. All blocks do not necessarily have the same size due to the relation between the division base size and original size. A corner point of the original image Gi is designated to be the division center point Pc. If the center of base block and the division center point Pc cannot be made coincident, the base block is laid out so that its center is as close as possible to the division center point Pc. In this case, at least one side of the base block coincides with part of the edge of the image field E1.

Figure 22:
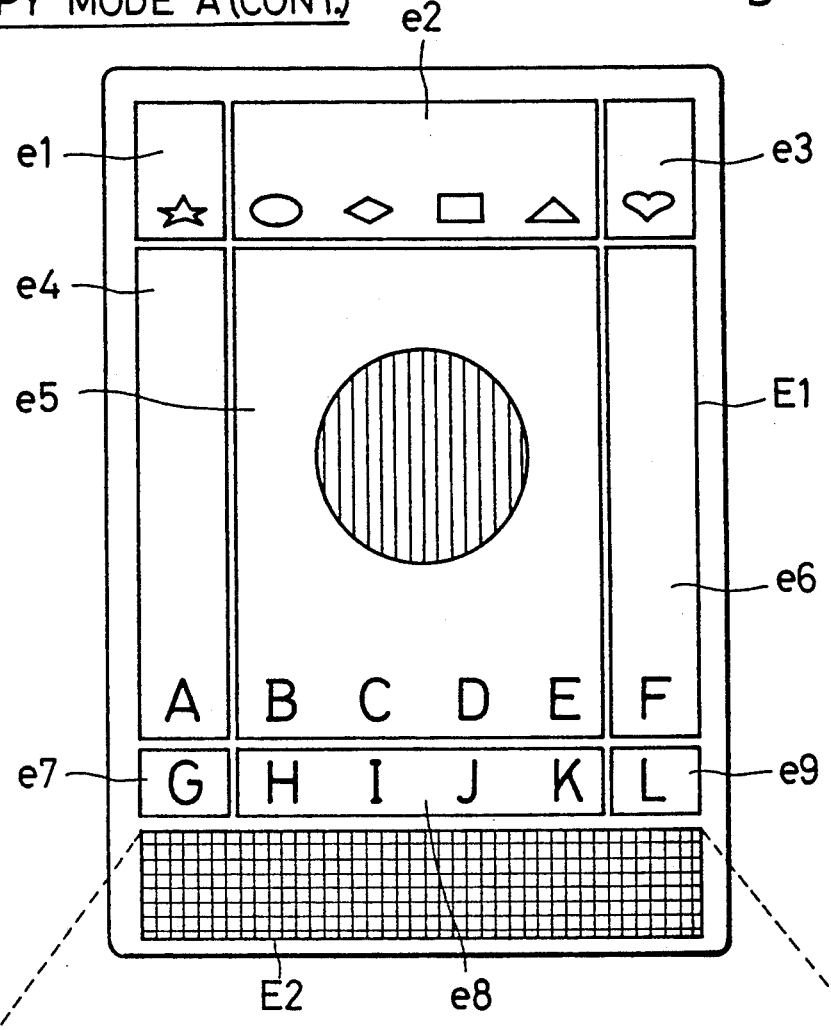
FIG. 22 is a diagram showing a picture displayed on a display device in copy mode A (cont.)

Following the area division process, the CPU 104 writes data to the image memory 141, and the divided original image and a menu Q7 of paper specification are displayed as shown in FIG. 22. In the example of FIG. 22, the original image Gi is divided into nine blocks e1–e9 of several sizes inclusive of the base block e5. Basically, each of these blocks e1–e9 is copied onto a separate sheet of paper of the specified size, although the copy machine 1 has a copy mode of using small paper for a block smaller than the base size (this block is called "small block") and a copy mode of using a sheet of paper for copying multiple small blocks.

The operator presses one of the keys F1-F3 to specify one of three copy modes concerning the specification of paper in response to the menu Q7, and next specifies the order of copy of the blocks e1–e9. The order of copy will be explained later.

The setting operation for the conjunct scale-up copy mode A is now completed, and the operator presses the PRINT key 71 in response to a menu Q9. Then, the copy operation in conjunct scale-up copy mode A begins.

(4.1.2) Copy Operation

In the case of using copy paper of only one size, the copy operation is controlled distinctively as follows. The CPU 101 responds to the turn-on action of PRINT key 71 to request the CPU 103 to feed copy paper as shown in FIG. 18. The paper size requested by the CPU 101 is the one entered in accordance with the menu Q6. On completion of a series of processes for printing, development, transfer and fixing, the CPU 103 delivers the copied paper P immediately by retaining the guide nail 53 directing to the delivery tray 49, instead of transporting the paper P to the midway tray 50.

Figure 54:
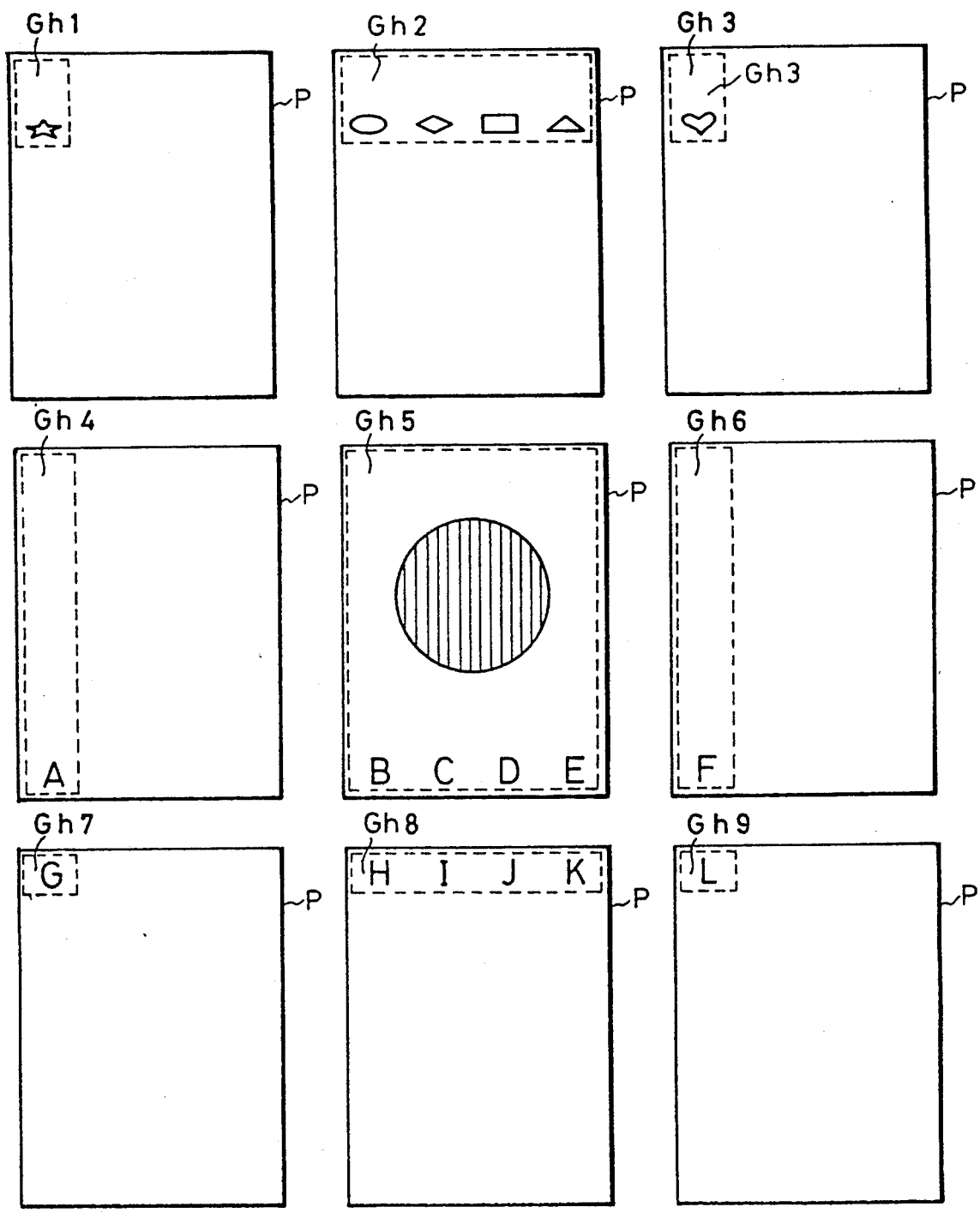
FIG. 54 is a diagram showing examples of copied images in conjunct scale-up copy.
Figure 56A:
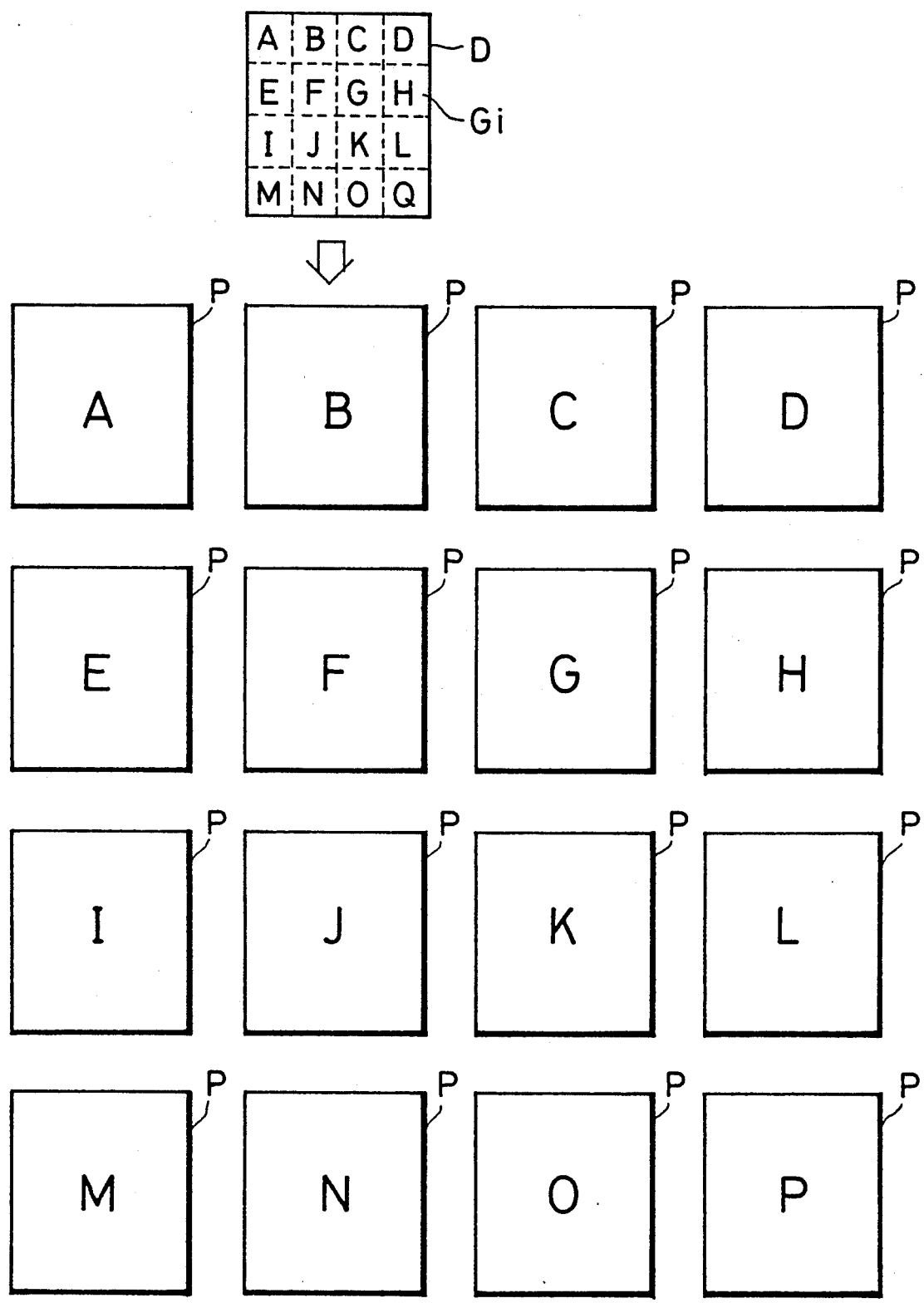
FIG. 56(a), FIG. 56(b) and FIG. 56(c) are diagrams showing the order of copy operation based on the conventional copy machines.
Figure 56B:
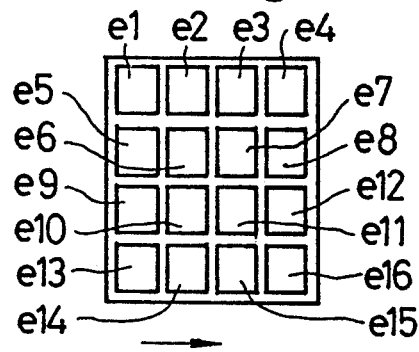
Figure 56C:
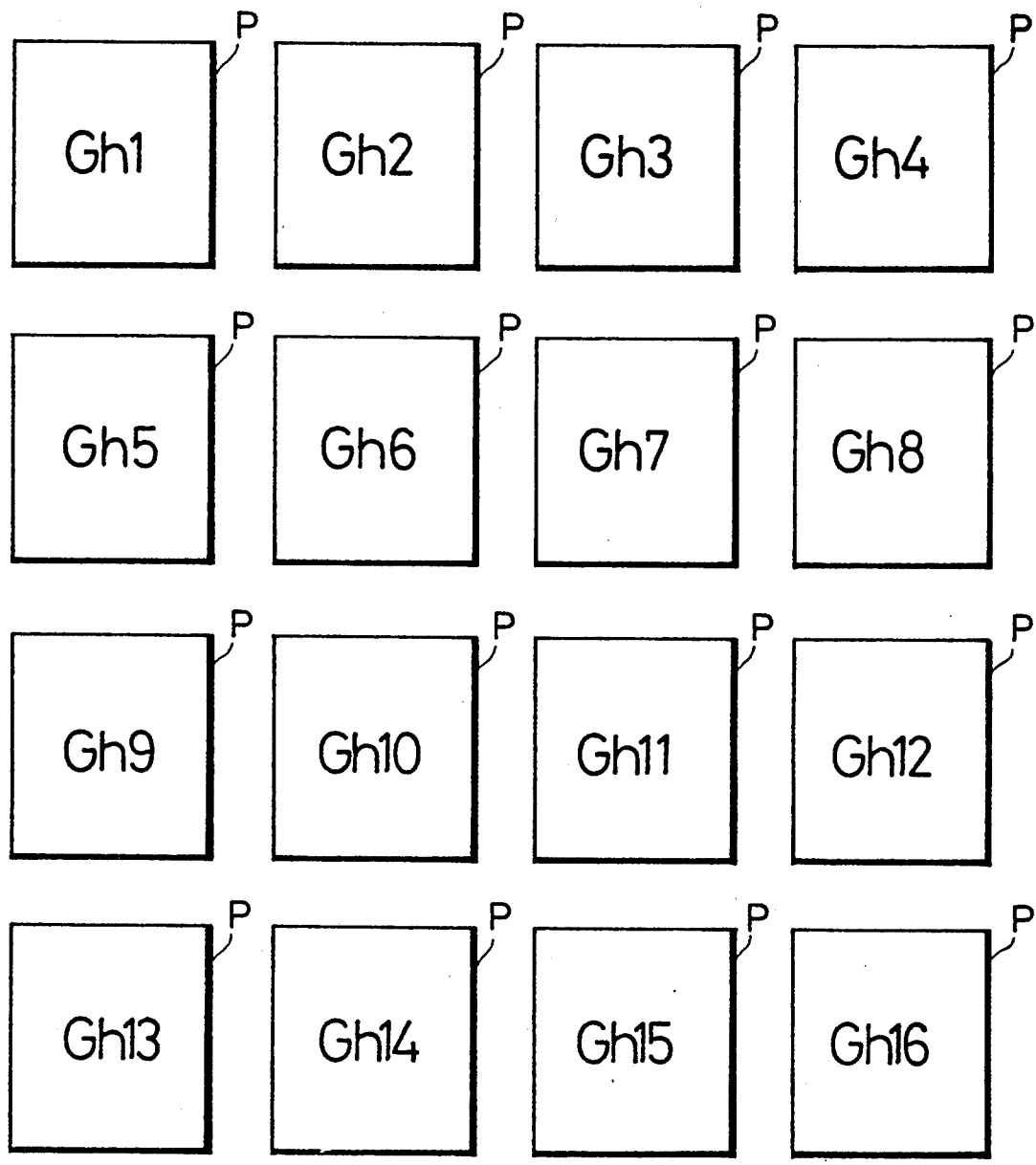

Based on these control rules, partial copied images Gh1–Gh9 for the blocks e1–e9 in FIG. 22 are formed on nine sheets of paper P sequentially starting at the top-left corner section of the original, as shown in FIG. 54. However, each partial copied image may not be located in the appropriate position on the paper for producing a complete copied image by laying out all sheets of copied paper. Therefore, the copy machine 1 has an additional control rule, which states: if a block, e.g., e1, which is a division of an original image Gi has a neighboring block, the corresponding partial copied image, i.e., Gh1, is formed by being justified to the copy of the neighboring block.

Figure 33:
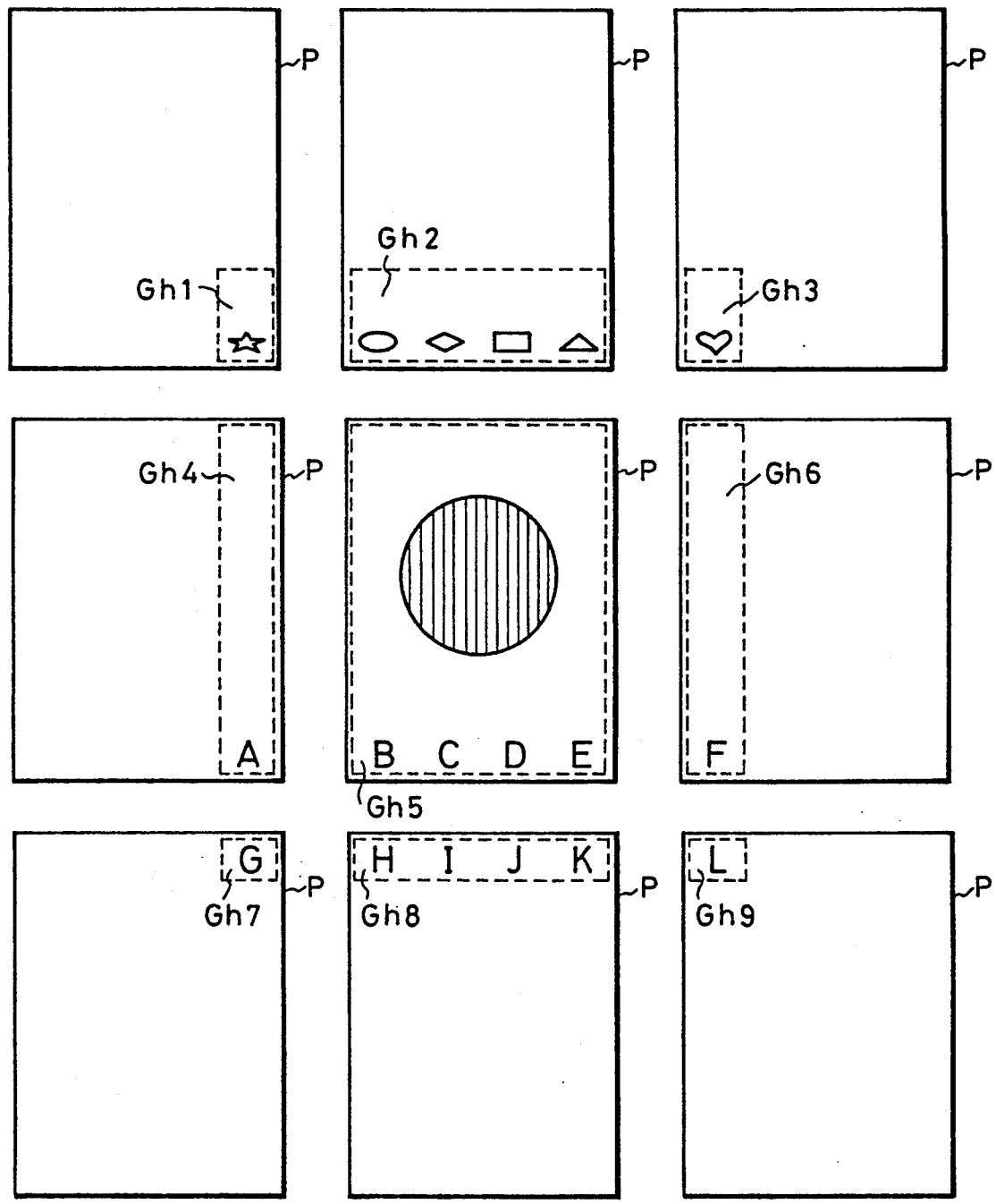
FIG. 33 is a diagram showing an example of conjunct scale-up copy using only copy paper of the one size.
Figure 34:
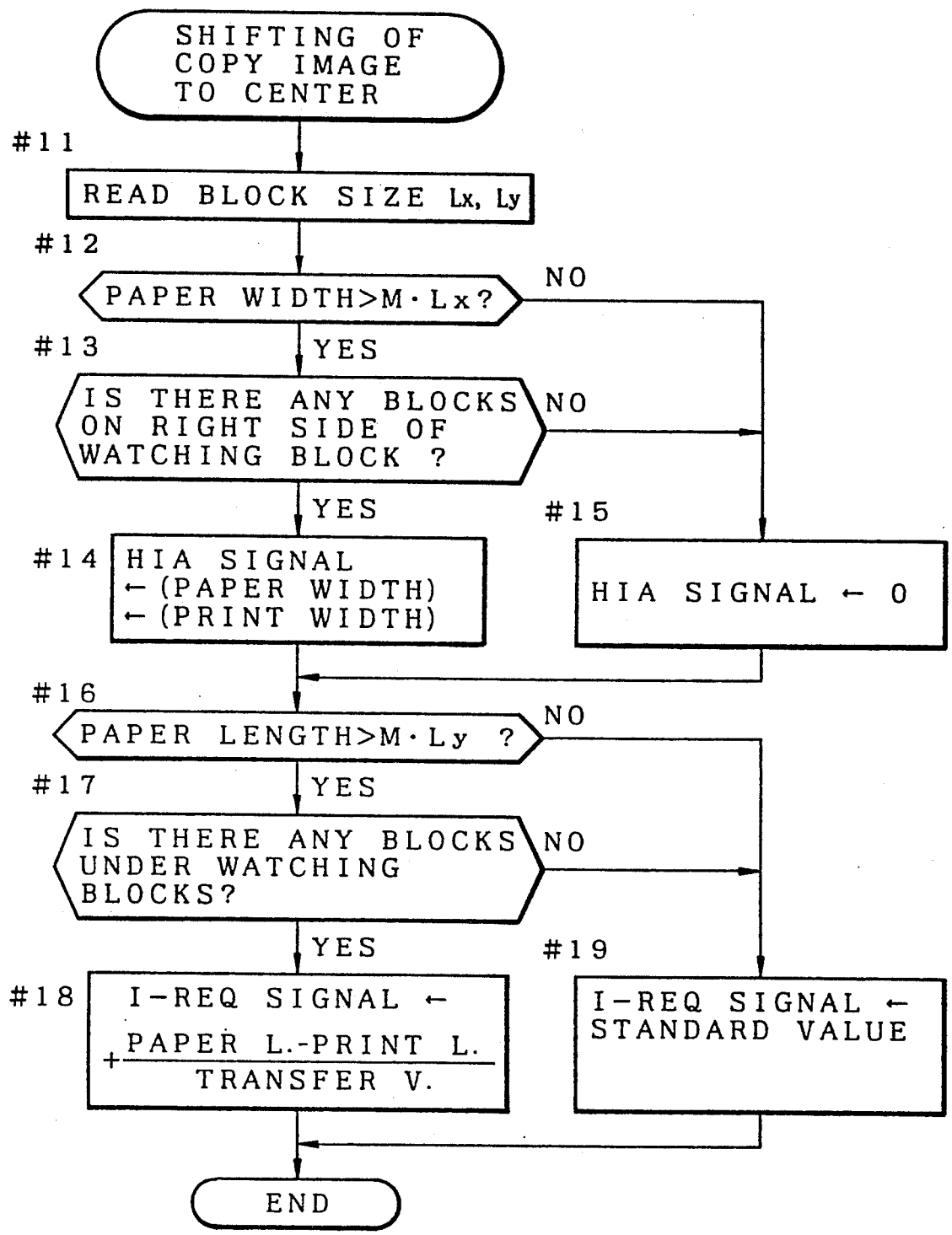
FIG. 34 is a flowchart of the CPU operation pertinent to FIG. 33.

FIG. 33 is a diagram showing an example of conjunct scale-up copy using paper of only one size, and FIG. 34 is a flowchart showing the operation of the CPU 101 pertinent to FIG. 33. In this example, partial copied images Gh1–Gh9 for the blocks e1–e9 of the original image Gi shown in FIG. 22 are positioned on sheets of paper so that the partial images produce a continuous whole image when nine sheets of copied paper are laid out in a 3-column by 3-row array. The processing steps #11–#19 of FIG. 34 are apparent from the above description and the explanation is omitted.

Figure 35:
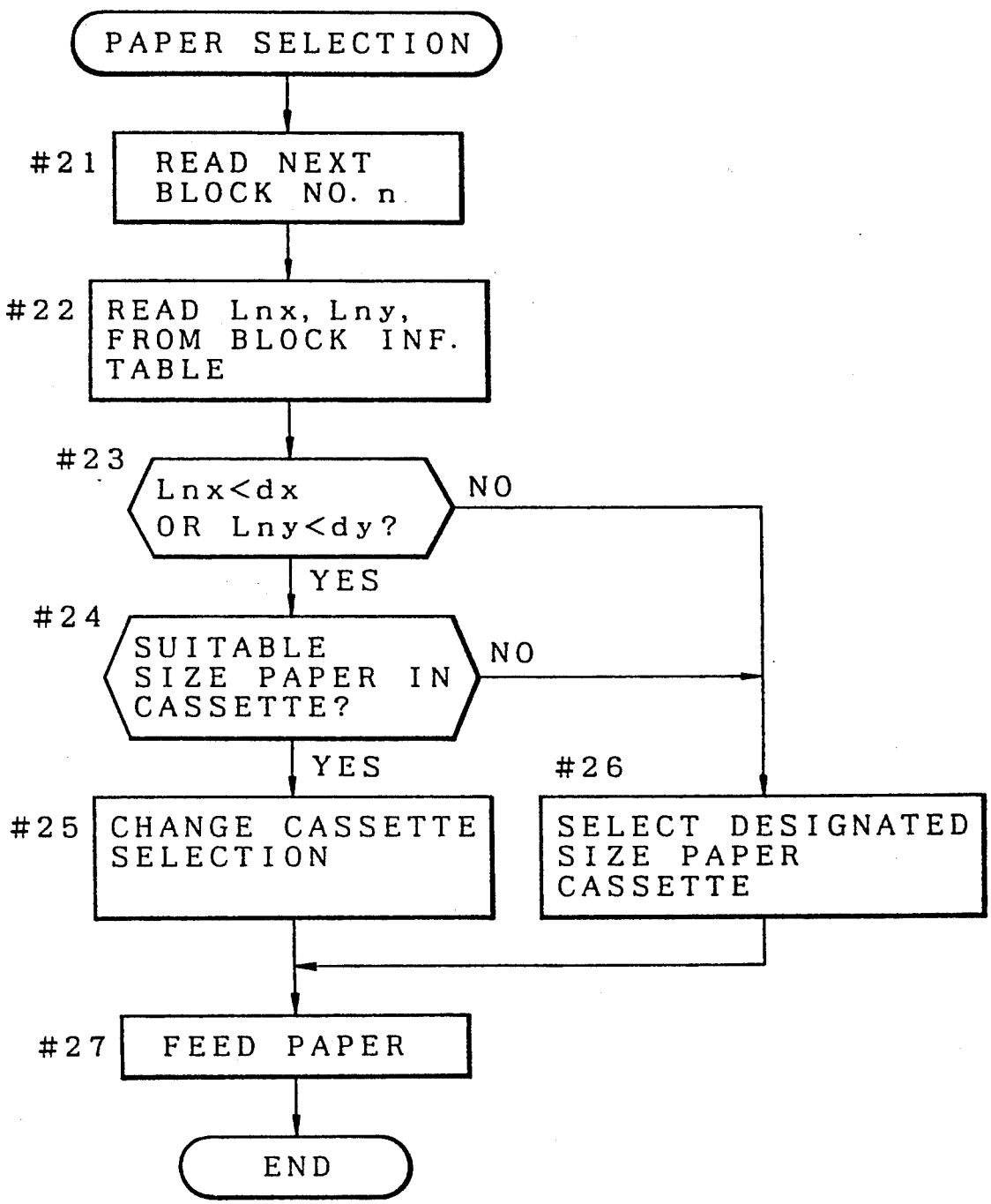
FIG. 35 is a flowchart of the paper selecting process.

In the case of using copy paper of different sizes, the copy operation is controlled distinctively as follows. The CPU 101 requests the CPU 103 to feed a sheet of copy paper P of as small in size as possible to copy a corresponding block. On the flowchart of FIG. 35, the CPU 101 receives the block number of the next copy object (step #21), and reads the size information (Lx, Ly) of the block from the block information table TBLK shown in FIG. 32 (step #22).

The CPU 101 compares the block size with the division base size (step #23). In case the block size is smaller than the division base size, the CPU checks whether or not copy paper P which meets the block size is available in any of the paper cassettes 42-44 (step #24). If proper paper P is found, the CPU alters the setting of selection of paper cassette (step #25), and instructs the CPU 103 of printer section PR to feed paper (step #27). In case the block size is the same as the division base size, the CPU 103 feeds paper P of specified sizes from the respective paper cassettes 42-44 sequentially (steps #26, #27). The CPU 103 does not transport copied paper to the midway tray 50 in this case either.

Figure 36:
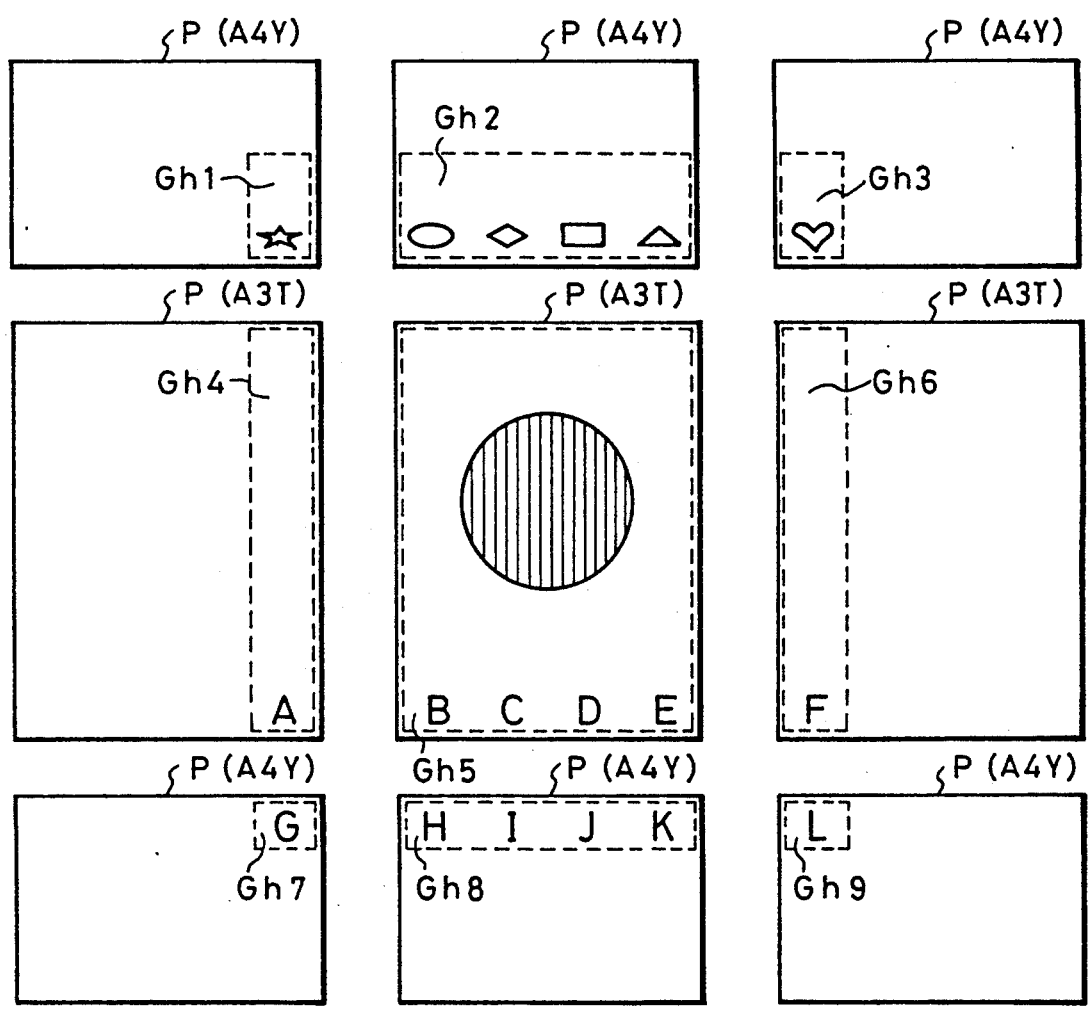
FIG. 36 is a diagram showing an example of conjunct scale up copy using copy paper sized to meet individual original areas.

FIG. 36 shows an example of conjunct scale-up copy using sheets of paper sized to match individual blocks of original image. Each paper size is indicated in parentheses. In the example of FIG. 36, partial copied images Gh4-Gh6 are formed on sheets of A3T paper and remaining partial copied images Gh1-Gh3 and Gh7-Gh9 are formed on sheets of A3T paper. As compared with the example of FIG. 33, six out of nine sheets of A3-sized paper are replaced with A4-sized paper, and the consumption of paper is reduced by the amount of 1.5 sheets of A3-sized paper.

The control rule of justifying a copied image to the neighboring image is also applied in this case. Although the above example uses copy paper of two sizes, paper of three sizes or more may be used in some cases.

In the case of forming multiple copied images on one sheet of paper, the copy operation is controlled distinctively as follows. The CPU 101 requests the CPU 103 to feed copy paper P as small as possible to copy all blocks e1-e9 of various sizes. Since the original division process takes place based on the paper size specified by the operator, the maximum paper size which could be requested by the CPU 101 is the one specified by the operator.

The CPU 103 feeds copy paper of the specified sizes in a proper order. On completion of one block, if the copied paper still has an unused blank space of a certain size or larger, the CPU 103 holds the paper in the midway tray 50 so that it is used gain, instead of delivering it immediately.

Figure 37:
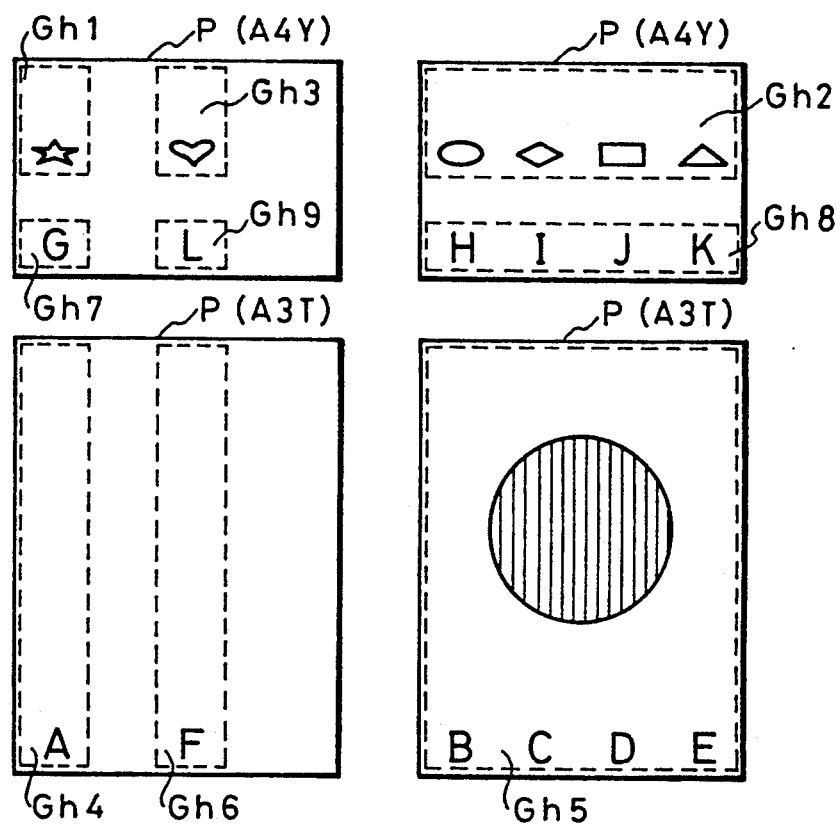
FIG. 37 is a diagram showing an example of conjunct scale-up copy in which multiple copied images are produced on a sheet of paper.
Figure 38:
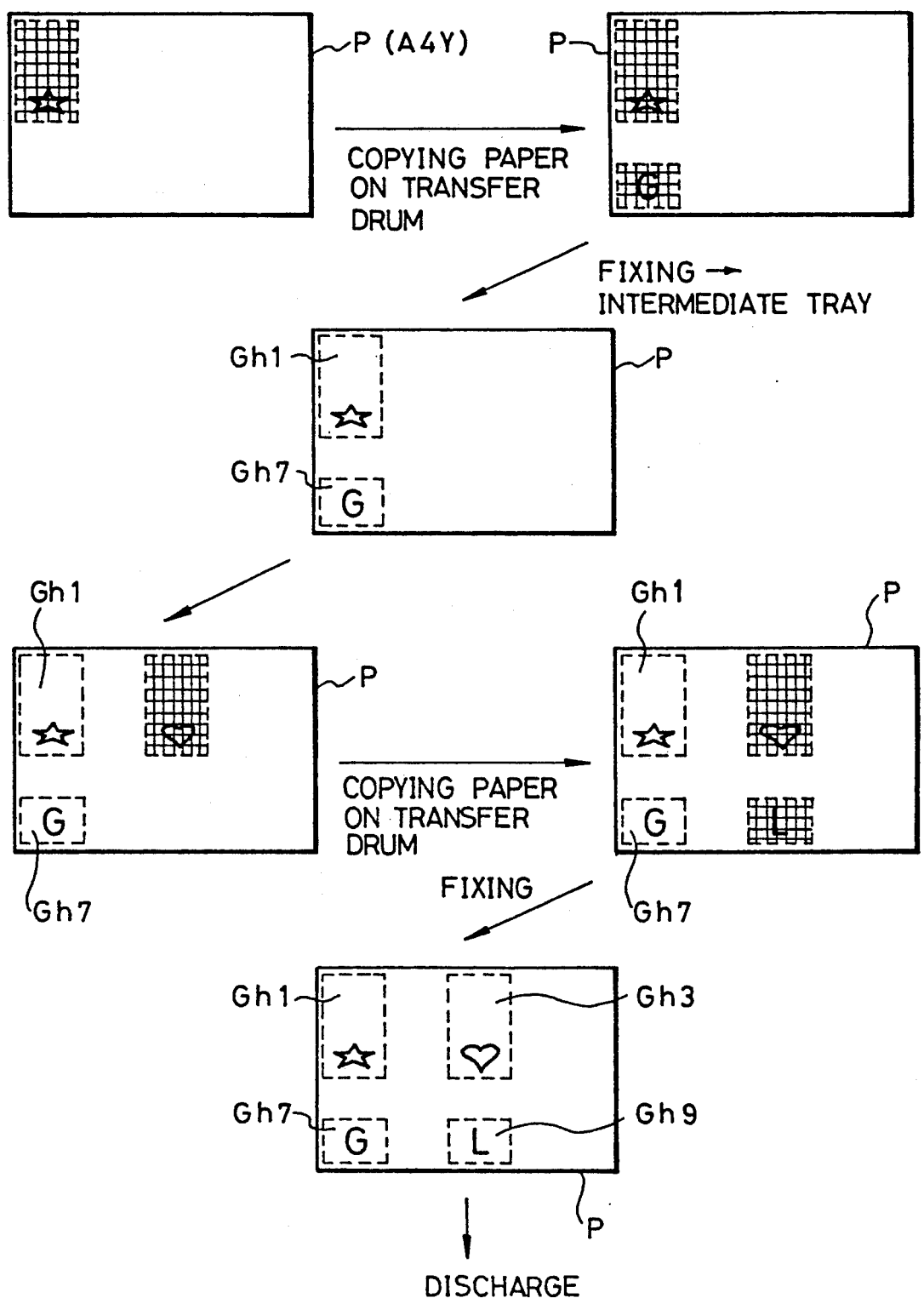
FIG. 38 is a diagram showing part of the copy process.
Figure 39:
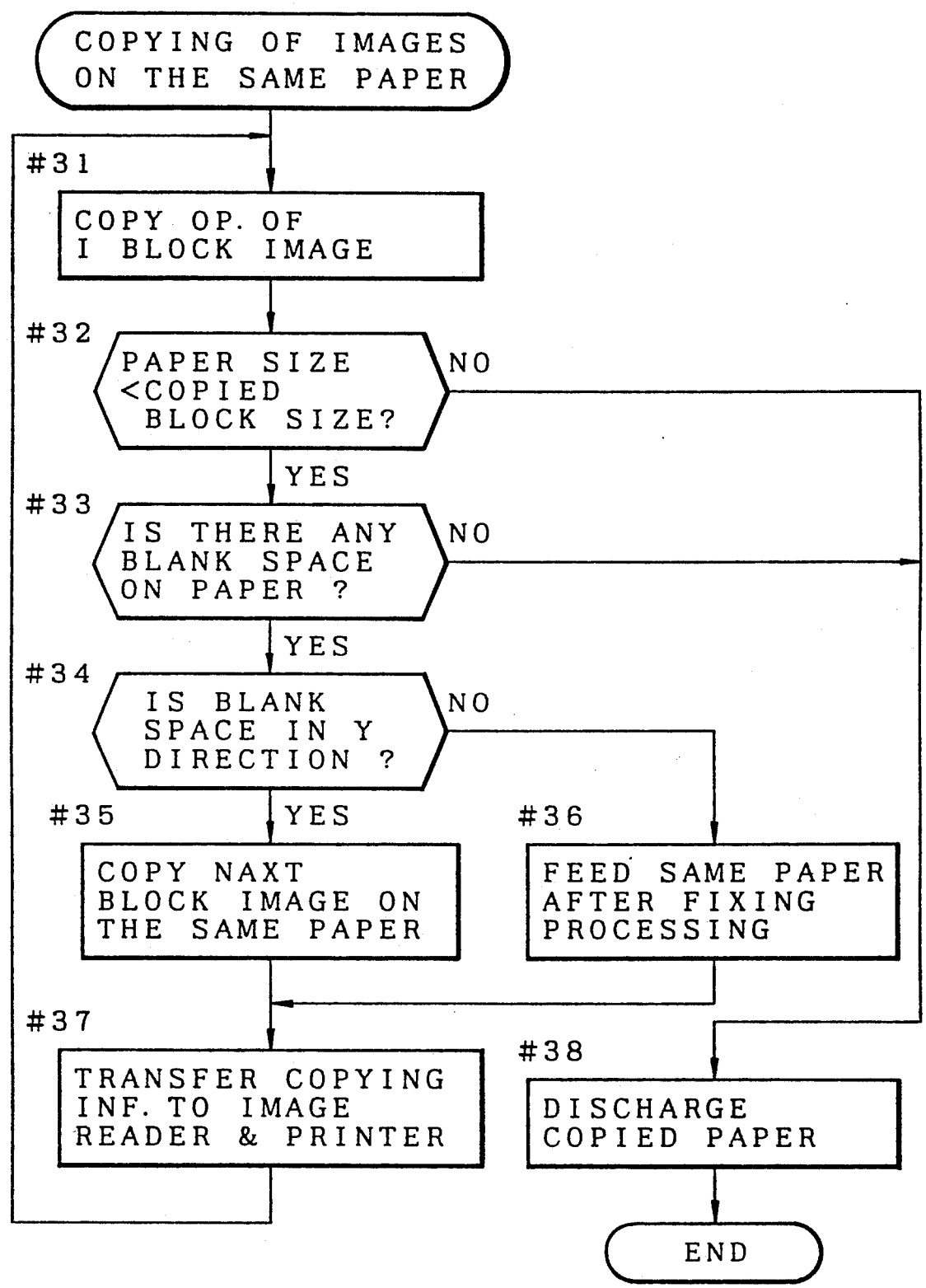
FIG. 39 is a flowchart of the CPU operation pertinent to FIG. 37.

FIG. 37 is a diagram showing an example of conjunct scale-up copy for forming multiple copied images on a sheet of paper, FIG. 38 is a diagram showing part of the copy operation, and FIG. 39 is a flowchart of the operation of CPU 101. In FIG. 38, shaded portions indicate toner images before the fixing process. The example of FIG. 37 uses only two sheets of A3T paper and two sheets of A4Y paper, saving paper by the amount of six sheets of A3-sized paper.

On the flowchart of FIG. 39, the CPU 101 instructs the CPU 103 to copy a block of an original image (step #31). If the size of the copied paper is larger than the size of copied image, the CPU 101 checks whether or not any block which can be copied in the unused blank space is left unprocessed (steps #32, #33). If such a small blank space is found, the CPU 101 checks whether or not the blank space is located next to the copied image (toner image) along the subsidiary scanning direction (y direction) (step #34). If the condition of step #34 is met, the CPU 101 instructs the CPU 103 to start the copy operation of the next block, with the paper P being left wound on the transfer drum 10, or otherwise if the condition of step #34 is negated, the CPU 101 instructs the CPU 103 to feed another paper (steps #35, #36).

After that, the CPU 101 sends information on the scanning range and print position to the CPU 102 and CPU 103 (step #37), and the sequence returns to step #31.

If more than one copied image cannot be formed on the paper, i.e., when the step #32 is negated, the CPU 101 instructs the CPU 103 to deliver the copied paper on which one block has been copied (step #38).

Figure 40A:
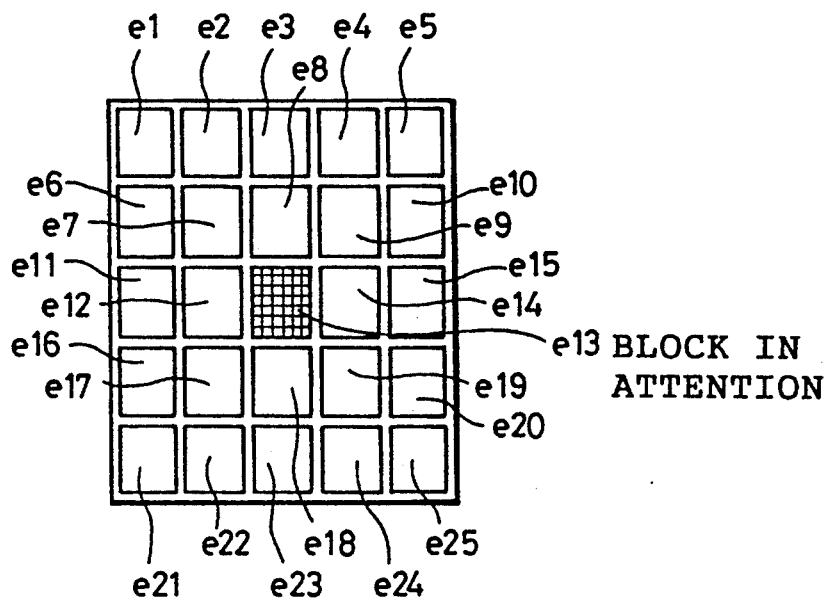
FIG. 40(a), FIG. 40(b) and FIG. 40(c) are diagrams used to explain the order of copy of divided areas in the conjunct scale-up copy operation.

In the conjunct scale-up copy mode, when an original image Gi is divided into a large number of blocks due to the relation between the magnification and the copy paper size, it takes a relatively long time to copy all blocks and therefore the order of copy of these blocks is meaningful. For example, an original image Gi on an original D is copied by being divided into 25 blocks e1-e25 of a 5-column by 5-row array as shown in FIG. 40(a), with attention being paid to the block b13 (indicated by shading) located at the division center point Pc (see FIG. 21) for the assessment of the reproduced color.

In the usual copy control (the copy mode selected by the key F1 in response to the menu Q8 in FIG. 22), the copy operation takes place in the descending order of block number from e1 to e25 in the same order as the scanning of original from left to right on a row and from top to bottom in the block array. Accordingly, the block e13 in attention is copied at the 13th operation. In this case, the operator may have to abort the conjunct scale-up copy operation by using the STOP key 75 depending on the result of assessment, and therefore it is desirable to get the copy of e13 in attention as fast as possible from the viewpoint of saving paper, toner and time.

For dealing with this matter, the copy machine 1 allows the operator to prioritize a specific block for the copy order on menu Q8. When the operator selects this priority copy function, the CPU 101 instructs the CPU 102 and CPU 103 to carry out one of the following two copy schedules (schedule A and schedule B). As a preliminary operation, the CPU 101 modifies the block information table TBLK by renumbering the block number, which signifies the copy order, for block data sets including the block position and size.

Figure 40B:
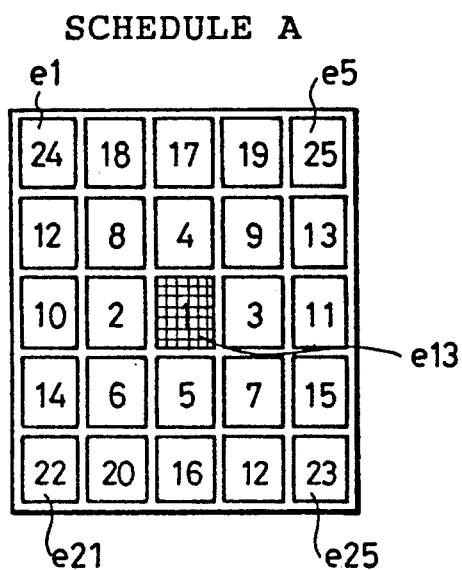
Figure 41:
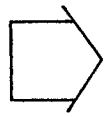
FIG. 41 is a diagram showing an example of data alteration in the block information table.

FIG. 41 shows block data before and after the renumbering operation for the schedule A. As shown in FIG. 40(b), indicating the copy order in number, the block e13 in attention is designated as the starting block, and thereafter copy numbers are distributed along the radial direction from the central block e13 toward outer blocks. The copy order of this example is: e13→e14-→e8→e18→e17  e19→e7→e9→e11→e15→e6→e10-→e16 →e20→e23→e3→e2→e4→e22→e24→e21→e25-→e1→e5.

Figure 40C:
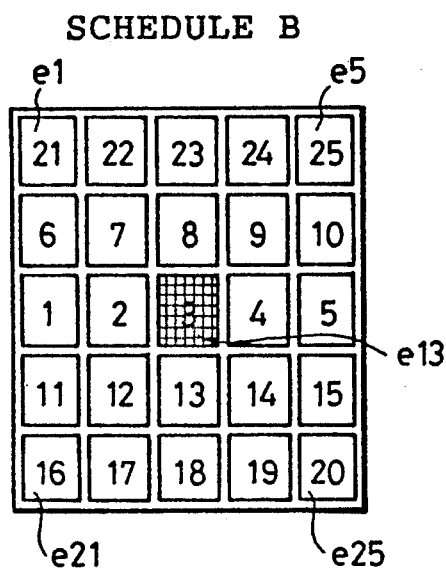

In the case of the schedule B, as shown in FIG. 40(c), the copy order is determined for rows of blocks. The row including the block e13 is designated as the starting row, and it is followed by rows in the incremental order of distances from the starting row. The copy order of this example is: e11→e12→e13→e14→e15→e6→e7-→e8→e9→e10→e16→e17→e18→e19→e20→e21-→e22→e23 →e24→e25→e1→e2→e3→e4→e5.

The schedule A is advantageous for the assessment of copy quality for the block in attention, which is copied at the beginning, at the expense of operator's arduous work for arranging a large number of delivered copies properly in correspondence to the image Gi. In contrast, the schedule B allows the operator to arrange copied paper easily in exchange for some delay of delivery of the block in attention. The operator can set the schedule A or B on the option setting DIP switch (not shown) in the copy machine 1 to meet the utilization of the machine.

(5.2) Conjunct Scale-Up Copy Mode B

This copy mode is useful to copy an original image Gi of the case where a certain portion of the image must not be divided.

(4.2.1) Setting of Copy Conditions

Returning to FIG. 20, the message of menu Q3 is followed in this mode by a menu Q4 of paper specification. The operator selects one.

Subsequently, messages of menus Q10 and Q11 shown in FIG. 24 appear sequentially to prompt the specification of a rectangular area. The operator responds to these messages sequentially to specify two diagonal points of an intended rectangular area by using the tracking ball 88.

The CPU 104 divides the original image Gi into multiple blocks such that the image portion of the specified area is not divided, and displays the divided original image in the image field E1. In the division process, the base block is placed so that the block center coincides with the center of the rectangular area and the image field E1 is divided vertically and horizontally such that blocks are disposed around the base block to share their sides with the base block as shown in FIG. 22.

The subsequent operator's actions on the menus Q7, Q8 and Q9 and the operation of CPU 101 are identical to those of the conjunct scale-up copy mode A, and the explanation thereof is not repeated.

(4.3) Conjunct Scale-Up Copy Mode C

(4.3.1) Setting of Copy Conditions

After the operator has selected the conjunct scale-up copy C mode and set the magnification in response to the message of menu Q3, the CPU 104 of the operation panel 70 divides the original image Gi based on the magnification such that copy paper needed is as few as possible. The largest size of copy paper available in the machine is set to be the base of division, and the division process takes place sequentially beginning at a corner of the image Gi.

Figure 25:
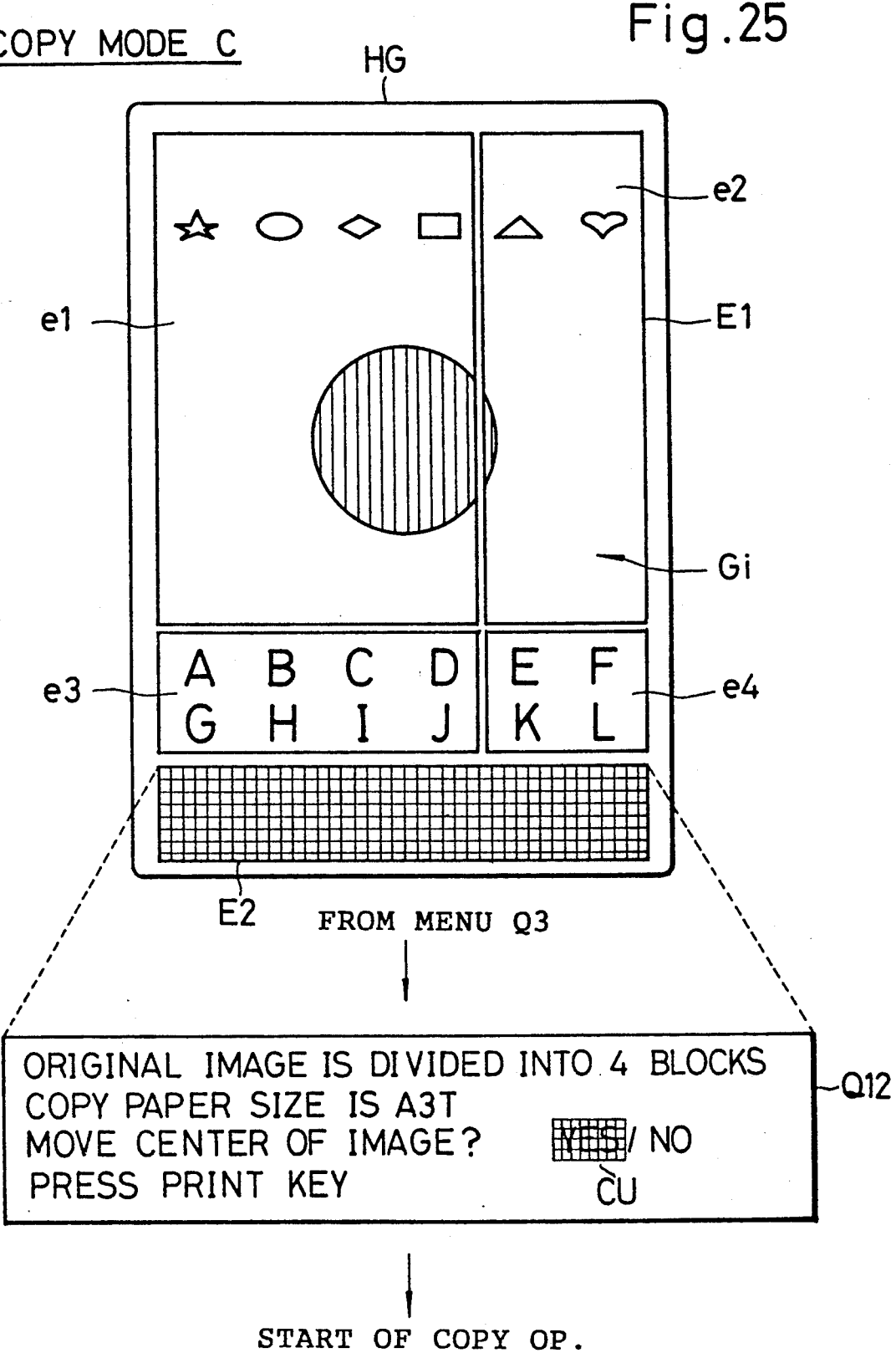
FIG. 25 is a diagram showing a picture displayed on a display device in copy mode C.

On completion of division process, the CPU 104 switches the menu field E2 to display a message of menu Q12 and displays the divided original image in the image field E1, as shown in FIG. 25. In the example of FIG. 25, the image Gi is divided into four blocks e1–e4 of various sizes, in which the block e1 alone has the division base size A3T determined from the largest available copy paper in this embodiment.

The operator responds to the message of menu Q12 to select as to whether or not the base-size block is disposed at the center of the original image Gi, i.e., places the cursor CU over the label "Yes" or "No" by using the tracking ball 88, and then presses the PRINT key 71 to start the copy operation.

(4.3.2) Copy Operation

When the operator selects "No" on the menu Q12, sheets of copied paper as shown in FIG. 25 will result. Namely, partial copied images Gh1–Gh4 corresponding to the blocks e1–e4 are placed on four sheets of A3T paper in exactly the same fashion as displayed.

Figure 42:
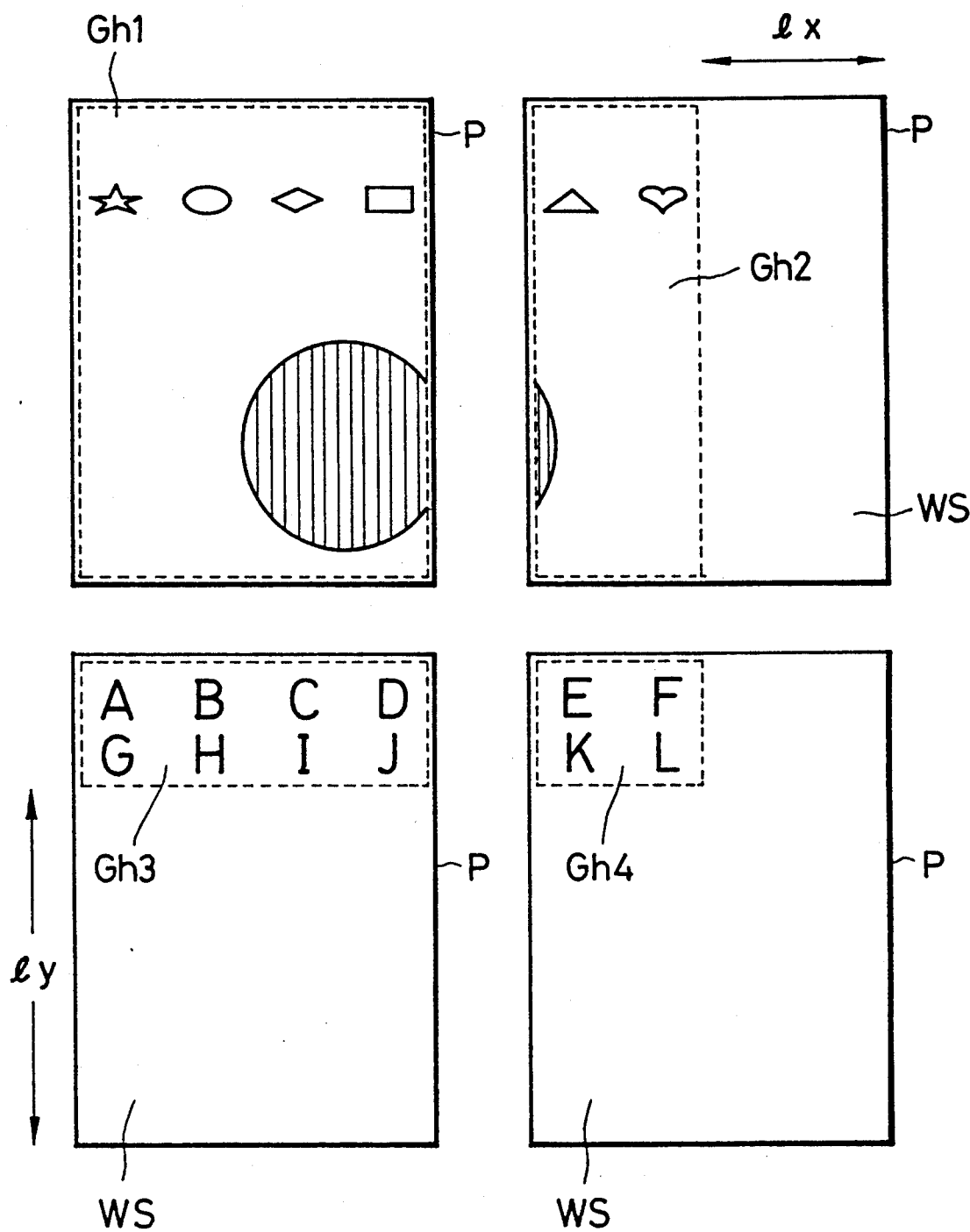
FIG. 42 is a diagram showing an example of copy operation based on the conjunct scale-up copy mode C.
Figure 43:
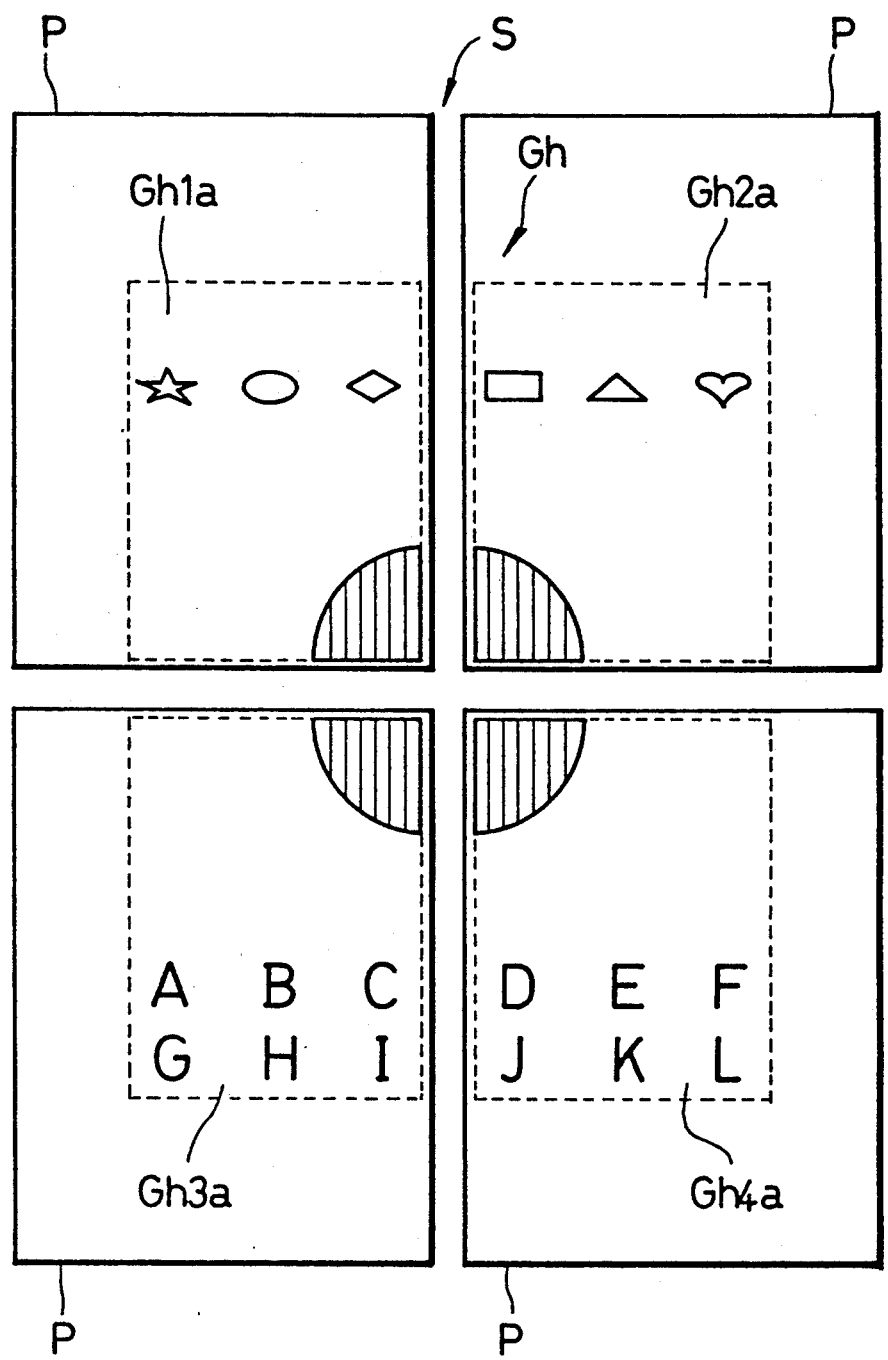
FIG. 43 is a diagram showing another example of copy operation based on conjunct scale-up copy mode C.

If the operator selects "Yes," the image movement takes place such that a copied image Gh consisting of four partial copied images Gh1a, Gh2a, Gh3a and Gh4a is formed at the center of the total copied area made up of four sheets of paper, as shown in FIG. 43. The amount of image movement on each partial copied image is half the lengths 1x and 1y of the marginal sections WS shown in FIG. 42 along the main and subsidiary scanning directions.

(4.4) Conjunct Scale-Up Copy Mode D

(4.4.1) Setting of Copy Conditions

Figure 26:
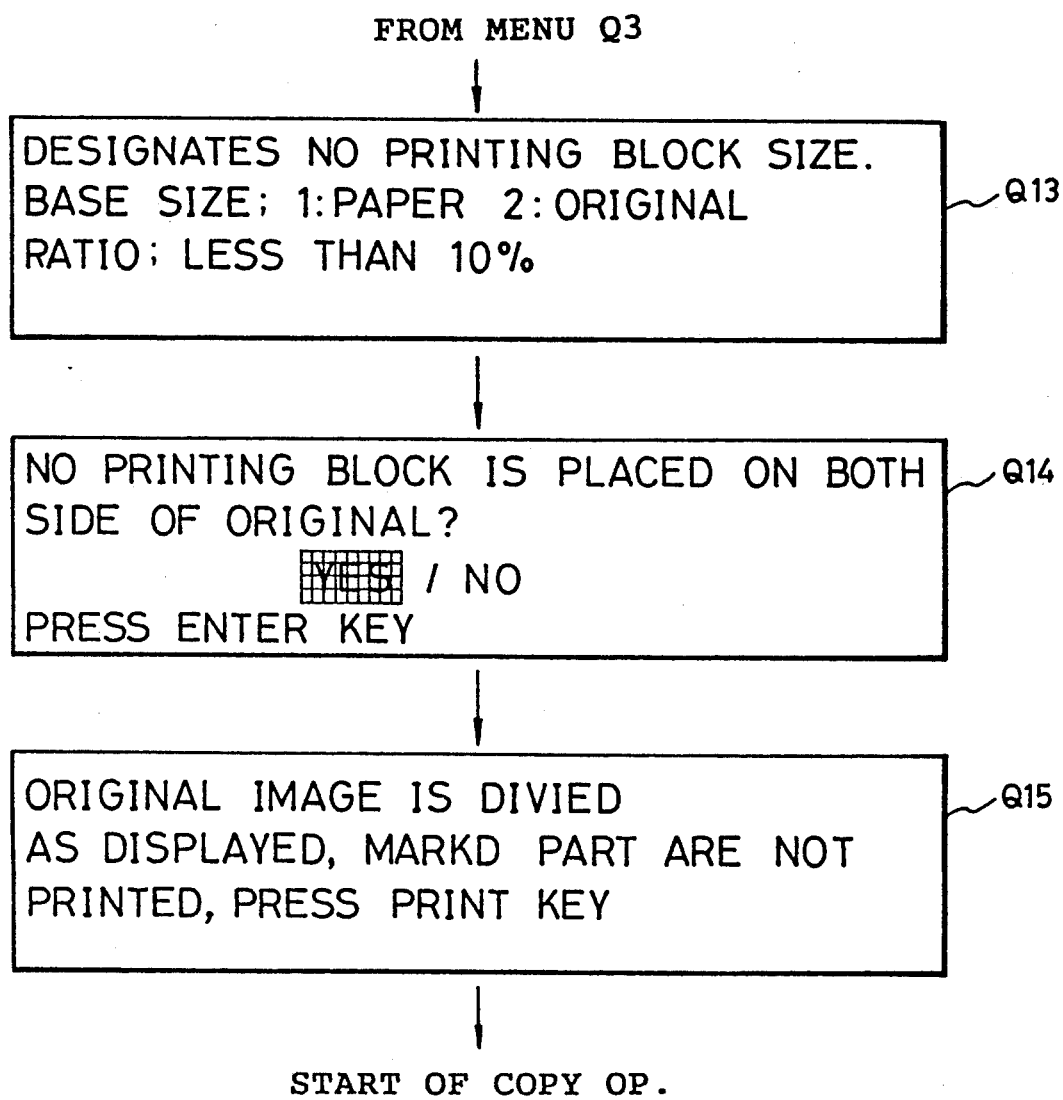
FIG. 26 is a diagram showing a menu area picture displayed on a display device in copy mode D.

After setting the magnification on the menu Q3 in this mode, the operator responds to a menu Q13 shown in FIG. 26 to select the paper size or original size as the base size for determining the cut-away portion of the original image Gi and set the ratio with reference to the base size. In the example of FIG. 26, the original size is selected for the base and a ratio of 10% or less is set.

Figure 44:
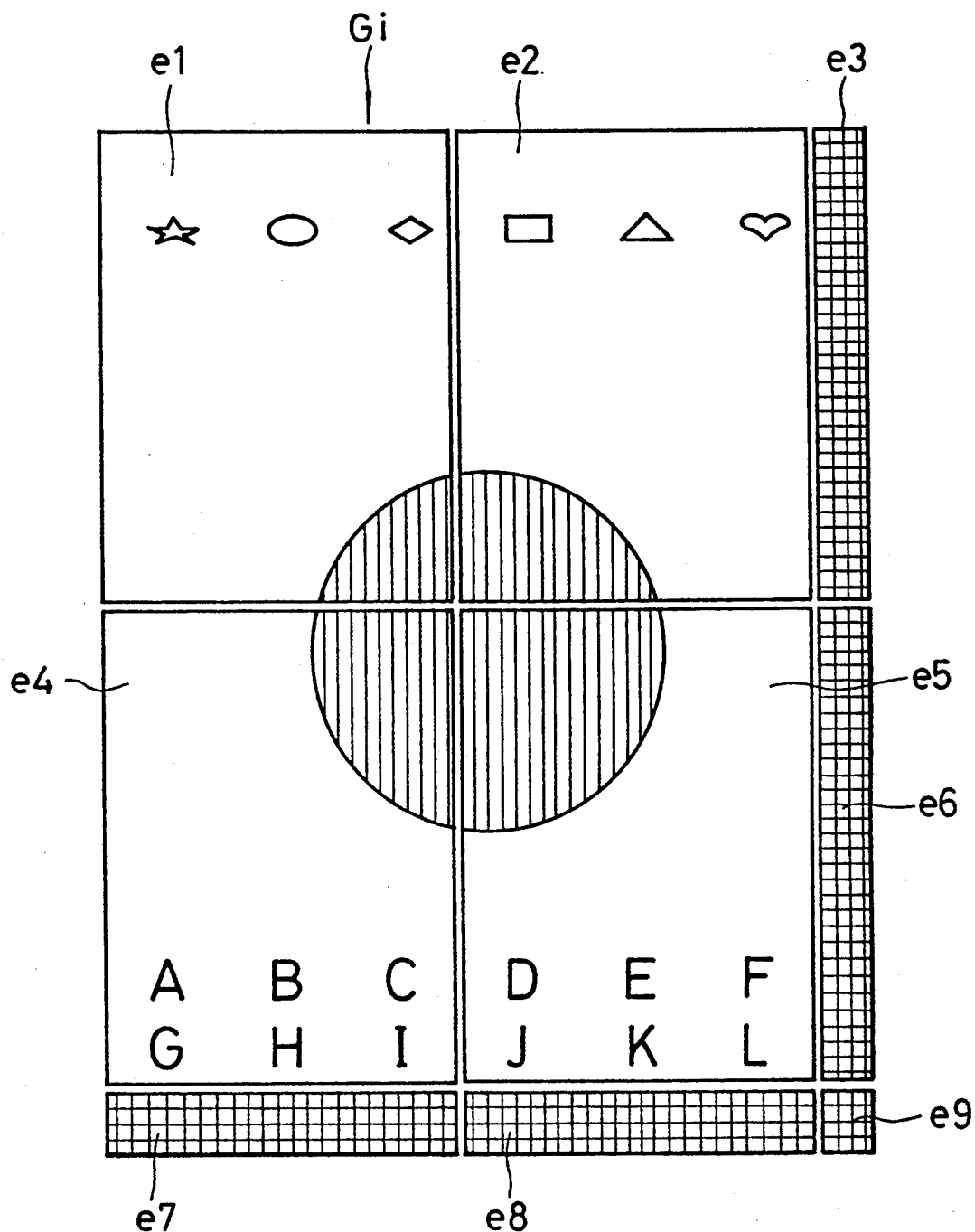
FIG. 44 is a diagram showing an example of original division based on the conjunct scale-up copy mode D.

The operator presses the ENTER key 86 to activate the setting on the menu Q13, and the CPU 104 displays the original image Gi which is divided in accordance with the specified proportion as shown in FIG. 44. The blocks e1, e2, e4 and e5 to be copied and the blocks e3, e6, e7, e8 and e9 to be cut away from copy are displayed in different fashion. The latter blocks are shaded in FIG. 44, or these sections may be displayed in different colors.

The CPU 104 replaces the menu Q13 with a menu Q14 which prompts the selection of as to whether or not the cut away portion is distributed evenly around the image Gi. The default setting is to bring the cut-away portion to the rightmost and bottom areas of the image field E1.

Figure 45:
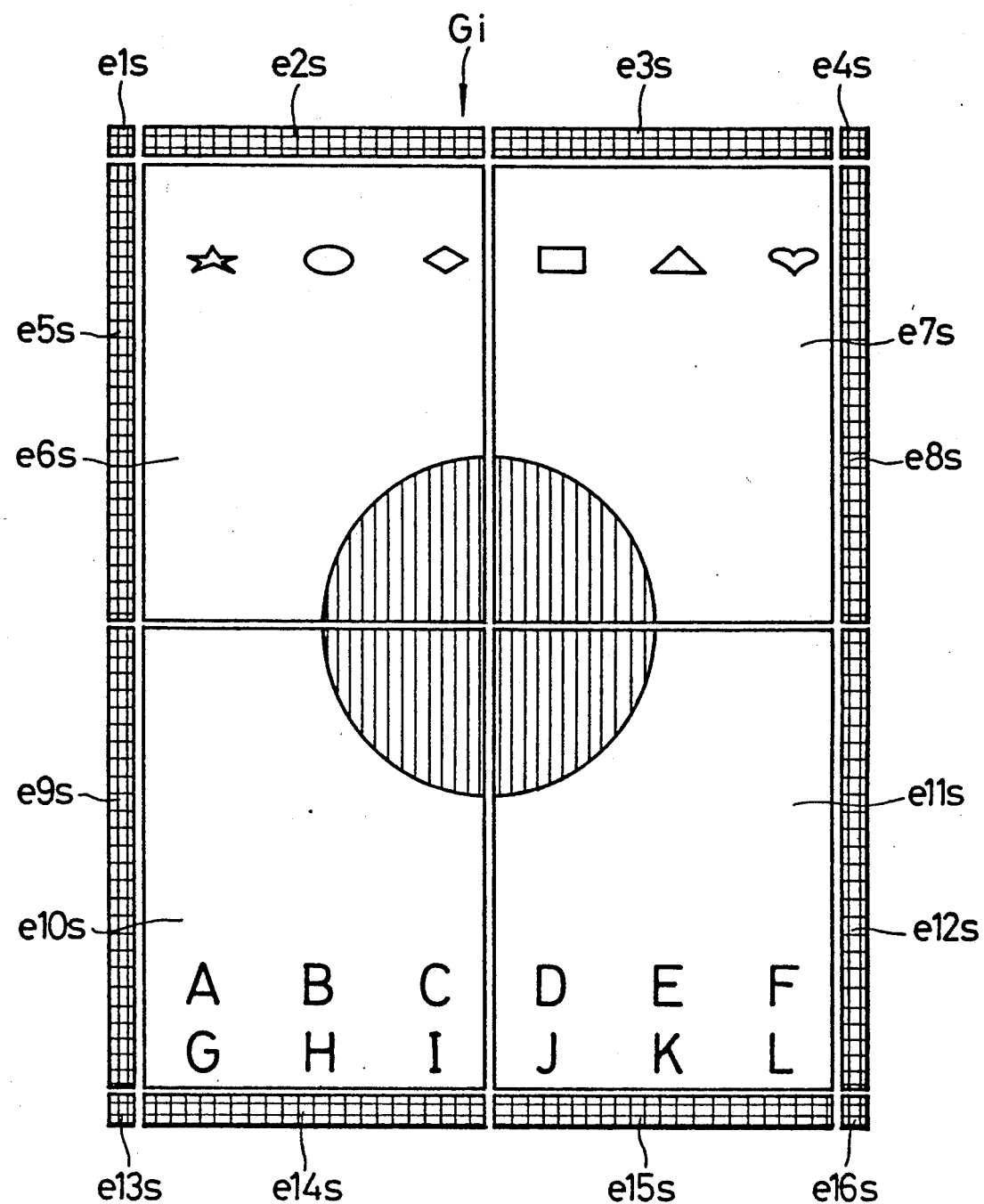
FIG. 45 is a diagram showing an example of secondary original division based on the conjunct scale-up copy mode D.

When the operator selects the even distribution of the cut-away portion, the CPU 104 implements the secondary division of original image Gi and displays a newly divided original image as shown in FIG. 45. The operator is prompted by a message of menu Q15 to press the PRINT key 71.

Figure 46:
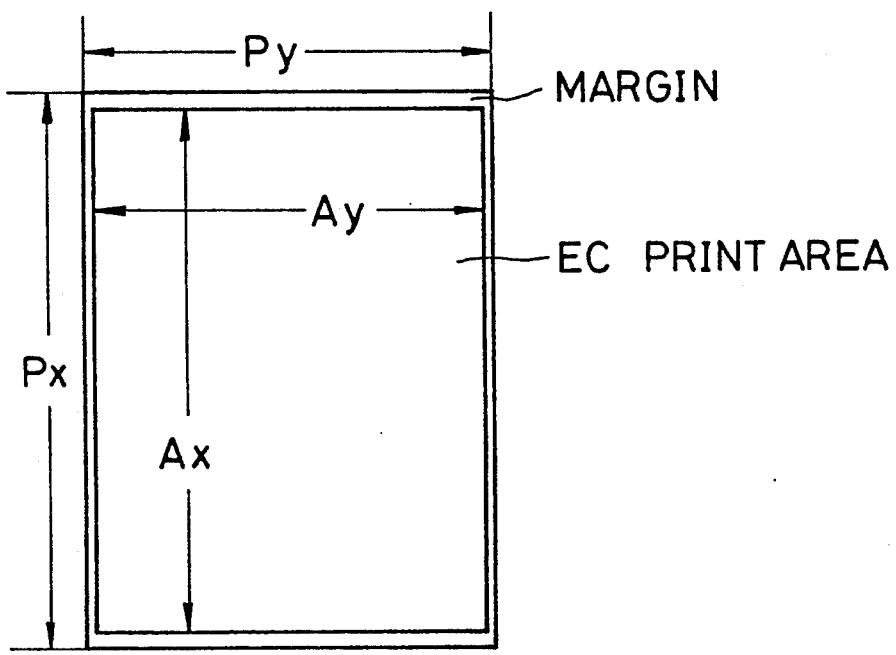
FIG. 46 is a diagram showing the method of secondary original division based on the conjunct scale-up copy mode D.

FIG. 46 and FIG. 47 are diagrams showing the secondary image division process. In FIG. 46, the copy paper P can be copied within a copy-admit area EC which is the paper surface, with margins of several millimeters in width being excluded at all edges. The width of margin is constant regardless of the paper size. The copy-admit area EC is defined to have a length Ax in the main scanning direction and a length Ay in the subsidiary scanning direction.

The lengths Sx and Sy of the division base block in the main and subsidiary scanning directions on the original D are expressed in terms of the dimensions of copy-admit area EC and magnification M as: $Sx = Ax/M$ and $Sy = Ay/M$.

Figure 47A:
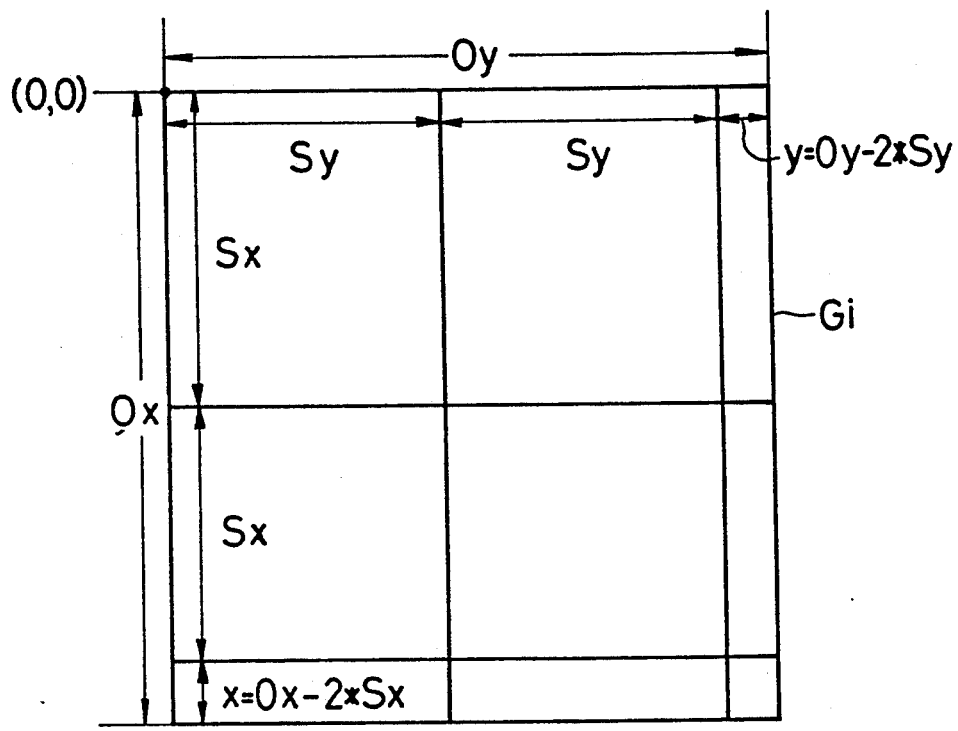
FIG. 47(a) and FIG. 47(b) are diagrams showing the method of secondary original division based on the conjunct scale-up copy mode D.

In the normal original division process, the original image Gi is divided from the origin 0 (0,0) into sections with the lengths Sx and Sy, as shown in FIG. 47(a). In the figure, the original image Gi is divided into four blocks each having the division base size $Sx \times Sy$ and five small cut-away blocks.

For the original image Gi dimensioned by 0x and 0y in the main and subsidiary scanning directions, respectively, the small block at the bottom has a length of x=0x−2Sx in the main scanning direction and the small block at the right edge has a length of y=0y−2Sy in the subsidiary scanning direction.

Figure 47B:
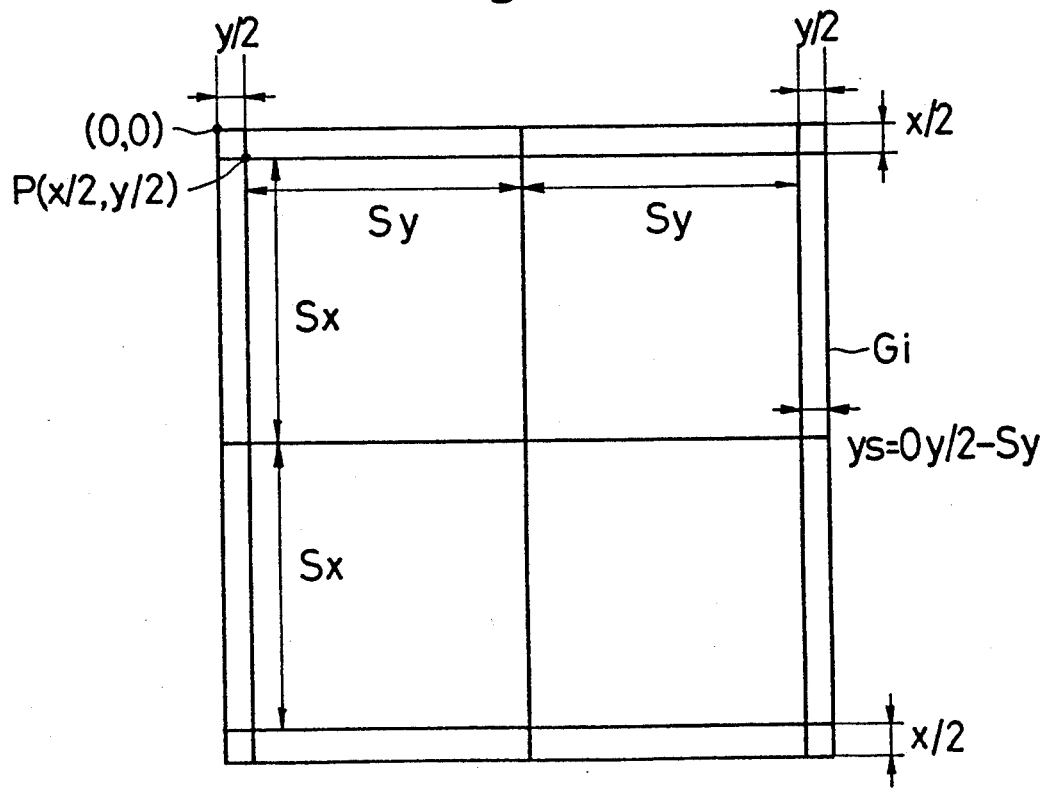

In the secondary original division process, the original image Gi is divided based on a point p (x/2, y/2) into four blocks of the division base size Sx × Sy in the main and subsidiary scanning directions, as shown in FIG. 47(b). Consequently, the copy object area is set to the central region of the original image Gi.

In the case of determining small blocks based on the paper size, the reference point p is determined in terms of the small block dimensions on the original image Gi and thereafter the secondary division process is carried out.

(4.5) Conjunct Scale-Up Copy Mode E

After the operator has set the magnification on the menu Q3 in this mode, the CPU 104 divides the original image Gi based on the paper size such that paper is copied most efficiently. The copy efficiency is based on the total assessment of the number of sheets of paper and the wasted blank area and time.

Figure 27:
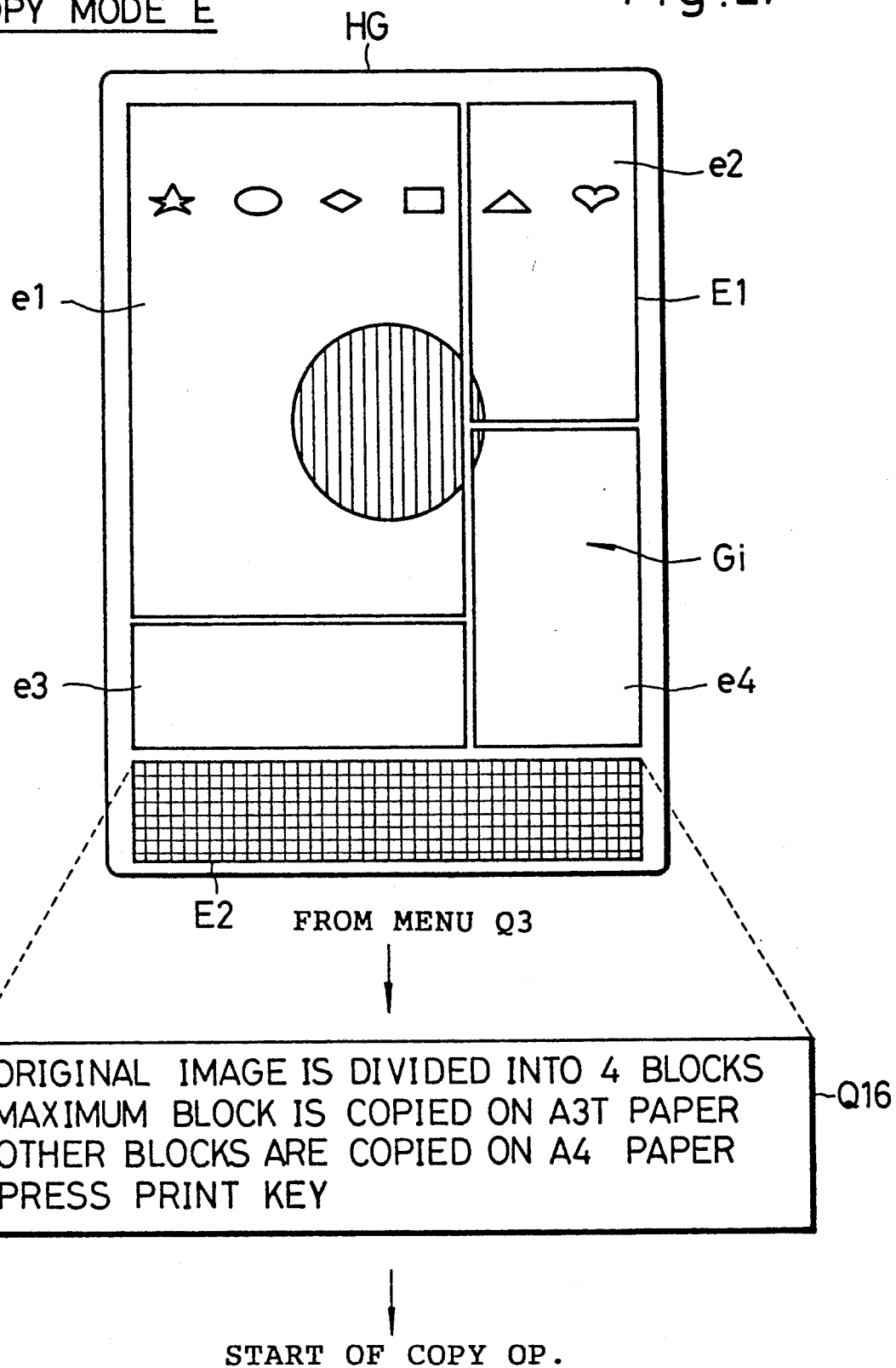
FIG. 27 is a diagram showing a picture displayed on a display device in copy mode E.

In the example of FIG. 27, the original image Gi is divided into four blocks e1–e4 of different size B. The block e1 bases the division on the A3T paper, the blocks e2 and e4 base on the A4T paper, and the block e3 bases on the A4Y paper.

Figure 48:
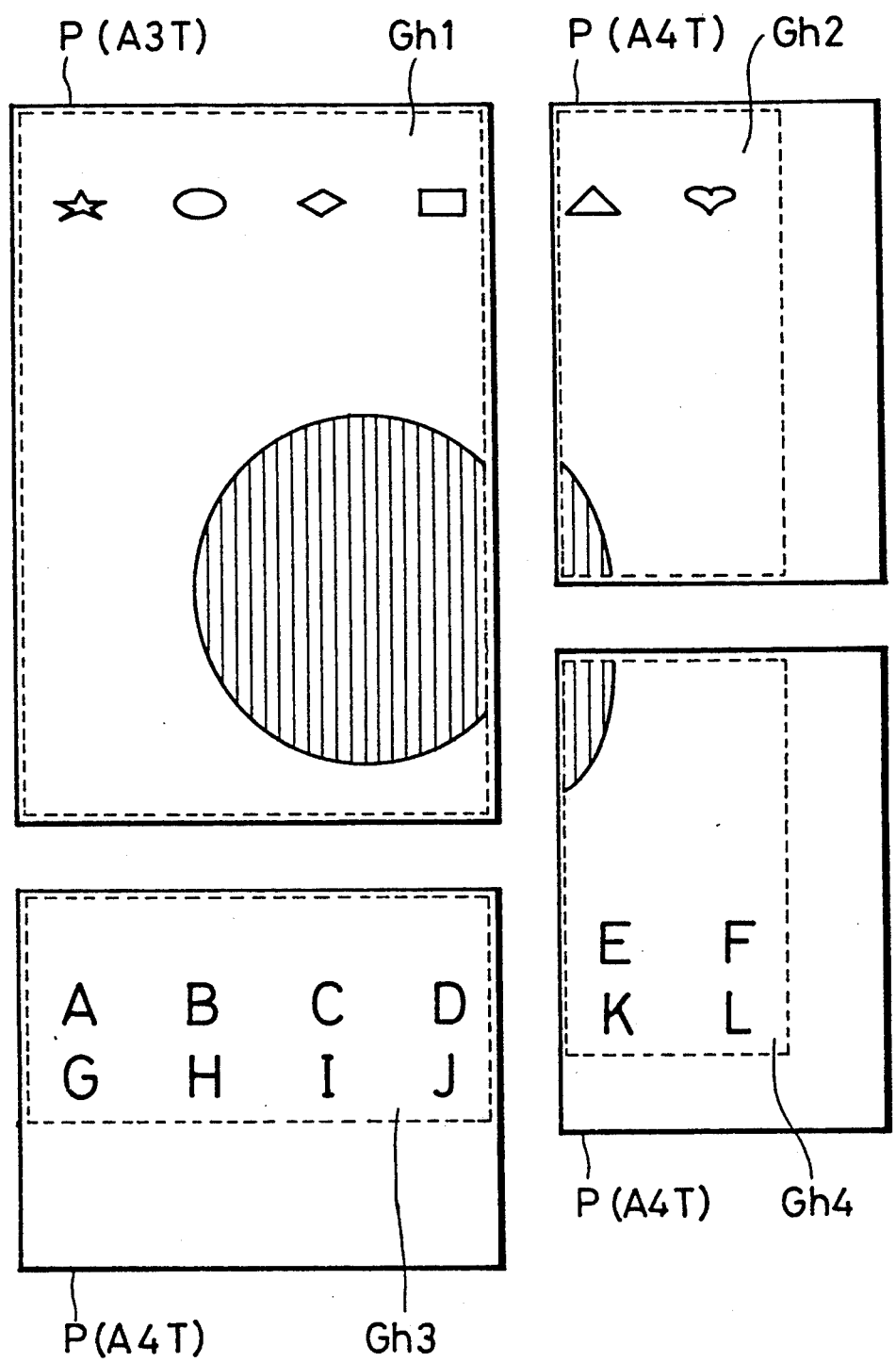
FIG. 48 is a diagram showing an example of copy operation based on the conjunct scale-up copy mode E.

The operator approves the image division in response to the display in the image field E1 and the message of menu Q16, and presses the PRINT key 71. Then, the copy operation starts, and partial copied images Gh1–Gh4 for the blocks e1–e4 are formed separately on a sheet of A3T paper, a sheet of A4T paper, a sheet of A4Y paper, and a sheet of A4T paper, as shown in FIG. 48.

Figure 49A:
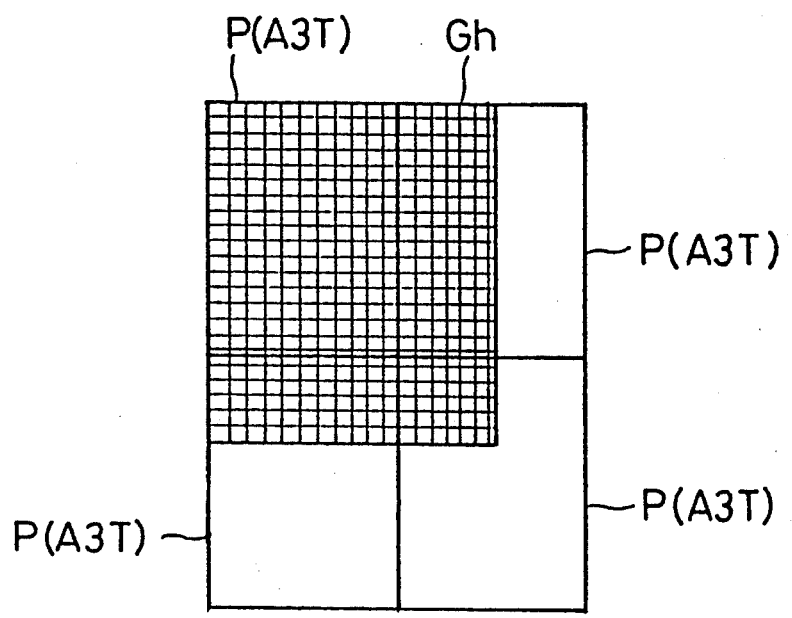
FIG. 49(a), FIG. 49(b) and FIG. 49(c) are diagrams showing the method of original division based on the conjunct scale-up copy mode E.
Figure 49B:
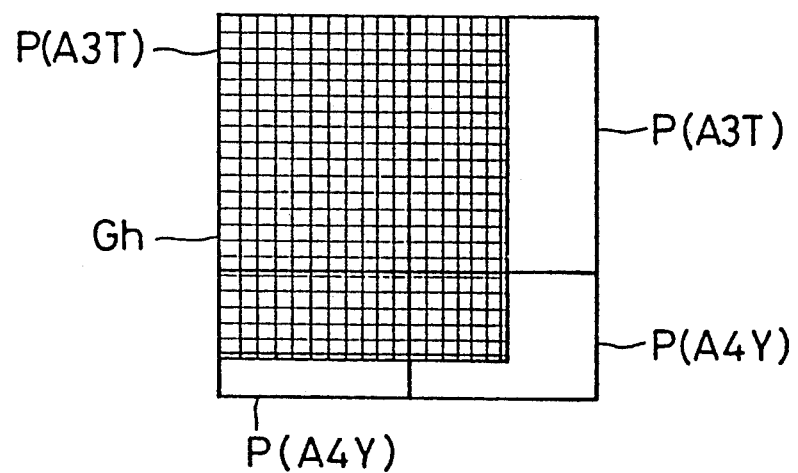
Figure 49C:
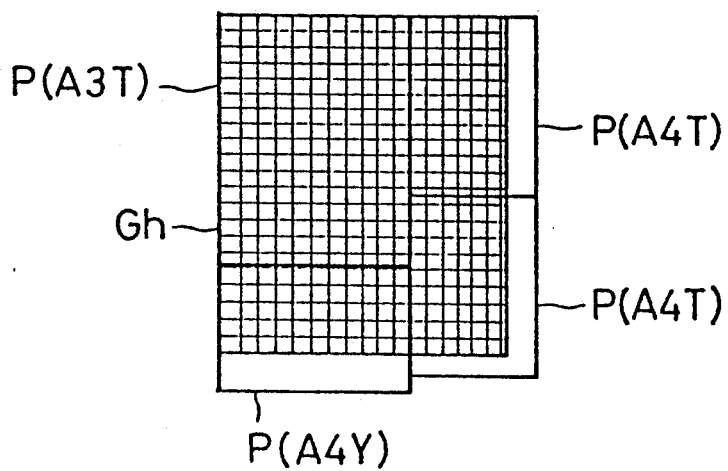
Figure 50:
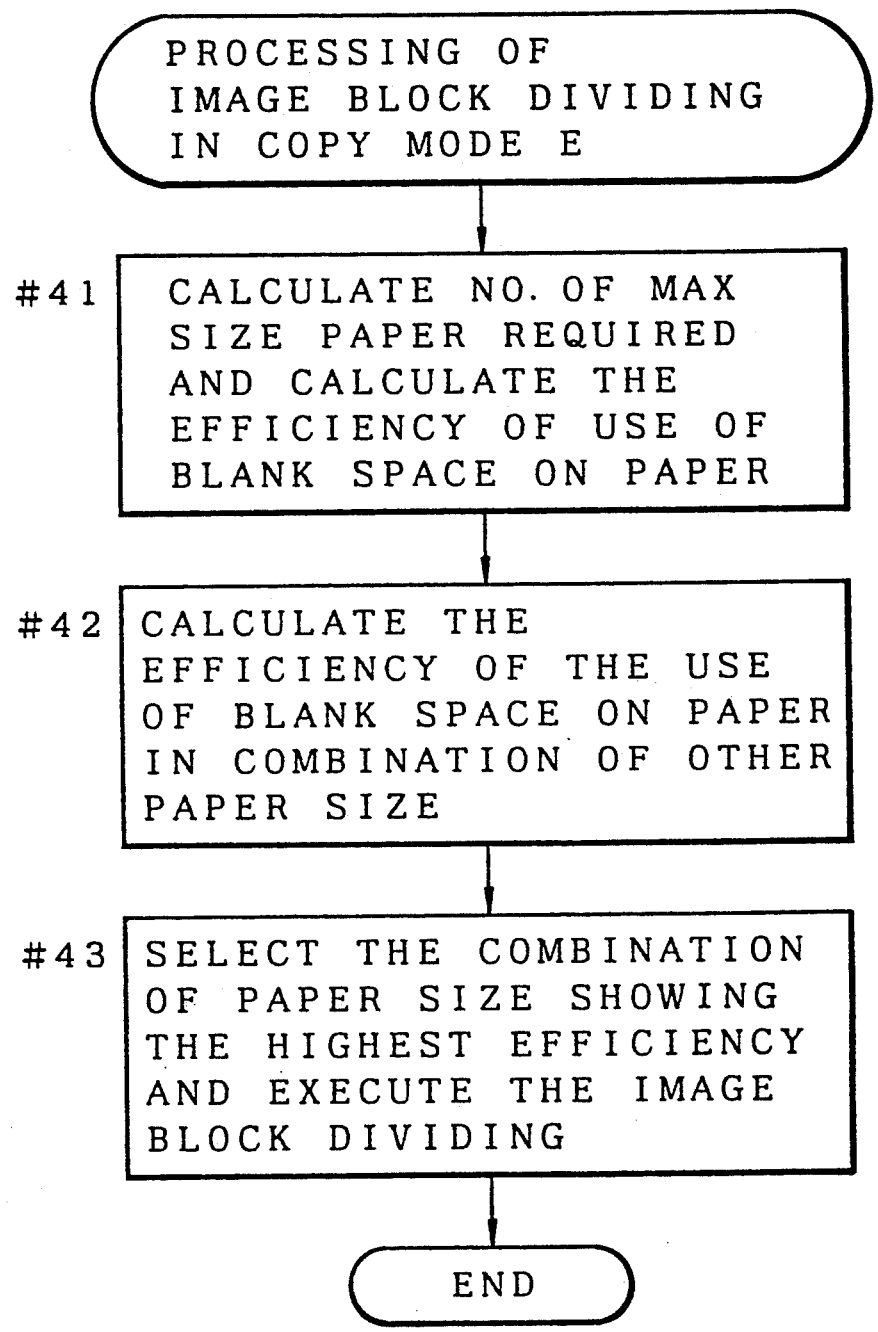
FIG. 50 is a flowchart of the CPU operation pertinent to FIG. 49.

FIG. 49(a), FIG. 49(b) and FIG. 49(c) are diagrams showing manners of dividing the image Gi in the conjunct scale-up copy mode E, and FIG. 50 is a flowchart showing the operation of the CPU 104 for the division process. In these examples, the magnification M is specified such that the total copied image (assembly of partial copied images) Gh has dimensions of 400 mm by 565 mm.

In the first example, the original image Gi is divided based on the largest A3T (297×420 mm) paper, as shown in FIG. 49(a). Four sheets of paper are needed in this example. For copy paper provided with a top and bottom margins of 10 mm in total and a right and left margins of 5 mm in total, the total copy-admit area on the four sheets of paper is calculated to be: (297−5)×(420−10)×4=478880 mm². The total wasted blank space when four sheets of A3T paper are used is 478880−400×565=252880 mm², which is about 53% of the total copy-admit area.

In the second example of using two sheets of A3T paper and two sheets of A4Y paper as shown in FIG. 49(b), the total copy-admit area is 356240 mm². The total wasted blank space is 356240−400×565=130240 mm², which is about 37% of the total copy-admit area.

In the third example of using a sheet of A3T paper, two sheets of A4Y paper and a sheet of A4T paper as shown in FIG. 49(c), the total copy-admit area is 295790 mm². The total wasted blank space is 69790 mm², which is about 24% of the total copy-admit area.

In the image division process of conjunct scale-up copy mode E, the smallest number of sheets of copy paper is calculated based on the largest copy paper (step #41 in FIG. 50), the efficiency of use of blank space on paper is compared among combinations of copy paper of that smallest number (step #42), and a combination of paper size showing the highest efficiency is selected to divide the original image Gi (step #43).

(5) Operation at Paper Run-Out

The foregoing five conjunct scale-up copy modes have a common feature of copying an original image by use of a number of sheets of paper, although each mode is distinct in original division and paper selection.

Copy paper of a certain size in need can run out during the operation of conjunct scale up copy. Conventional copy machines aborts the conjunct scale-up copy operation on detecting the state of paper run-out, whereas the copy machine 1 of this embodiment of invention can continue the conjunct scale-up copy operation so far as any of the paper cassettes 42–44 still contain paper.

Figure 51:
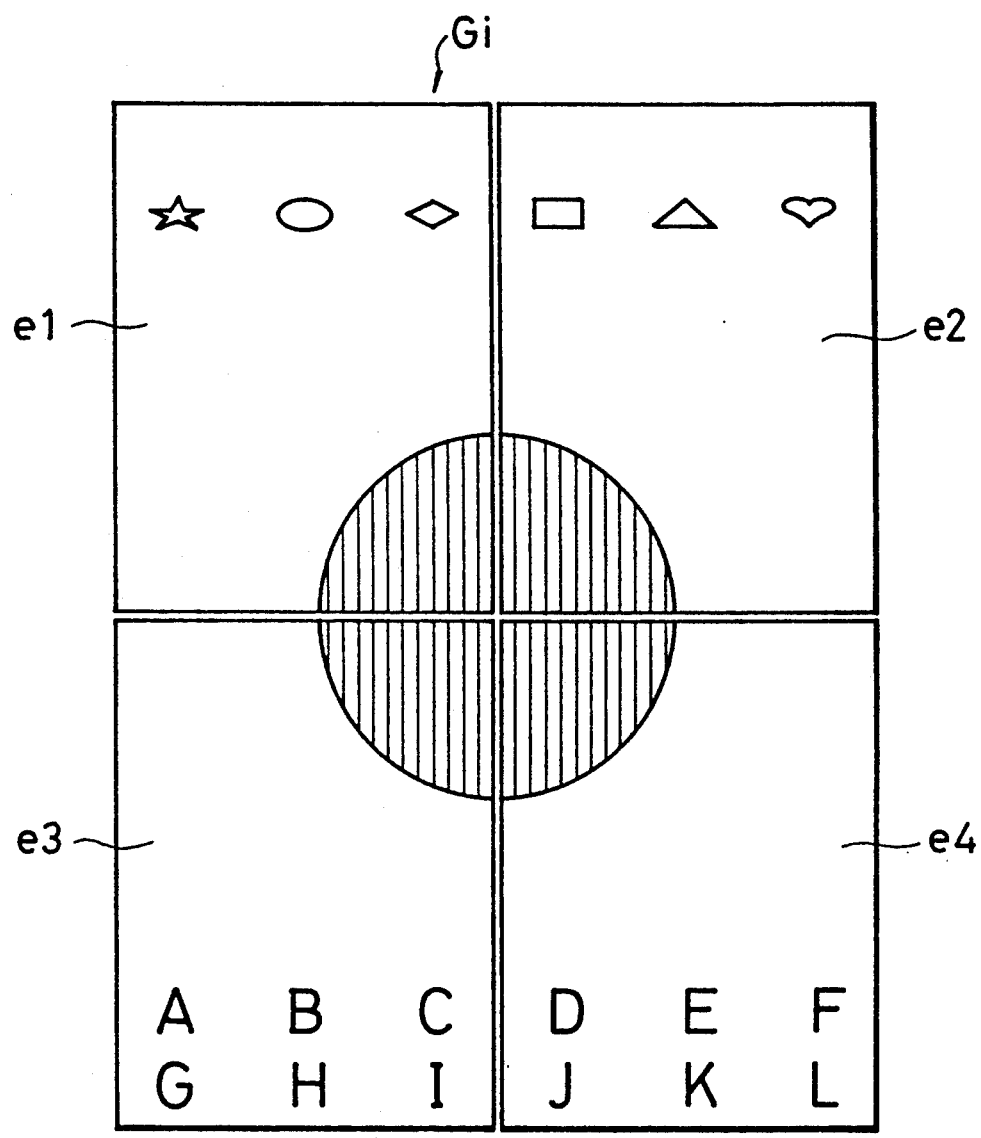
FIG. 51 is a diagram showing the original division at the commencement of conjunct scale-up copy operation.

The following explains an example of this situation, in which an original image Gi is divided into four blocks e1–e4, as shown in FIG. 51, so that these blocks are copied in order onto for sheets of A3T paper in the conjunct scale-up copy mode, and copy paper runs out after two blocks e1 and e2 are copied.

On detecting the paper run-out state, the CPU 104 displays a message of menu Q17 shown in FIG. 28. The message prompts the operator to select one of two options: (1) Supply paper to the paper run-out cassette and restart the operation in the same copy condition; (2) Alter the paper selecting condition and restart the operation.

Figure 52:
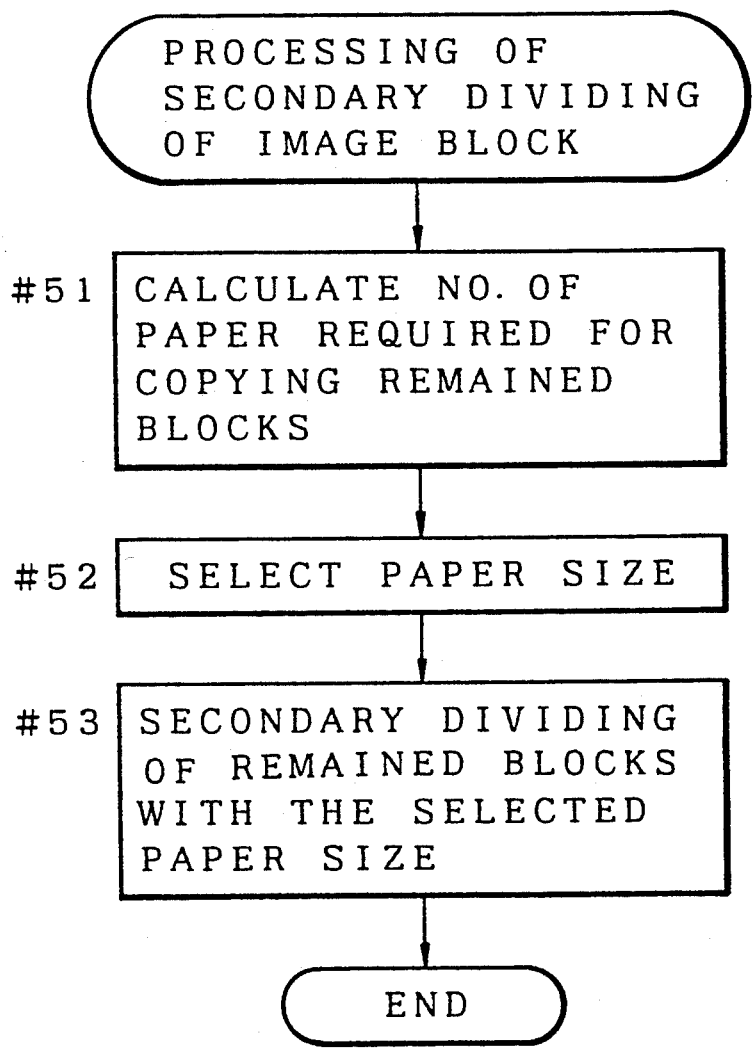
FIG. 52 is a flowchart of the secondary original division process at the detection of paper run-out.
Figure 53:
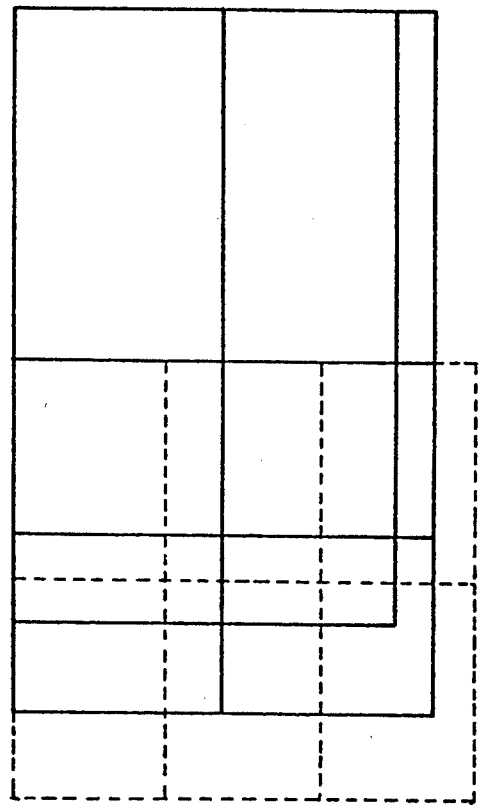
FIG. 53 is a diagram showing the method of secondary original division at the detection of paper run-out.

When the operator presses the ENTER key 86, the CPU 104 implements the secondary dividing of image block by following the steps #51–#53 in FIG. 52. For example, when a copied image Gh having a size of 560-by-790 mm as shown in FIG. 53 is intended to produce on A3T paper which has a size of 292-by-410 mm, the portion of Gh which is left unprocessed will have a size of 560-by-380 mm. Copying this unfinished portion necessitates six sheets of A4T (205-by-287 mm) paper or four sheets of A3Y (292-by-200 mm) paper.

Figure 29:
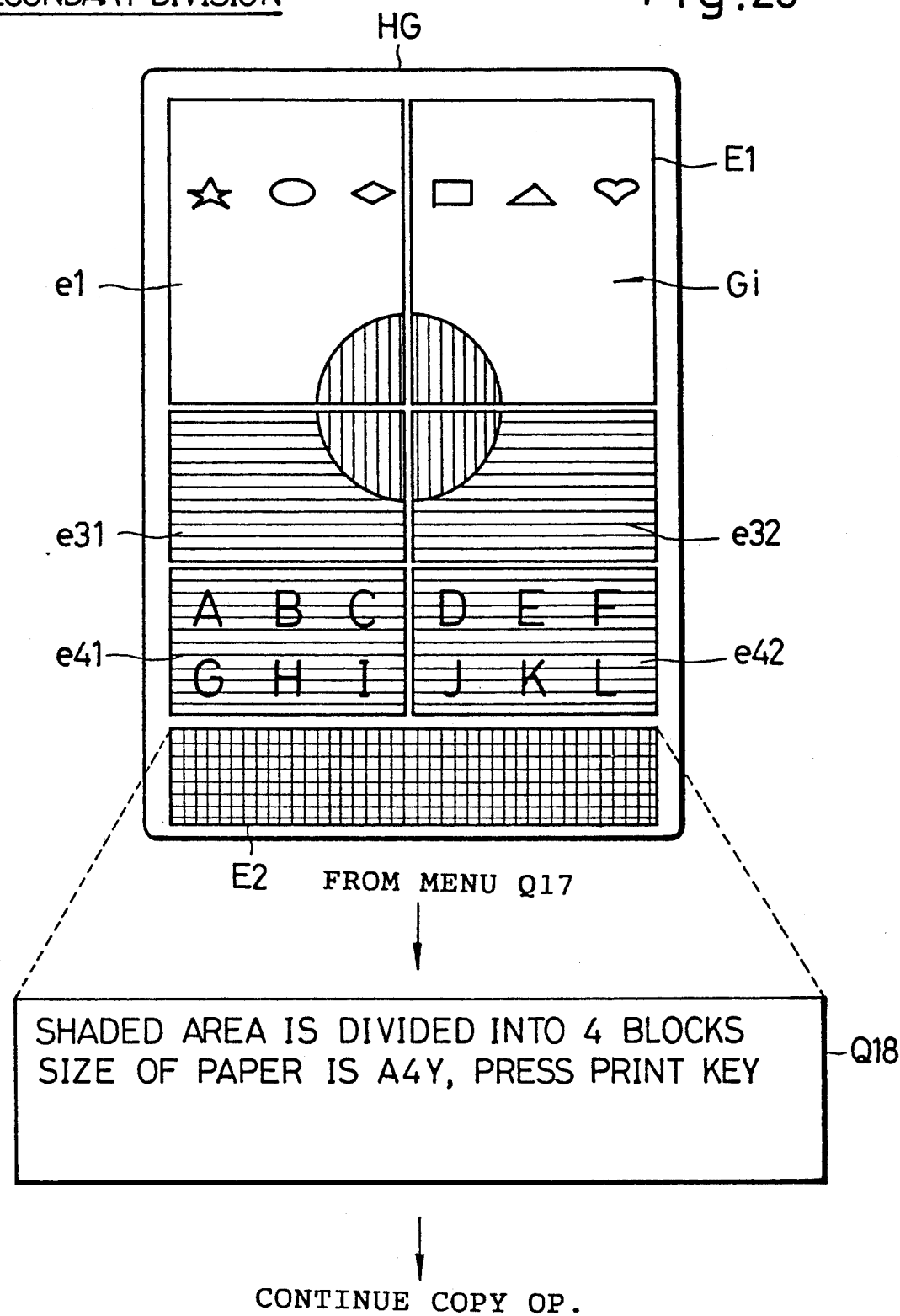
FIG. 29 is a diagram showing a picture displayed on a display device in case of secondary division.

The CPU 104 divides the unfinished portion of Gh based on the A4Y paper so that the number of sheets of paper is minimal. The CPU 104 displays the resulting secondary-divided original image Gi and an associated message of menu Q18 as shown in FIG. 29. In the example of FIG. 29, the old blocks e3 and e4 are further divided into blocks e31, e32, e41 and e42. The new blocks are displayed by being shaded so that they are distinguished from the old block e1 and e2 which have been already copied.

The operator presses the PRINT key 71 in response to the message of menu Q18, and the CPU 101 instructs the CPU 103 to feed A4Y paper, and the CPU 103 starts the copy operation for the blocks e31, e32, e41 and e42. As a result, the original image Gi is copied by use of two sheets of A3T paper and four sheets of A4Y paper.

If the operator presses the PRINT key 71 in response to the message of menu Q17 without supplying A3T paper, the copy machine 1 operates to make secondary division of the unfinished portion and display the message of copy restart by use of paper of other size. When the operator presses the PRINT key 71 again, the copy operation restarts based on the paper selecting condition resulting from the secondary division.

According to the foregoing embodiment of invention, the copy processing stages from the formation of multiple images along the subsidiary scanning direction and the development of the images take place, with a sheet of copy paper being kept wound on the transfer drum, and thereafter the fixing process takes place at once for the developed paper, whereby the copy operation can be sped up.

According to the foregoing embodiment of invention, divided blocks of an original image are copied onto sheets of paper of different sizes which match individual block sizes, in which case use of large copy paper would take a longer copy time due to the mechanical restriction or the like, whereby the conjunct scale-up copy operation can be sped up.

Although the foregoing embodiment of invention is a color copy machine, the present invention is also applicable to monochrome copy machines. In this case, even if the machine is designed to transfer the toner image onto the paper without using the transfer drum, multiple image copy along the subsidiary scanning direction is accomplished based on the recurrent paper feed by means of the midway tray.

Although in the foregoing embodiment of invention, the image of one divided original area is copied in an unused blank space of paper on which another divided original area has been copied, image data of the two original areas may be joined in the memory and printed on the paper at once.

The features of the present invention which have been explained above for a specific embodiment are summarized as follows.

In the conjunct scale-up copy operation for producing an enlarged copy of an original image by use of a number of sheets of paper, the original is divided into areas based on the selected paper size and specified magnification such that the size of copy image of each divided area does not exceed the paper size. At least one area is sized to be equal to the paper size divided by the magnification (division base size).

In case the paper size selected for area division is equal to the original size and the magnification is an integer greater than one, all divided areas have the division base size, or otherwise divided area(s smaller than the division base size will emerge.

Although copying a divided area smaller than the division base size will create an unused blank space on the division base size paper, paper as small to include the whole area as possible is selected for such a small area, and therefore the unused blank space is minimized.

The original image is divided based on the largest paper size available in the machine, whereby the number of original divisions and thus the number of sheets of paper used for conjunct scale-up copy is minimized.

At the emergence of paper run-out during the conjunct scale-up copy operation, the remaining original portion is rendered the secondary division process based on the size of paper available in other paper cassette, and it is copied by use of paper in the secondarily selected paper cassette. Therefore, the copy operation of this mode is not aborted during the operation so far as copy paper is available in any of multiple paper cassettes.

The copy machine is responsive to copying the image of a specified region of the original on a priority basis in the conjunct scale-up copy mode.

In conclusion, according to the present invention, the number of sheets of paper used to make a copy of an original can be minimized and the efficiency of the use of copy paper can be enhanced. Unused blank spaces of copy paper created in copying an original having excessive margins are minimized, and the efficiency of the use of copy paper can be enhanced.

The performance of priority-based copy for a specified region of an original allows the operator to make the assessment of copy quality at an early stage, whereby the efficiency of copy work is enhanced and waste of paper can be suppressed.

What is claimed is:

1. An image forming apparatus comprising:
   first setting means for setting an arbitrary magnification of copy;
   second setting means for setting the conjunct scale up copy mode in which an original is divided into multiple areas depending on the magnification which has been set and an enlarged copy of each divided area is produced on a sheet of copy paper;
   paper storage means including a plurality of paper storage devices for storing copy paper of different sizes;
   paper transportation means for feeding a sheet of paper from one of said paper storage devices selectively; and
   control means for controlling the paper feed operation in the conjunct scale-up copy mode for each divided area in such a manner that a paper storage device which stores copy paper of a smallest possible size necessary to copy the entirety of the divided area is selected.

2. An image forming apparatus according to claim 1, wherein an enlarged copy of each divided area is produced at such a position of paper that images of divided areas located around a central divided area are positioned closed to the image of the central divided area.

3. An image forming apparatus according to claim 1 further including:
   setting means for setting an arbitrary copy paper size;
   first computation means for calculating a division base size from a specified copy paper size and copy magnification;
   second computation means for calculating the size of a copy object region within each divided area based on the division base size and original size;
   memory means for memorizing the size of copy object region of each divided area; and
   comparison means for comparing the size of copy object region of each divided area with the division base size, said control means controlling the paper feed operation in such a manner that a divided area, which has a copy object region size smaller than the division base size, is fed with a sheet of copy paper of a size corresponding to the copy object region size.

4. An image forming apparatus according to claim 1, wherein an original is divided into multiple areas based on the largest size of copy paper stored in said paper storage means.

5. An image forming apparatus comprising:
   first setting means for setting an arbitrary magnification of copy;
   second setting means for setting the conjunct scale-up copy mode in which an original is divided into multiple areas depending on the magnification which has been set and an enlarged copy of each divided area is produced on a sheet of copy paper;

paper storage means including a plurality of paper storage devices for storing copy paper of different sizes;

paper transportation means for feeding a sheet of paper from one of said paper storage devices selectively; and control means for controlling the operation in response to the emergence of a paper run-out state in a paper storage device, which is being selected, during the copy operation of divided original areas in the conjunct scale-up copy mode, in such a manner that all divided areas which are left unprocessed for copying are rendered the secondary division process based on a size of paper in a paper storage device that has not been selected previously and a copy of each newly divided area is produced on a sheet of paper fed from said paper storage device.

6. An image forming apparatus according to claim 5, wherein said control means controls the secondary division process for the unprocessed original areas such that the number of sheets of paper used for this unprocessed original portion is minimal.

7. An image forming apparatus comprising:

first setting means for setting an arbitrary magnification of copy;

second setting means for setting the conjunct scale-up copy mode in which an original is divided into multiple areas depending on the magnification which has been set and an enlarged copy of each divided area is produced on a sheet of copy paper; and control means for controlling the operation in the conjunct scale-up copy mode in such a manner that if enlarged copied images derived from at least two divided areas can be laid out on a sheet of copy paper, the copies of said two areas are produced on the single sheet of copy paper.

8. An image forming apparatus according to claim 7, wherein said control means controls the copy operation in such a manner that if copied images derived from at least two divided areas can be laid out on a sheet of copy paper, images of said two areas are joined in a memory and copies of said two divided areas are produced at once on the single sheet of copy paper based on the memorized image.

9. An image forming apparatus according to claim 7, wherein said control means controls the copy operation in such a manner that if a sheet of copy paper on which a copy of one divided area is already produced has an unused blank space and there is another divided area which is not yet copied and can be copied in regard to the size thereof in said blank space, a copy of said unprocessed divided area is produced in said blank space of said sheet of paper.

10. An image forming apparatus comprising:

first setting means for setting an arbitrary magnification of copy;

second setting means for setting the conjunct scale-up copy mode in which an original is divided into multiple areas depending on the magnification which has been set and an enlarged copy of each divided area is produced on a sheet of copy paper; and control means for controlling the operation in the conjunct scale-up copy mode in such a manner that only divided areas larger than a specific size among all divided areas are designated as copy object regions.

11. An image forming apparatus according to claim 10, wherein said specific size is set based on the original size or paper size.

12. An image forming apparatus comprising:

first setting means for setting an arbitrary magnification of copy;

second setting means for setting the conjunct scale-up copy mode in which an original is divided into multiple areas depending on the magnification which has been set and an enlarged copy of each divided area is produced on a sheet of copy paper; and control means for controlling the operation in the conjunct scale-up copy mode in such a manner that if at least one of the divided areas is a fragmentary area that is an area smaller than a specific size, the original is rendered the secondary division process such that said fragmentary area is distributed to the top, bottom, right and left edges of the original, and the original excluding the edge sections with the allocation of said fragmentary area is designated to be a copy object area.

13. An image forming apparatus according to claim 12, wherein said specific size is set based on the original size or paper size.

14. An image forming apparatus comprising:

first setting means for setting an arbitrary magnification of copy;

second setting means for setting the conjunct scale-up copy mode in which an original is divided into multiple areas depending on the magnification which has been set and an enlarged copy of each divided area is produced on a sheet of copy paper;

designation means for designating part of the original to be a specific region; and control means for controlling the operation in the conjunct scale-up copy mode, with a specific region being designated, in such a manner that the divided area corresponding to the specific region is copied on a priority basis.

15. An image forming apparatus according to claim 14, wherein said control means controls the operation in such a manner that a divided area corresponding to the specific region is copied at the beginning and thereafter remaining divided areas are copied in the incremental order of distances measured from the specific region along the radial direction centered by the specific region.

16. An image forming apparatus according to claim 14, wherein said control means controls the operation in such a manner that a row of divided areas corresponding to the specific region is copied at the beginning and thereafter remaining rows of divided areas are copied in the incremental order of distances measured from the specific region.

17. A method of copying an original carried out with an image forming apparatus which includes a plurality of paper storage devices capable of storing copy paper of different sizes and paper feed means for feeding a sheet of copy paper from one of said paper storage devices selectively, said method comprising the steps of:

setting an arbitrary magnification of copy;

dividing an original into multiple areas depending on the magnification which has been set;

feeding a sheet of copy paper for each divided area by selecting a paper storage device which stores copy paper of a smallest possible size necessary to cop the entirety of the divided area; and producing an enlarged copy of each divided area on the sheet of copy paper which has been fed.

18. A method of copying an original according to claim 17, further including the steps of:

setting an arbitrary copy paper size;

calculating a division base size from a specified copy paper size and copy magnification;

calculating the size of a copy object region within each divided area based on the division base size and original size;

memorizing the size of copy object region of each divided area;

comparing the size of copy object region of each divided area with the division base size; and feeding a divided area, which has a copy object region size smaller than the division base size, with a sheet of copy paper of a size corresponding to the copy object region size.

19. A method of copying an original according to claim 17, further including the step of:

dividing the original based on the largest size of copy paper stored in the paper storage devices.

20. A method of copying an original carried out with an image forming apparatus which includes a plurality of paper storage devices capable of storing copy paper of different sizes and paper feed means for feeding a sheet of copy paper from one of said paper storage devices selectively, said method comprising the steps of:

setting an arbitrary magnification of copy;

specifying a copy paper size;

dividing an original into multiple areas depending on the magnification which has been set;

selecting a paper storage device which stores copy paper of the specified size, and producing an enlarged copy of each divided area on the sheet of copy paper which has been fed from the selected paper storage device;

implementing a secondary division process in response to the emergence of a paper run-out state in a paper storage device, which is being selected, during the copy operation of divided areas, in such a manner that all divided areas which are left unprocessed for copying are divided based on a size of paper in a paper storage device that has not been selected previously; and producing an enlarged copy of each newly divided area on a sheet of paper fed from said paper storage device.

21. A method of copying an original carried out with an image forming apparatus, said method comprising the steps of:

setting an arbitrary magnification of copy;

dividing an original into multiple areas depending on the magnification which has been set;

judging as to whether or not enlarged copied images derived from at least two divided areas can be laid out on a sheet of copy paper; and producing the copies of said two divided areas on the single sheet of copy paper if said image layout is found possible by said judgment step.

22. A method of copying an original carried out with an image forming apparatus, said method comprising the steps of:

setting an arbitrary magnification of copy;

dividing an original into multiple areas depending on the magnification which has been set; and producing enlarged copies of only divided areas larger than a specific size among all divided areas on sheets of copy paper.

23. A method of copying an original according to claim 22, further including the step of setting said specific size based on the original size or paper size.

24. A method of copying an original carried out with an image forming apparatus, said method comprising the steps of:

setting an arbitrary magnification of copy;

dividing an original into multiple areas depending on the magnification which has been set;

implementing a secondary division process for the original, if at least one of the divided areas is a fragmentary area that is an area smaller than a specific size, such that said fragmentary area is distributed to the top, bottom, right and left edges of the original; and designating the original portion excluding the edge sections with the allocation of said fragmentary area to be a copy object area, and producing an enlarged copy of each newly divided area on a sheet of paper.

25. A method of copying an original carried out with an image forming apparatus, said method comprising the steps of:

setting an arbitrary magnification of copy;

dividing an original into multiple areas depending on the magnification which has been set;

designating part of the original as a copy object area; and producing an enlarged copy of the divided area corresponding to the specific region on a priority basis on a sheet of paper.

* * * * *

UNITED STATES PATENT AND TRADEMARK OFFICE
CERTIFICATE OF CORRECTION

PATENT NO. : 5,311,259
DATED : May 10, 1994
INVENTOR(S) : Shigeru Moriya, et al.

Page 1 of 2

It is certified that error appears in the above-identified patent and that said Letters Patent is hereby corrected as shown below:

```
In Col. 1, line 10, change "cop" to --copy--.
In Col. 1, line 63, change "row row" to --row--.
In Col. 2, line 39, change "area" to --areas--.
In Col. 5, line 18, after "10", insert --are--.
In Col. 5, line 22, change "noner" to --toner--.
In Col. 5, line 39, change "cassettes" to --cassette--.
In Col. 6, line 26, delete "unit" (second occurrence).
In Col. 7, line 18, change "th" to --the--.
In Col. 11, line 64, change "ca" to --can--.
In Col. 12, line 23, change "th" to --the--.
In Col. 13, line 50, change "Of" to --of--.
In Col. 16, line 57, after "e13", insert --→e12--.
In Col. 16, line 58, after "e17", insert --→--.
In Col. 17, line 13, change "(5.2)" to --(4.2)--.
In Col. 20, line 26, change "for" to --four--.
In Col. 21, line 46, change "area(s" to --area(s)--.
```

UNITED STATES PATENT AND TRADEMARK OFFICE
CERTIFICATE OF CORRECTION

PATENT NO. : 5,311,259
DATED : May 10, 1994
INVENTOR(S) : Shigeru Moriya, et al.

It is certified that error appears in the above-indentified patent and that said Letters Patent is hereby corrected as shown below:

In Col. 22, line 17 (Claim 1, line 4), change "scale up" to --scale-up--.

In Col. 25, line 3 (Claim 17, line 13), change "cop" to --copy--.

Signed and Sealed this

Third Day of January, 1995

Attest:

BRUCE LEHMAN

*Attesting Officer*   *Commissioner of Patents and Trademarks*